United States Patent
Farber et al.

(10) Patent No.: US 12,469,293 B2
(45) Date of Patent: Nov. 11, 2025

(54) OBJECT MONITORING SYSTEM AND METHODS

(71) Applicant: The Chamberlain Group LLC, Oak Brook, IL (US)

(72) Inventors: Jordan Ari Farber, Santa Clara, CA (US); Nathan John Kopp, Fremont, CA (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 535 days.

(21) Appl. No.: 17/375,340

(22) Filed: Jul. 14, 2021

(65) Prior Publication Data

US 2022/0019810 A1 Jan. 20, 2022

Related U.S. Application Data

(60) Provisional application No. 63/076,728, filed on Sep. 10, 2020, provisional application No. 63/051,446, filed on Jul. 14, 2020.

(51) Int. Cl.
*G06V 20/52* (2022.01)
*G06F 18/21* (2023.01)
(Continued)

(52) U.S. Cl.
CPC .......... *G06V 20/52* (2022.01); *G06F 18/2148* (2023.01); *G06F 18/217* (2023.01);
(Continued)

(58) Field of Classification Search
None
See application file for complete search history.

(56) References Cited

U.S. PATENT DOCUMENTS

| 4,567,610 | A | 1/1986 | McConnell |
| 6,728,351 | B2 | 4/2004 | Ahlstrom |

(Continued)

FOREIGN PATENT DOCUMENTS

CN 111862672 B * 11/2021 ......... G06K 9/00812

OTHER PUBLICATIONS

Luigi. "The Ultimate Guide to Model Retraining." ML in Production, Jun. 10, 2019, https://web.archive.org/web/20200508123542/ https://mlinproduction.com/model-retraining/ (Year: 2020).*

(Continued)

*Primary Examiner* — Matthew C Bella
*Assistant Examiner* — Johnny B Duong
(74) *Attorney, Agent, or Firm* — Dority & Manning, P.A.

(57) ABSTRACT

In one aspect of the present disclosure, an object monitoring system for a secured area is provided. The object monitoring system includes an image sensor operable to capture an image of the secured area and a memory configured to store a machine learning algorithm trained to identify a vehicle in the secured area, the machine learning algorithm including feature maps of training images captured by the image sensor. The object monitoring system further includes a processor operably coupled to the image sensor and the memory, the processor configured to calculate a feature descriptor of the image and to utilize the machine learning algorithm and the image of the secured area to determine whether a vehicle is present in the secured area by determining a correlation between the feature descriptor of the image and the feature maps of the training images.

33 Claims, 34 Drawing Sheets

(51) Int. Cl.

| | |
|---|---|
| *G06F 18/214* | (2023.01) |
| *G06F 18/2413* | (2023.01) |
| *G06F 18/40* | (2023.01) |
| *G06N 20/00* | (2019.01) |
| *G06V 10/40* | (2022.01) |
| *G07C 9/10* | (2020.01) |
| *H04N 7/18* | (2006.01) |

(52) U.S. Cl.
CPC .......... *G06F 18/2413* (2023.01); *G06F 18/40* (2023.01); *G06N 20/00* (2019.01); *G06V 10/40* (2022.01); *G07C 9/10* (2020.01); *H04N 7/183* (2013.01); *H04N 7/188* (2013.01); *G06V 2201/08* (2022.01)

(56) References Cited

U.S. PATENT DOCUMENTS

| | | | |
|---|---|---|---|
| 6,748,061 | B2 | 6/2004 | Ahlstrom |
| 7,123,128 | B2 | 10/2006 | Mullet |
| 7,154,531 | B2 | 12/2006 | Laird |
| 7,332,999 | B2 | 2/2008 | Fitzgibbon |
| 7,345,574 | B2 | 3/2008 | Fitzgibbon |
| 7,477,147 | B2 | 1/2009 | Fitzgibbon |
| 8,311,490 | B2 | 11/2012 | Witkowski |
| 8,368,509 | B2 | 2/2013 | Fitzgibbon |
| 8,410,930 | B2 | 4/2013 | Karasek |
| 8,558,885 | B2 | 10/2013 | Fitzgibbon |
| 8,584,401 | B2 | 11/2013 | Planck |
| 8,643,467 | B2 | 2/2014 | Chutorash |
| 8,648,695 | B2 | 2/2014 | Fitzgibbon |
| 8,994,496 | B2 | 3/2015 | Freese |
| 9,122,254 | B2 | 9/2015 | Cate |
| 9,249,612 | B2 | 2/2016 | Fitzgibbon |
| 9,728,020 | B2 | 8/2017 | Freese |
| 9,734,644 | B2 | 8/2017 | Samad |
| 9,756,233 | B2 | 9/2017 | Lee |
| 9,970,228 | B2 | 5/2018 | Fitzgibbon |
| 10,054,290 | B2 | 8/2018 | Birdwell |
| 10,417,882 | B2 | 9/2019 | Bretschneider |
| 10,563,456 | B2 | 2/2020 | Bodurka |
| 10,597,928 | B2 | 3/2020 | Cate |
| 10,641,030 | B2 | 5/2020 | Trundle |
| 10,679,476 | B2 | 6/2020 | Bretschneider |
| 10,713,869 | B2 | 7/2020 | Morris |
| 10,810,817 | B2 | 10/2020 | Daniel-Wayman |
| 10,837,216 | B2 | 11/2020 | Cheng |
| 10,846,956 | B2 | 11/2020 | Cate |
| 10,846,960 | B1 * | 11/2020 | Lemberger ............ G06V 40/172 |
| 10,880,526 | B2 | 12/2020 | Fitzgibbon |
| 10,927,583 | B2 | 2/2021 | Fitzgibbon |
| D914,076 | S | 3/2021 | Abel |
| 10,952,016 | B2 | 3/2021 | Shinar |
| 11,040,841 | B2 | 6/2021 | Olmsted |
| 11,443,517 | B1 * | 9/2022 | Kalagher ................ G06V 20/52 |
| 2003/0081747 | A1 | 5/2003 | Ahlstrom |
| 2005/0207616 | A1 | 9/2005 | Brad |
| 2009/0229190 | A1 | 9/2009 | Daniel-Wayman |
| 2009/0231121 | A1 | 9/2009 | Daniel-Wayman |
| 2009/0231427 | A1 | 9/2009 | Fitzgibbon |
| 2010/0159846 | A1 | 6/2010 | Witkowski |
| 2010/0171588 | A1 | 7/2010 | Chutorash |
| 2019/0063140 | A1 | 2/2019 | Trundle |
| 2019/0303684 | A1 | 10/2019 | Khadloya |
| 2019/0390504 | A1 | 12/2019 | Cheng |
| 2019/0390540 | A1 | 12/2019 | Livescu |
| 2019/0392691 | A1 | 12/2019 | Cheng |
| 2020/0355015 | A1 | 11/2020 | Cate |
| 2021/0189787 | A1 | 6/2021 | Dreyer |

OTHER PUBLICATIONS

Wijnhoven, Rob G. J., and Peter H. N. de With. "Identity Verification Using Computer Vision for Automatic Garage Door Opening." IEEE Transactions on Consumer Electronics, vol. 57, No. 2, May 2011, pp. 906-914. IEEE Xplore, https://doi.org/10.1109/TCE.2011.5955239. (Year: 2011).*

OpenCV: Introduction to SIFT (Scale-Invariant Feature Transform). https://docs.opencv.org/4.1.0/da/df5/tutorial_py_sift_intro.html. Accessed Nov. 22, 2023. (Year: 2019).*

Kim, Deok-Hwa, and Jong-Hwan Kim. "Visual Loop-Closure Detection Method Using Average Feature Descriptors." Springer International Publishing, 2014, pp. 113-118. Springer Link, https://doi.org/10.1007/978-3-319-05582-4_10 (Year: 2014).*

Kalal, Zdenek, Krystian Mikolajczyk, and Jiri Matas. "Tracking-learning-detection." IEEE transactions on pattern analysis and machine intelligence 34.7 (2011): 1409-1422. (Year: 2011).*

You, Shaoze, et al. Tracking System of Mine Patrol Robot for Low Illumination Environment. arXiv:1907.01806, arXiv, Oct. 21, 2019. arXiv.org, https://doi.org/10.48550/arXiv.1907.01806. (Year: 2019).*

Saadouli, Ghaida, et al. "Automatic and secure electronic gate system using fusion of license plate, car make recognition and face detection." 2020 IEEE International Conference on Informatics, IoT, and Enabling Technologies (ICIoT). IEEE, 2020. (Year: 2020).*

Zhu, Jingbo, et al. "Confidence-based stopping criteria for active learning for data annotation." ACM Transactions on Speech and Language Processing (TSLP) 6.3 (2010): 1-24. (Year: 2010).*

Building a Smart Garage Door Opener with AWS DeepLens and Amazon Rekognition | AWS Machine Learning Blog. Apr. 29, 2020, https://web.archive.org/web/20200501150211/https://aws.amazon.com/blogs/machine-learning/building-a-smart-garage-door-opener-with-aws-deeplens-and-amazon-rekognition/. (Year: 2020).*

BRIEF (Binary Robust Independent Elementary Features); OpenCV: Dec. 20, 2019; 2 pages, https://docs.opencv.org/4.2.0/dc/d7d/tutorial_py_brief.html.

Disclosing YouTube Video entitled "Summon and Autopark Tesla Model S in a garage" https://www.youtube.com/watch?v=dFJ0x5qTFJ4; published Jan. 16, 2016; 22 pages. Disclosing Screen Captures and Audio Transcription.

Featuring Matching; OpenCV; Dec. 20, 2019, 4 pages, https://docs.opencv.org/4.2.0/dc/dc3/tutorial_py_matcher.html.

Fei Wang, Mengqing Jiang, Chen Qian, Shuo Yang, Cheng Li, Honggang Zhang, Xiaogang Wang, Xiaoou Tang, SenseTime Group Limited, Tsinghua University, The Chinese University of Hong Kong, Beijing University of Posts and Telecommunications; Residual Attention Network for Image Classification; Apr. 23, 2017, 9 pages.

Histogram of Oriented Gradients—skimage v0.10.0 dev0 docs, Scikit-image; 2 pages; https://scikit-image.org/docs/dev/auto_examples/features_detection/plot_hog.html, believed to be publicly available before Jul. 14, 2020.

Histogram of Oriented Gradients (and car logo recogition); Pyimagesearch 2021; 35 pages; https://gurus.pyimagesearch.com/lesson-sample-histogram-of-oriented-gradients-and-car-logo-recognition/.

ORB (Oriented FAST and Rotated BRIEF); OpenCV; Dec. 20, 2019; 2 pages; https://docs.opencv.org/4.2.0/d1/d89/tutorial_py_orb.html.

Satya Mallick; Histogram of Oriented Gradients Explained Using OpenCV; Dec. 6, 2016; 10 pages; https://learnopencv.com/histogram-of-oriented-gradients/.

Straight Line Hough Transform—skimage v0 19.0.dev0 docs, Scikit-image; 3 pages; https://scikit-image.org/docs/dev/auto_examples/edges/plot_line_hough_transform.html, believed to be publicly available before Jul. 14, 2020.

Zhaozheng Yin, Ruwen Qin, and Md Moniruzzaman; Spatial Attention Mechanism for Weakly Supervised Fire and Traffic Accident Scene Classification; Report #MATC-MS&T: 137-1; Mid-America Transportation Center; Final Report WBS:25-1121-005-137-1; Jun. 2019; 32 pages.

* cited by examiner

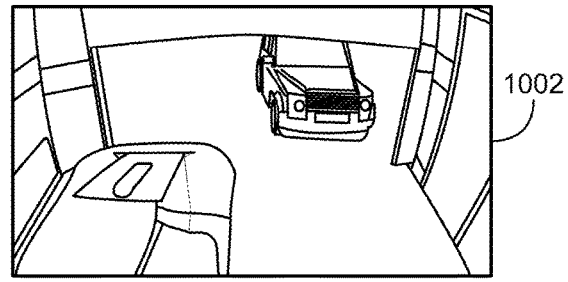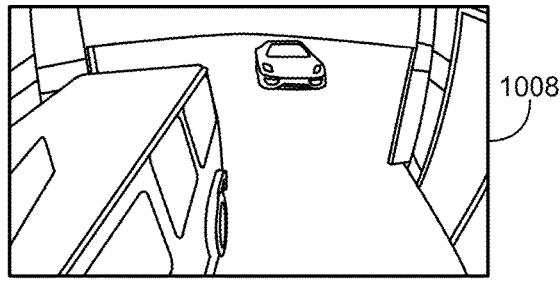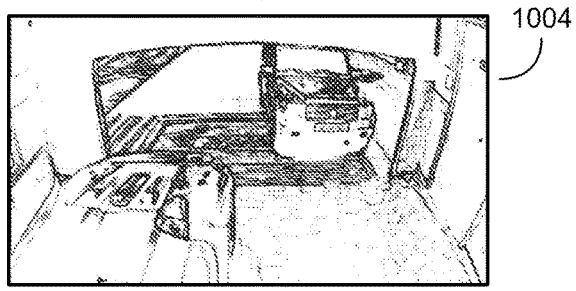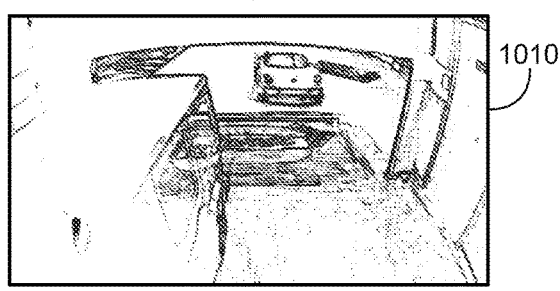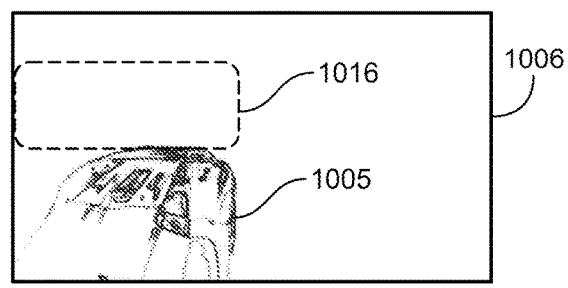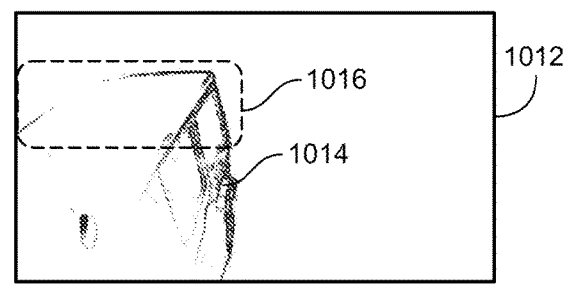
FIG. 10A  FIG. 10B

OBJECT MONITORING SYSTEM AND METHODS

CROSS-REFERENCE TO RELATED APPLICATIONS

This application claims the benefit of U.S. Provisional Application No. 63/076,728, filed Sep. 10, 2020, and U.S. Provisional Application No. 63/051,446, filed Jul. 14, 2020, which are both hereby incorporated herein by reference in their entireties.

FIELD

This disclosure relates to image processing systems, and more particularly, to image processing systems for determining one or more conditions of a secured area such as a garage.

BACKGROUND

Users often desire to monitor aspects of a secured area such as a parking spot or a garage remotely. Many systems allow users to monitor the state of their garage door via a smartphone application. These current systems use sensors, such as tilt sensors, mounted on or near the garage door to enable the state of the garage door to be monitored. Other systems include a camera, such as a security camera, that captures images or video of the interior of a garage.

BRIEF DESCRIPTION OF THE DRAWINGS

FIGS. 10A-B show an example region of interest the object monitoring system of FIG. 1 may use to differentiate conditions.

Figure 1:
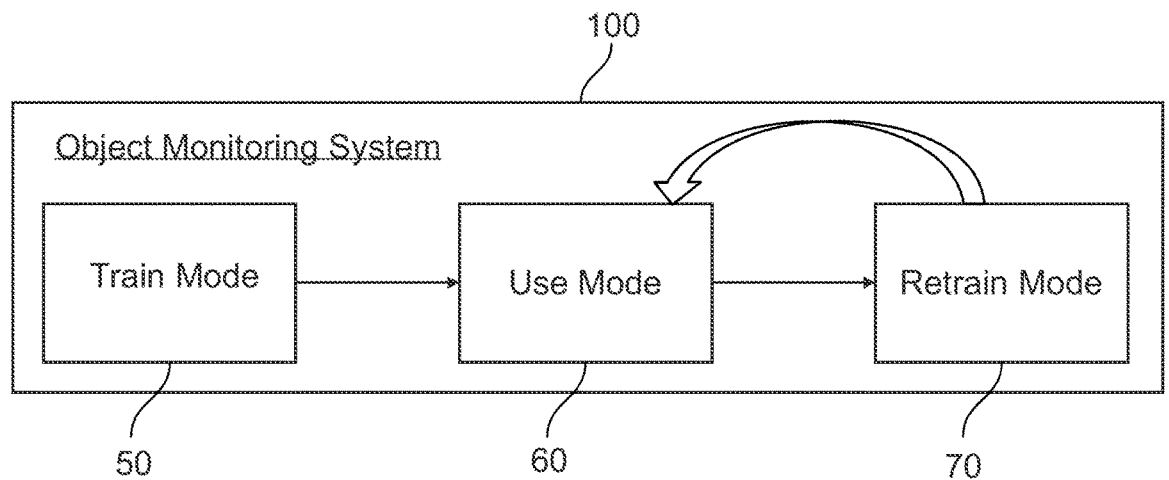
FIG. 1 is an example block diagram of an object monitoring system having different modes of operation.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

This disclosure is directed to various apparatuses, systems, and methods for object monitoring and detection. The system may include one or more cameras to capture reference images of the interior of a secured area such as a garage. The system may categorize the captured images of the secured area as representing one or more conditions of the garage's interior and store the categorized images. The images may be categorized relative to state changes of the garage door and whether a vehicle is determined to have entered or exited the garage. The system trains one or more machine learning algorithms, which may utilize a neural network, to identify the conditions of the garage's interior.

The system may then process an image that was captured of the interior of the garage and utilize the trained machine learning algorithm to identify the condition of the garage in the image based at least in part on a comparison with reference data corresponding to the stored categorized images. The system may adapt, learn, or otherwise adjust the one or more machine learning algorithms to new conditions not previously categorized by updating or adding to the set of stored categorized images.

Knowing the condition of the garage may be useful to users in many ways. For example, users may receive an alert on their phone when a vehicle enters or exits their garage. As another example, where a user attempts to remotely start their vehicle when the garage door is closed, the vehicle may be prevented from starting when, for example, the vehicle includes an internal combustion engine. The user may be alerted, e.g., on their user device, that their garage door is closed and prompt the user to open the garage door before starting their vehicle. In yet another example, when the system detects that no vehicles are in the garage, the system may adjust the thermostat of the garage or of the home. The system may also lock one or more doors of the garage or the user's home based at least upon whether the system determines whether there is a vehicle in the garage. As yet another example, the system may activate a security system of the home upon the system determining that one or more of the cars normally parked in the garage have left the garage.

While many examples of the object presence detection system 100 throughout this disclosure make reference to the interior of a garage, the application of system 100 is not constrained to such a context. For example, the system 100 may be installed and used in a warehouse, shop, barn, boathouse, carport, parking garage, parking spot, etc. The system 100 may also be configured to monitor an exterior of a garage, e.g., a driveway.

Operating Modes

With reference now to FIG. 1, operating modes of an object monitoring system 100 for learning and monitoring the one or more conditions of the garage are shown. The object monitoring system 100 (also referred to as "system 100" herein) may include one or more cameras for capturing images, such as pictures or video, of the interior of a garage. The one or more conditions that may be learned and monitored may be, for example, that a vehicle is present within a certain parking spot of the garage or that a garage door is open. The conditions of the garage may vary based on how many garage doors the garage has and how many cars are to be parked within the garage.

Figure 2:
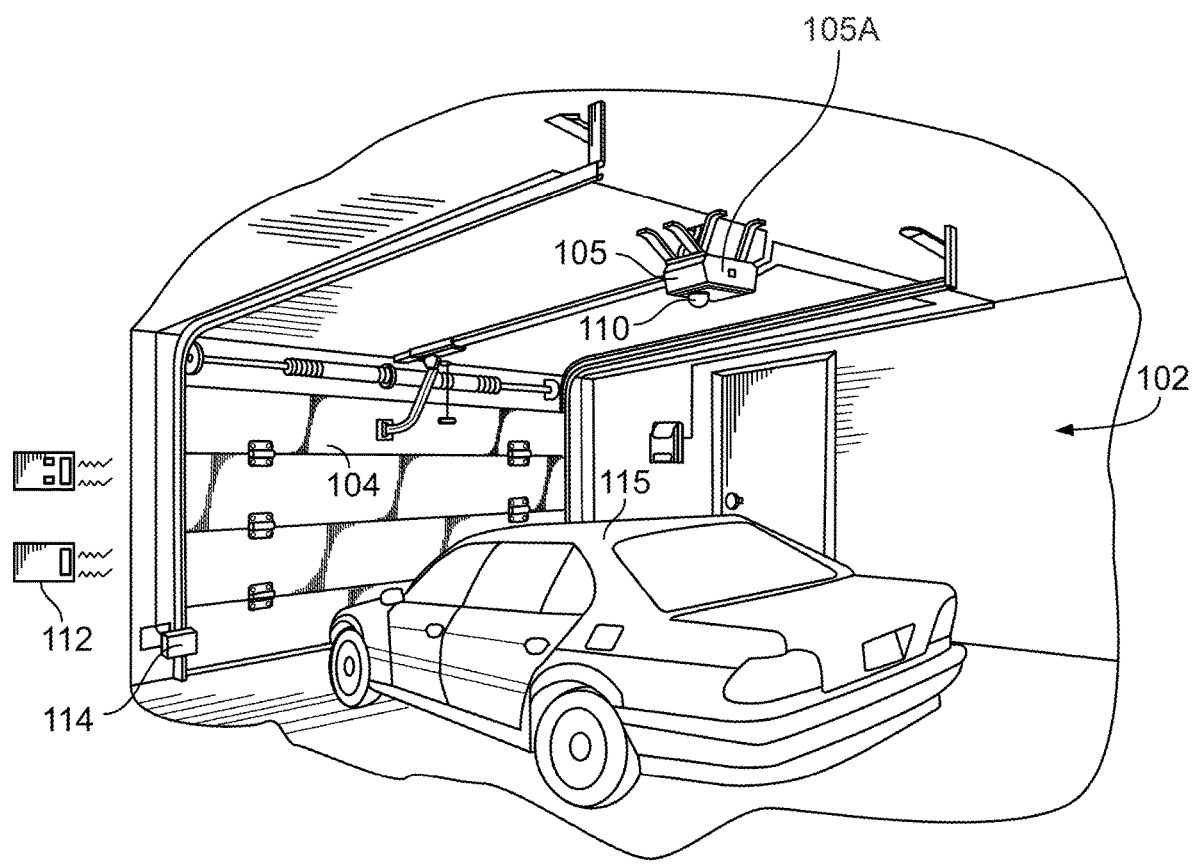
FIG. 2 shows an example of the object monitoring system of FIG. 1 in a garage.

Regarding FIGS. 1 and 2, the system 100 may initially enter a train mode 50 where the system 100 determines a set of one or more possible conditions that may be present in the garage 102 and captures one or more reference images of the interior of the garage in each condition. The system 100 may determine various conditions of the garage by processing images of the interior of the garage. Once the conditions present in each image have been determined, the image is associated with the conditions identified in the image and stored. Once the system 100 has captured a sufficient number of images for each condition the system 100 identifies, the system 100 may process the images associated with each condition to determine one or more features that are present for a certain condition to exist. For example, the system 100 may generate a mask and/or feature map associated with each condition to which new or uncategorized images may be compared.

Once the system has been initially trained, the system 100 operates in a use mode 60 where the system 100 identifies a condition of the garage using a new image of the interior of the garage. The new image may have recently been captured by the one or more cameras of the system 100. The new image is compared with the reference data from the train mode 50, such as feature maps categorized for each identified condition, for example, using a condition identification algorithm. Based on the comparison, the system 100 determines the condition of the garage present in the new image.

If a new image, when compared to the stored feature maps, does not match the identified conditions of the garage, the system 100 may determine that an unidentified state or condition exists or, alternatively, that the categorized images and/or resulting feature maps representing the identified conditions are not sufficient. To address this non-matching situation, the system 100 may enter a retrain mode 70. The system 100 may also enter the retrain mode 70 periodically to update or refresh the set of categorized images representing the identified conditions. In the retrain mode 70, the system 100 may again collect images and identify one or more condition present in the image(s) as in the train mode 50. The system 100 may store the image(s) categorized for the condition(s) for subsequent comparison to new images.

Example System Components

With reference to FIG. 2, a garage 102 is monitored by the system 100. The garage 102 includes a movable barrier operator 105 and a camera 110. The movable barrier operator 105 may move a movable barrier, such as a garage door 104 or a gate, between open and closed positions in response to a state change request, command, or signal from one or more remote controls 112, such as an exterior keypad, an in-dash transmitter of a vehicle, and/or a user device 170 (see FIG. 3). As shown in FIG. 2, the camera 110 may be attached to, or a component, of the movable barrier operator 105. For example, the camera 110 may be integrated with, or attached to the housing of the movable barrier operator 105. As another example, the camera 110 may be separate from the movable barrier operator 105 and mounted on a shelf or wall of the garage 102.

A vehicle 115 is shown parked in the garage 102. The garage 102 may include more than one garage door 104 and/or movable barrier operators 105 (e.g., a movable barrier operator for each movable barrier). The movable barrier operator 105 may have one or more internal sensors (e.g., an optical encoder) configured to detect the position of the garage door 104, whether the garage door 104 is moving, and/or the direction of movement of the garage door 104. The movable barrier operator 105 may include a head unit 105A and one or more peripheral devices in communication with the head unit 105A. The peripheral devices may include a door position sensor 150 (FIG. 3), e.g., a tilt sensor, which may be attached to the garage door 104 for monitoring the state of the garage door 104. The peripheral devices may include a photobeam or photoeye system 114 in communication with the head unit 105A to detect whether obstacles are present in the path of the garage door 104.

Figure 3:
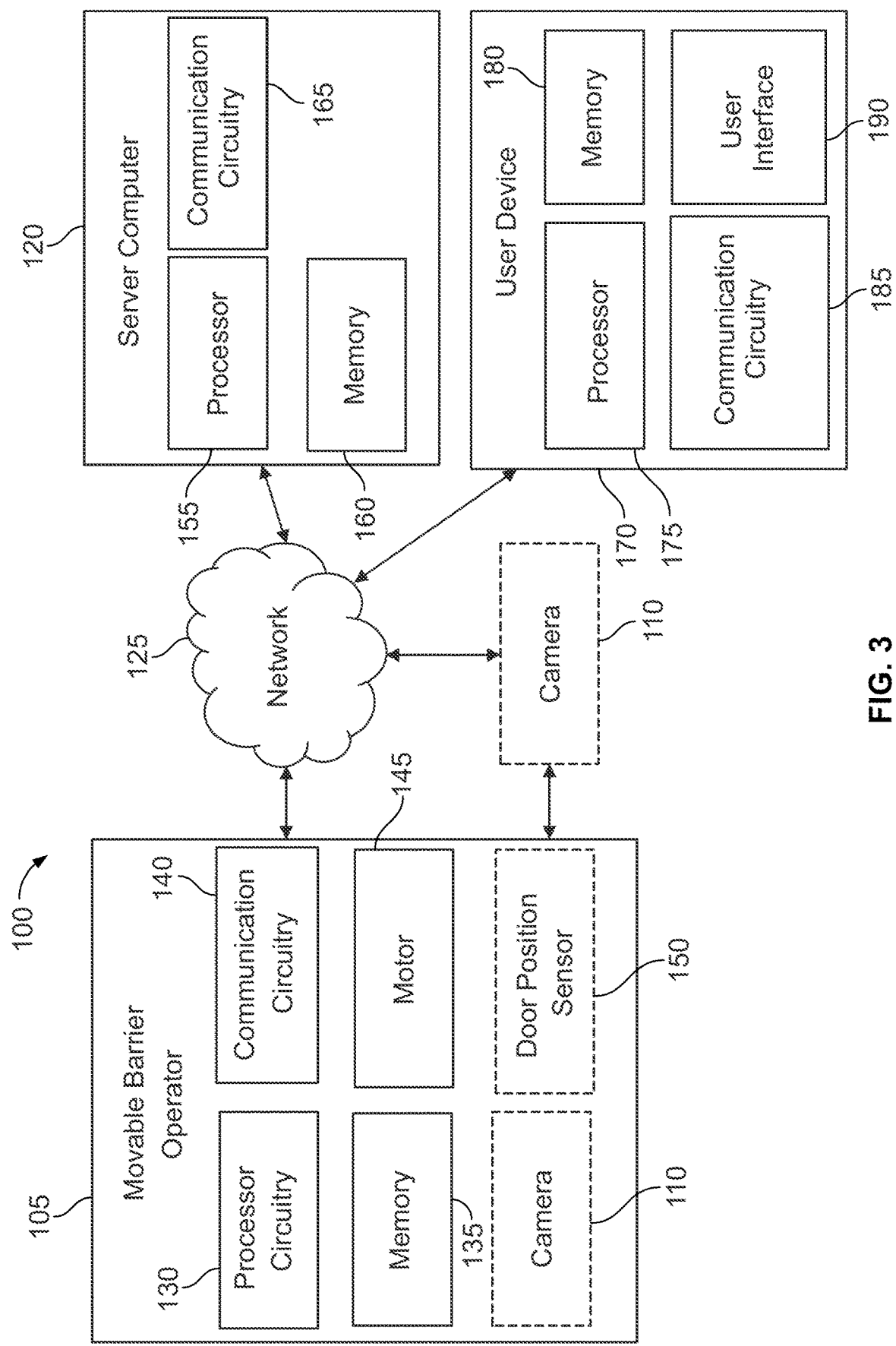
FIG. 3 is an example block diagram of components of the object monitoring system of FIG. 1.

With reference to FIG. 3, the movable barrier operator 105 communicates with a server computer 120 over a network 125. The network 125 may include, as examples, the internet, a Wi-Fi network, and/or a cellular network. As an example, the movable barrier operator 105 communicates over the internet via a Wi-Fi network, such as a Wi-Fi network of a home associated with the garage 102. In another example, the movable barrier operator 105 communicates over the internet via wired connection, for example, an ethernet connection.

The movable barrier operator 105 includes a processor circuitry 130 operably coupled to a memory 135, communication circuitry 140, and a motor 145. The movable barrier 105 operator may include or be in communication with one or more cameras 110. The processor circuitry 130 is configured to operate and control the motor 145. The motor 145 may be operably coupled to the garage door 104, such that when the motor 145 is operated the state of the garage door 104 is changed. The states of the garage door 104 may include open, closed, moving, opening, and/or closing as some examples. The processor 130 is further configured to communicate with remote devices such as the server computer 120 via the communication circuitry 140. The communication circuitry 140 may be further configured to receive state change requests from remote controls 112 such as radio frequency transmitters, smartphones, and other user devices. In response to the communication circuitry 140 receiving a state change request, the processor circuitry 130 may cause the motor 145 to change the state of the garage door 104. The processor circuitry 130 may also cause the camera 110 to capture images upon the motor 145 changing the state of the garage door 104. The processor 130 may receive the images from the camera 110 and cause the captured image(s) to be stored (e.g., in memory 135 or remotely) and/or process them.

The communication circuitry 140 is configured to communicate with remote devices such as the server computer 120, peripheral devices, and remote controls using wired and/or wireless protocols. In embodiments where the camera 110 is separate from the movable barrier operator 105, the communication circuitry 140 may be configured to communicate with the camera 110 directly or via network 125 and server computer 120. The movable barrier operator 105 may control when the camera 110 captures images and may receive images captured by the camera 110 and store the images in memory, e.g., memory 135. The communication circuitry 140 may communicate with the camera 110 via a wired or wireless connection, for example, one or more of power line communication, ethernet, Wi-Fi, Bluetooth, Near Field Communication (NFC), Zigbee, Z-Wave and the like.

The communication circuitry 140 may be in communication with the door position sensor 150. The door position sensor 150 may detect the state of the garage door 104 and communicate the state to the movable barrier operator 105. The movable barrier operator 105 may communicate the state to server computer 120. The door position sensor 150 may include as examples, a tilt sensor, one or more contact closure switches or tracks of the garage door 104, and/or a door position sensor (e.g., a linear or rotary encoder) of the movable barrier operator 105 that monitors movement of one or more transmission components of the movable barrier operator 105. As an example, the door position sensor 150 may include an optical interrupter detector that detects revolutions of a component of the transmission of the movable barrier operator 105.

The server computer 120 includes a processor 155, memory 160, and communication circuitry 165. The processor 155 is in communication with the memory 160 and communication circuitry 165. The server computer 120 may include one or more server computers. The server computer 120 is configured to communicate with the movable barrier operator 105 via the network 125. The processor 155 may be configured to process the images captured by the camera 110 to determine the condition of the garage 102. The memory 60 of the server computer 120 may store one or more algorithms for processing images captured by the camera 110 and/or stored in memory 160.

The user device 170 includes a processor 175, memory 180, communication circuitry 185, and a user interface 190. The user device 170 may include, as examples, a smartphone, smartwatch, wearable device, and tablet computer or personal computer. In embodiments, the user device 170 includes an in-vehicle device such as a human machine interface (HMI) of the vehicle. Examples of HMIs include center stacks, dashboards, an in-vehicle device or system for telematics, infotainment, and navigation, and heads-up displays. The user device 170 may operate an application that is configured to control the movable barrier operator 105 and/or the camera 110. The user interface 190 may be configured to receive a user input that causes the user device 170 to carry out one or more commands via the processor 175. The user interface 190 may include, for example, at least one of a touchscreen, a microphone, a mouse, a keyboard, a speaker, an augmented reality interface, or a combination thereof. The processor 175 may instantiate one or more applications, for example, a client application for controlling the movable barrier operator 105 and/or camera 110. The processor 175 may communicate with the movable barrier operator 105 and/or the server computer 120 via the communication circuitry 185 to carry out requests from a user. The communication circuitry 185 of the user device 170 may communicate with the movable barrier operator 105 via the network 125 and the server computer 120, for example, to send a state change request to open or close the garage door 104. The user device 170 may communicate control commands to the movable barrier operator 105 via a server computer 120 associated with the instantiated application and/or movable barrier operator 105 or via network 125.

Figure 4:
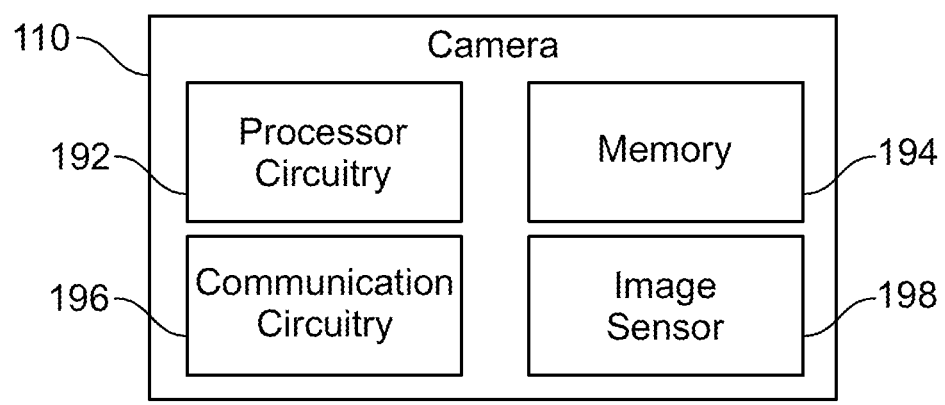
FIG. 4 is an example block diagram of a camera of the object monitoring system of FIG. 3.

With reference to FIG. 4, the camera 110 includes processor circuitry 192, memory 194, communication circuitry 196, and an image sensor 198. The processor circuitry 192 may be configured to control the image sensor 198 to cause the image sensor to capture images. The processor circuitry 192 may be configured to store the captured images in memory 194 and/or communicate the captured images to the movable barrier operator 105 and/or server computer 120 via communication circuitry 196. The camera 110 may be configured to capture images of the garage, e.g., the interior of the garage. The camera 110 may be mounted in the garage. The field of view captured by the camera 110 can be set by the person who installs the camera 110 and/or by a subsequent end user. In one approach, the field of view of the camera 110 is remotely adjustable (e.g., able to pan and tilt) to permit post-installation adjustments. In one embodiment, the camera 110 is mounted to, or is a component of, the movable barrier operator 105 and the camera 110 is configured or directed toward an area of interest such as a portion or portions of the garage floor and/or the garage door 104. In another embodiment, the camera 110 is mounted to a shelf, wall, or ceiling within the garage. The camera 110 may be angled such that images captured by the camera 110 include at least a portion of the interior of the garage. The at least a portion of the garage may include at least a portion of one or more garage doors and a portion of one or more parking spots within the garage. The camera 110 may be positioned such that at least a portion of a vehicle parked in a parking spot within the garage is visible in the images captured by the camera 110. Some embodiments may include more than one camera 110, for example, a camera 110 integral with the movable barrier operator 105 and a camera 110 mounted in a corner of the garage for a broader or different field of view.

The camera 110 may be a camera capable of capturing video or a video stream of the interior of the garage. In one example, the camera 110 includes an image sensor capable of taking a series of images in rapid succession, for example, in a range of 24 to 250 frames per second, such as approximately 60 frames per second. The camera 110 may be a high-resolution camera. In one example, the camera 110 has a wide-angle lens capable of capturing a substantial portion of the interior of the garage in a single image. A single image that captures a substantial portion of the garage's interior may in some instances eliminate multiple cameras to monitor multiple garage doors (e.g., one camera per garage door) or parking spots (e.g., one camera per parking spot) within the garage.

The processor circuitry 192 of the camera 110 may be configured to receive control signals from the processor circuitry 130 of the movable barrier operator 105 via the communication circuitry 196. For example, the camera 110 may capture images in response to a control signal from the processor circuitry 130 of movable barrier operator 105 to capture image(s). In the embodiment where the camera 110 is integral with the movable barrier operator 105, the camera 110 may be in direct communication with the processor circuitry 130. Processor circuitry 130 may be or include processor circuitry 192. In an embodiment where the camera 110 is separate from the movable barrier operator 105, the camera 110 may communicate with the processor circuitry 130 of the movable barrier operator 105 via the communication circuitry 196. The camera 110 may include memory 194 for storing captured images. Additionally and/or alternatively, the camera 110 may transmit all or a portion of the captured images to the movable barrier operator 105 to store in memory 135. The processor circuitry 192 may perform edge processing to reduce the data communicated from camera 110 to the movable barrier operator 105 and/or the server computer 120. For example, the processor circuitry 192 may utilize a buffer that temporarily stores images and discards images stored in the buffer after a predetermined period of time if the images are not utilized. In another embodiment, the camera 110 is connected via communication circuitry 196 to the network 125. Upon recording one or more images, the images are transmitted to a remote computer, such as the server computer 120, for processing and/or storage. The camera 110 may also receive control signals to record or capture images from the server computer 120. The camera 110 may receive these signals via the network 125 or via the movable barrier operator 105. The camera 110 may include communication circuitry 196 for communicating over the network 125 or may communicate with server computer 120 via the movable barrier operator 105.

In general, the system 10 has one or more processors that individually or cooperatively perform processing functions for the system 10 such as the train, run, and/or retrain modes discussed below. For example, the processor of the system 10 may be the processor circuitry 130, processor 155, processor 175, and/or processor circuitry 192 for a given operation. The processor of the system 10 may include a microprocessor, an application-specific integrated circuit, a digital circuit, and/or cloud-based processing as some examples.

Similarly, the system has a non-transitory computer readable storage medium that store data, machine learning models, image data, mask data, etc. For example, the memory of the system 10 may include the memory 135, memory 160, memory 180, and/or memory 194. The memory may include, for example, random access memory, read-only memory, a hard disk drive, and/or virtual storage media such as cloud-based storage. Broadly speaking, the memory may utilize an optically readable storage media, magnetically readable storage media, electrical charge-based storage media, and/or a solid state storage media.

Train Mode

The system 100 operates in at least two modes including a train mode 50 and a use mode 60. While the discussion and examples presented herein often refer to the system 100 as operating in the various modes, the operations of the system 100 in one or more modes may be performed by one or more components of the system 100, for example, the camera 110, the movable barrier operator 105, and/or server computer 120. In the train mode 50, the system 100 learns various conditions that may occur in the garage. The system 100 captures images of the interior of the garage, determines the condition present in the images, and stores the image(s) representing each condition in memory. The system 100 generates one or more feature maps representing each identified condition based on the categorized images stored in memory. Once the system has captured a sufficient number of images representing each condition of the garage, the system 100 may enter the use mode 60 wherein the camera 110 captures an image and the system 100 identifies the condition of the garage 102 by comparing the captured image with the categorized images and/or feature maps stored for each condition in the train mode 50.

Figure 5A:
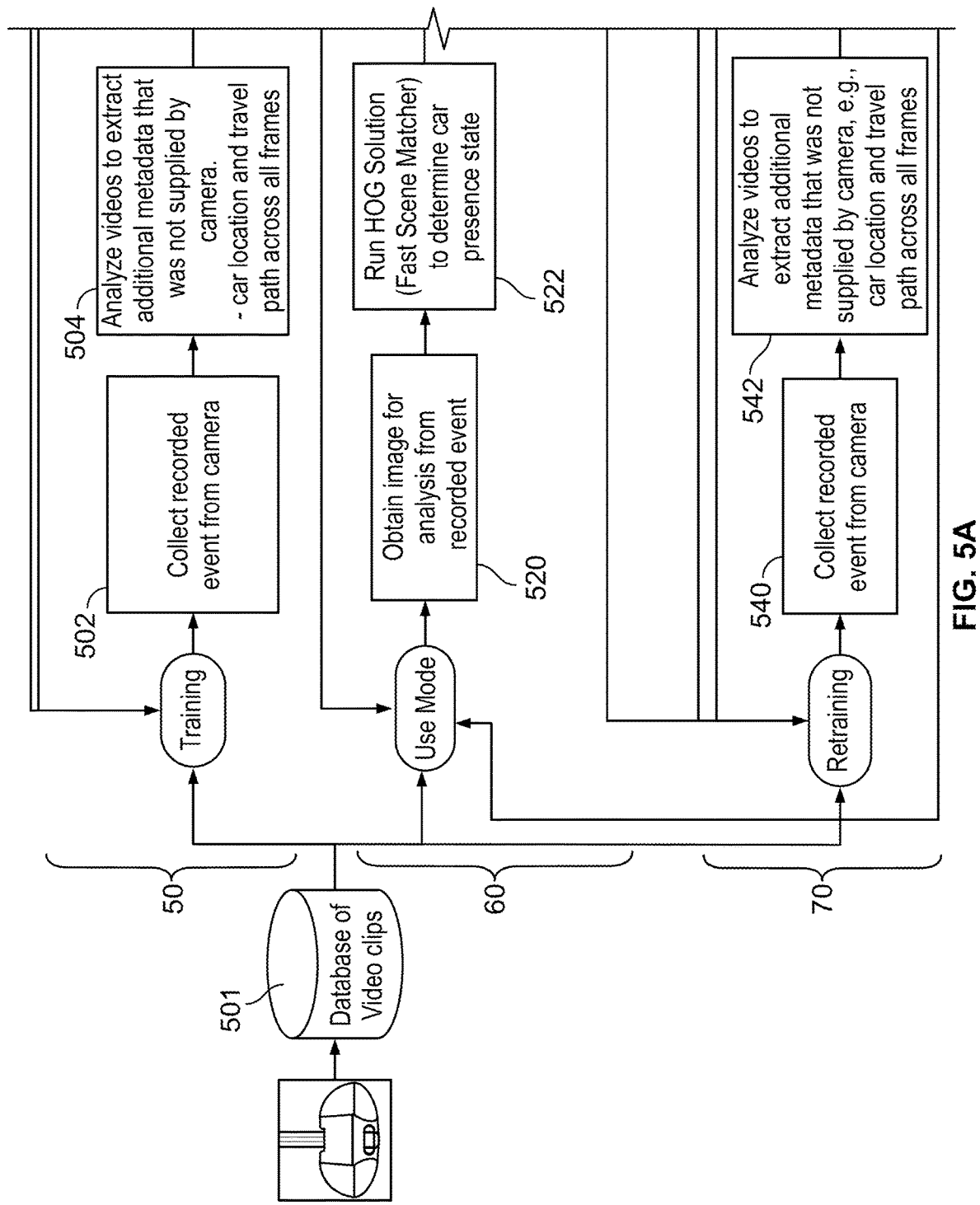
FIGS. 5A-B illustrate an example flow diagram of a method the object monitoring system of FIG. 1 may utilize to process images and identify one or more conditions of the garage.
Figure 5B:
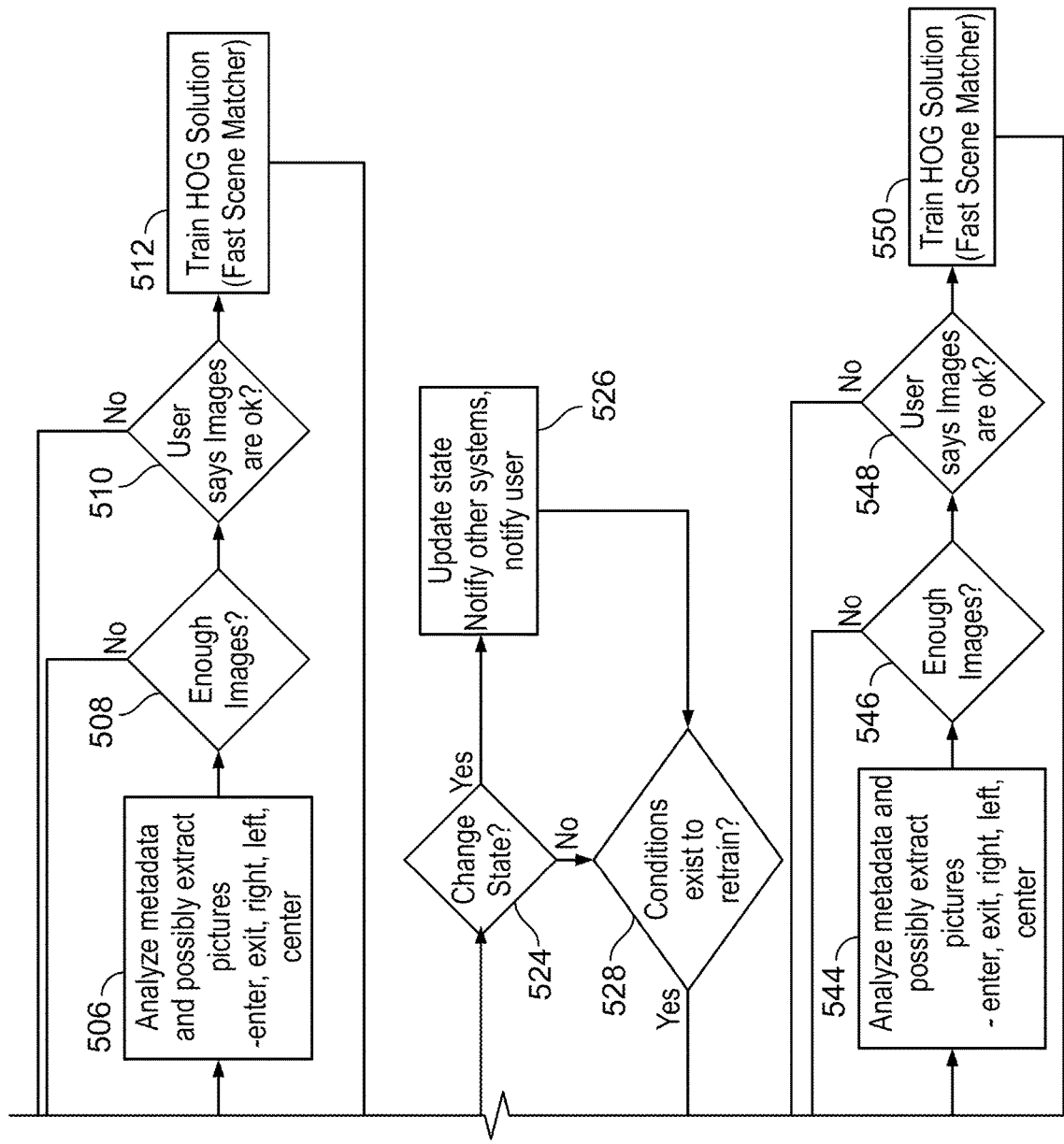

A flowchart showing an example operation of the system 100 is shown in FIGS. 5A-5B. In the train mode 50, the system 100 captures images of the interior of the garage 102. The images may be frames of a video recorded by camera 110. The system 100 may retrieve or collect 502 these images from a database 501 of images or video clips recorded by the camera 110. The camera 110 may tag or otherwise associate metadata with at least one image frame captured by the camera 110. The metadata may include, as examples, the time the image was captured, the duration of a recorded event, and the pixel change percentage between image frames. Information relating to the state of the garage door from the movable barrier operator 105 may be associated with each captured image. In some embodiments, the camera 110 may process the image frames. The camera 110 may, for example, determine the presence and position of objects within the images by running an object detection algorithm on the image frames. The camera 110 may also track the position of any detected objects across the image frames. Any data extracted or determined by the camera 110 may be associated with the captured images.

The images captured in train mode 50 may be categorized and stored according to the condition they represent. For example, images determined to represent "condition 1" are stored or associated with other images determined to represent "condition 1." The images associated with a condition are compared with each other and with images associated with the other conditions. To categorize each image, such as categorizing the image as "condition 1", the system 100 analyzes 504 the images captured by the camera 110 to extract metadata from the images. The analysis 504 may include extracting specific features from the pixels of the images captured by the camera 110 and metadata from the images. The extracted metadata may include the position of the vehicle within the images (e.g., X-Y coordinates of the vehicle within the image or an identification of the pixels constituting the vehicle) the at the time the image was captured. Using the vehicle position, the system 100 may determine a travel path of the vehicle across a series of frames.

The system 100 may then analyze 506 the extracted metadata to determine which condition is present within the images. For example, the system 100 may determine from the metadata across a series of the images that a vehicle entered the garage 102 and parked in the left parking spot. The system 100 may then categorize one or more images of the processed pictures or video as representing the condition that was identified in analyzing the metadata. The system 100 may continue collecting 502 and analyzing 504, 506 images as described above until the system 100 determines 508 that a sufficient number of images have been stored for each identified condition of the garage, for example, five images. The system 100 may optionally present 510 one or more of the categorized images of the conditions to the user for confirmation that the condition present within the image (s) has been accurately identified. Where more images are captured than are needed for a single condition, the system 100 may discard the additional images.

The system 100, upon capturing and categorizing the images, may then perform an intra-category comparison to compare the categorized images of a condition to determine which features extracted from the images are present across all or a threshold percentage of the images of the condition. As an example, the system 100 may determine which features are present in at least 80% of the images associated with a condition. The system 100 may further determine which features are not present in any images of the condition or which features are not present in more than a threshold percentage of the images, e.g., more than 90%. The system 100 may also determine which features are not relevant to the categorization of the image as representing that condition (e.g., whether the feature is present in the image does not matter to a determination of whether the condition is present). Once this intra-category comparison of the images has been completed for a condition, the system 100 is able to create one or more feature maps for the condition that represents the features that are present at specific region(s) of a new image for the new image to be found to correspond to an identified condition. The feature map may be a matrix of extracted features and an associated matrix mask, indicating which features should be present at a particular grid location of the new image. As another example, the feature map may represent a list of extracted features and a corresponding list of regions, such as rectangles, indicating the locations within a new image that the identified features should be detected in order for a new image to correspond to the condition associated with the feature map. The system 100 may then use the generated feature maps to train 512 the system 100 for identification of the various conditions in the use mode 60. The details of the operation of the system 100 in the use mode 60 are discussed below in the Use Mode section. The system 100 may use a more resource intensive algorithm in the train mode 50 to develop the feature masks. The system 100 may use a less resource intensive algorithm to identify the conditions during the use mode 60 based on the feature maps generated during the train mode 50. An example of a less resource intensive algorithm is the Fast Scene Matcher discussed below which may process the captured images using a Histogram of Oriented Gradients (HOG) algorithm.

As discussed above, the train mode 50 may begin with the system 100 collecting a series of images of the interior of the garage 102 and grouping the images into various categories that represent particular conditions of the garage 102. In some embodiments, the conditions may each represent a single state of the garage environment. For example, a condition may be whether or not the garage door is open and another condition may be whether or not a vehicle 115 is parked in a certain parking spot within the garage. In other embodiments, the condition of the garage includes the conditions of multiple changing features of the garage. For example, a condition may include both the state of the garage door and the presence of a vehicle in a certain parking spot.

To capture images of the various conditions of the garage, the camera 110 records a plurality of images of the interior of the garage 102 at various times. These images may be captured continuously, regularly, periodically, in response to user input, at certain times of day when the conditions are likely to change (e.g., 7-9 AM and 4-6 PM), and/or in response to a detected state change of a garage door 104 of the garage as some examples. The captured images and associated metadata may be stored in a memory of the system 100. The memory may be a memory of the camera 110, movable barrier operator 105, server computer 120, or other persistent storage accessible to either the camera 110 and/or the server computer 120 such as cloud storage or a network-connected database.

The images captured by the camera 110 may be used to determine the layout of the garage 102 and to determine the various possible conditions of the garage. In one embodiment, from the captured images the system 100 may determine the size of a vehicle 115 within the garage 102 relative to the overall image size. Determining the relative size of a vehicle (identified within the image of the inside of the garage) may reduce the likelihood of identifying a vehicle parked outside of the garage on the driveway or on the street as being a vehicle within the garage. For example, if an image captured after a garage door 104 has recently closed is determined to include a vehicle 115, the system 100 may determine that the image includes a vehicle 115 within the garage 102. The system 100 may determine state changes of the garage door 104 based on signals received from the movable barrier operator 105 and/or door position sensor 150. Based on the captured image, the system 100 may determine the approximate size that a vehicle 115 identified within an image should be relative to the size of the image or the field of view of the camera 110 to be inside the garage 102.

As another example, the system 100 may monitor the size of the detected vehicle 115 in the captured images over time. The images may be captured around the time the garage door 104 has changed states. In some examples, if the vehicle 115 is continuing to get larger (pixel-wise) in the images, the system 100 may determine that the vehicle 115 is still entering the garage 102. In other examples, the vehicle 115 may get larger (pixel-wise) in the images, and then get smaller as the vehicle pulls further into the garage 102. This may be due to the position of the camera 110 within the garage 102 and how far the vehicle 115 pulls into the garage 102. Once the vehicle 115 stops moving, the system 100 may determine whether the vehicle 115 has entered the garage 102, for example, using a photobeam system indicating a series of photobeam interruptions during the time the series of images were captured (two or more of the wheels of the vehicle 115 causing the interruptions). Upon determining the vehicle 115 has stopped moving and is within the garage 102, the system 100 may determine and store the relative size of the vehicle 115 visible within the image. In some examples, if the vehicle is continuing to get smaller within the series of images over a period of time, the system 100 may determine that the vehicle 115 was in the garage 102 before the vehicle 115 started moving. The system 100 may also consider the direction of the movement of the vehicle 115 relative to the image frame as the vehicle changes size within the image frame to determine whether the vehicle is entering or exiting. The system 100 may evaluate whether the vehicle 115 was in the garage 102 and exited (e.g., via the photobeam system) and determine and store the relative size of the vehicle 115 within the image where the vehicle 115 is determined to be within the garage 102. As another example, the system 100 may determine a size or dimension of a portion of the vehicle 115 relative to the size of the image frame (e.g., the width of the top of the vehicle 115) for determining whether the vehicle is entering or exiting the garage 102. The system 100 may use the size or dimensions of the vehicle where the vehicle is determined to be within the garage 102 for evaluating whether a vehicle in an image captured by camera 110 is inside or outside of the garage 102. Determining the dimension or a size a portion of the vehicle is when parked within the garage 102 may be useful where only a portion of the vehicle is visible when the vehicle is within the garage 102. The relative size or dimension of a vehicle or a portion thereof may also aid in determining the condition of the garage 102 where the direction of movement of the vehicle 115 is not known (e.g., only a still image is evaluated). The system 100 may further determine the type of vehicles that are stored within the garage and when vehicles are present or not.

The system 100 may also determine the physical layout of the garage. The determining may include, for example, learning how many vehicles may be parked within the garage (e.g., how many parking spots there are), how many garage doors are associated with the garage, the size and shape of the vehicles that park within the garage, where a specific vehicle type typically parks within a garage, how far into the garage a specific car typically parks, or a combination thereof. The system 100 may capture images of the interior of the garage over time, for example, images captured within a period of time before and after a state change of a garage door 104. The system 100 may be able to determine when a vehicle 115 is parked within the garage 102 based on the relative size and shapes of objects within the image, for example, using the vehicle size information described above. Detecting vehicles based on their size and shape may aid the system 100 in identifying vehicles 115 in the garage 102 that may not move during the period of time the system 100 is training, for example, a sports car that is not driven during the winter.

The system 100 may compare the captured images and determine the portion or region of the images containing a vehicle 115. The system 100 may analyze the relative positions of the identified vehicles 115 within the field of view of the camera across the captured images and determine regions within the image that are associated with parking spots within the garage. For example, if the system 100 determines that there are images where there are three vehicles parked within the garage at once, the system 100 may determine that the garage is a three-vehicle garage. The system 100 may identify parking spots within the garage 102 as the regions where each of the three vehicles are parked.

The system 100 may also detect and monitor the position of the garage doors 104 in the images over time to determine how many garage doors 104 the garage 102 has and which parking spots within the garage 102 are associated with each garage door 104. The system 100 may determine how many garage doors 104 the garage 102 has by analyzing the movement of objects within the captured images over time. For example, the images may show a moving door entering and exiting the field of view of the camera 110. When the moving door is partially out of field of view of the camera 110 and images show a vehicle 115 passing through the region where a moving door has been detected, the system 100 may determine that the moving door is a garage door (i.e., a door that a vehicle enters the garage through). The images may, for example, be images captured in temporal proximity to a state change of a garage door 104, for example, by receiving a signal or state change data from one or more movable barrier operators 105 and/or door position sensors 150.

The system 100 may determine and define the garage type of the garage 102. The garage type indicates how many garage doors 104 and how many parking spots the garage 102 has. For example, the system 100 may define the garage 102 as having one garage door 104 and one parking spot (1×1), one garage door 104 and two parking spots (1×2), two garage doors 104 and two parking spots (2×2), etc. The system 100 may determine the number and position of parking spots within the garage 102 by tracking the portions of the image where a vehicle 115 enters or exits. For example, when the system 100 determines a garage door 104 changes states, the system 100 may analyze the path of a vehicle detected in the images after the state change to determine the region of the image associated with the garage door 104. The system 100 may further analyze the movement of vehicles into and out of certain regions of the image frame. For example, the system 100 may determine that garage door 104 opens for two parking spots when it determines that a vehicle enters on the left portion and a vehicle enters on the right portion of the garage door 104 and that both vehicles may be present within the garage 102 simultaneously. If this is the only garage door 104 of the garage 102, the system may determine the garage is a 1×2 garage.

Once the system 100 identifies the garage type, the system 100 may use this garage type information to categorize captured images as representative of different conditions of the garage 102. For example, the system 100 may determine that the garage 102 has two parking spots and categorize captured images as having a vehicle 115 present or absent in at least one of the first parking spot and the second parking spot. In other examples, the system 100 receives the garage type from a user. For example, the system 100 may prompt the user to enter the number of garage doors 104 and parking spots of the garage 102.

Once the type of the garage is determined, the system 100 may determine all possible conditions of the garage that could be present based on the type of the garage. For example, if the system 100 determines that there are two garage doors, then the system knows that there are four possible different conditions of the garage doors, as shown in Table 1 below:

TABLE 1

| | Conditions | |
| --- | --- | --- |
| | Door 1 | Door 2 |
| Condition 1 | Closed | Closed |
| Condition 2 | Open | Closed |
| Condition 3 | Closed | Open |
| Condition 4 | Open | Open |

Based on the identified layout of the garage and the possible conditions of the garage, the system 100 may then capture a plurality of images of the interior of the garage 102 in each condition to store in memory. Identifying the physical layout of the garage 102 may allow the system 100 to determine when training is complete, i.e., when a sufficient number of images for each identified condition have been collected. In one embodiment, the system 100 may be programmed to only detect and monitor certain conditions. For example, the system 100 may be programmed to only monitor the state of each garage door and whether or not a vehicle is present in each parking spot. The system 100 may further monitor the type of vehicle parked in each parking spot. In another embodiment, the system 100 prompts a user to select the conditions the system 100 should learn and monitor. Such programming and/or prompting may be done through a website via a web browser or via a client application associated with the system 100. As an example, the user may select whether the system 100 monitors whether the garage door(s) is open, whether a vehicle is parked in either of two parking spots within the garage, and the vehicle type parked in each parking spot within the garage. For example in a two car garage with a single garage door, if the system 100 is set to monitor the state of the garage door and whether or not a vehicle is parked in each parking spot, the system 100 will capture a set of images of the interior of the garage for each of the conditions shown in Table 2 below:

TABLE 2

| | Conditions | | |
|---|---|---|---|
| | Parking Spot 1 | Parking Spot 2 | Door 1 |
| Condition 1 | Vehicle | Vehicle | Open |
| Condition 2 | Vehicle | No vehicle | Open |
| Condition 3 | No vehicle | Vehicle | Open |
| Condition 4 | No vehicle | No vehicle | Open |
| Condition 5 | Vehicle | Vehicle | Closed |
| Condition 6 | Vehicle | No vehicle | Closed |
| Condition 7 | No vehicle | Vehicle | Closed |
| Condition 8 | No vehicle | No vehicle | Closed |

The system 100 may also treat some conditions as related or unrelated to other conditions and create feature maps accordingly. For example, a single image may be identified to correspond to multiple related conditions. The image may be stored or associated with each of the related conditions. The related conditions may be the alternative conditions of a single concern. A concern may be, as an example, whether Parking Spot 1 is occupied. The conditions for this concern are that a vehicle is present or that no vehicle is present in Parking Spot 1. Thus, these conditions are related because they cannot both be true. For example, in Table 3, shown below, Condition 1 and Condition 2 are related to each other because the both relate to whether or not a vehicle is present in Parking Spot 1. Condition 1 and Condition 2 are unrelated to Conditions 3, 4, 5, and 6, however, because Conditions 3, 4, 5, and 6 do not indicate whether a vehicle is present in Parking Spot 1. Instead Conditions 3, 4, 5, and 6 show "Any" for Parking Spot 1 indicating Conditions 3, 4, 5, and 6 may be present regardless of whether a vehicle is present in Parking Spot 1 or not. The presence of a vehicle in Parking Spot 1 is thus not relevant to a determination that Conditions 3, 4, 5, or 6 are present. Captured images thus may be stored or associated with multiple conditions and multiple feature maps.

TABLE 3

| | Conditions | | |
|---|---|---|---|
| | Parking Spot 1 | Parking Spot 2 | Door 1 |
| Condition 1 | Vehicle | Any | Any |
| Condition 2 | No vehicle | Any | Any |
| Condition 3 | Any | Vehicle | Any |

TABLE 3-continued

| | Conditions | | |
|---|---|---|---|
| | Parking Spot 1 | Parking Spot 2 | Door 1 |
| Condition 4 | Any | No vehicle | Any |
| Condition 5 | Any | Any | Open |
| Condition 6 | Any | Any | Closed |

The system 100 may further be configured to monitor the type of vehicle parked in each spot, such that the system 100 creates a new condition for a specific vehicle in each parking spot, rather than generically detecting whether or not a vehicle is present in either spot. The system 100 may collect a series of images of each condition at varying lighting conditions, for example, at night, when garage door opener light is on, when the sun is shining into the garage, etc.

To categorize each image collected into a set of sample images and/or create a feature map of each condition of the garage, the system 100 determines which condition is depicted or shown in each image captured by the camera 110. In one embodiment, the system 100 may communicate with a user, instructing, requesting or prompting the user to move their vehicles 115 into or out of various parking spots within the garage 102 and additionally to move the garage door into various states to capture images of each condition. For example, the system 100 may request the user park both of their vehicles 115 in the garage 102 and shut the garage door. Once completed, the user may indicate to the system 100 that both vehicles are parked in the garage and the garage door is shut, for example, through a smartphone application associated with the system 100. The system 100 may then capture images of the interior of the garage 102 and store these images in a category representing two vehicles parked in the garage with the garage door closed. The system 100 may continue to instruct the user to move the vehicles into different locations and move the garage door to various states with the user then indicating when certain conditions within the garage are present. The system 100 may then capture and store images of each condition of the garage 102.

In another embodiment, the system 100 may periodically capture images of the interior of the garage 102 and prompt a user to answer questions about the image captured. The user may be prompted to answer questions via a website associated with the system 100 and/or via a smartphone application associated with the system 100. For example, the smartphone application may be associated with the server computer 120. In this embodiment, the system 100 may initially prompt the user to answer a series of questions to determine the layout of the garage 102. For example, the system 100 may ask the user how many parking spots are in the garage 102, how many garage doors 104 the garage 102 has, and/or what type of vehicles 115 the user has. The system 100 may then send an image of the interior of the garage 102 captured by the camera 110 to the user and ask the user to identify which conditions are present in the image.

The system 100 may be able to generate questions for the user to answer based on the layout identified by the user. In the example where there is a single garage door and two parking spots, the system 100 may send an image to the user and ask "Does this image show a vehicle parked in the left spot?", "Does this image show a vehicle parked in the right spot?", and/or "Does this image show the garage door closed?" In an example where the system 100 identifies the type of vehicle or which of the user's vehicles are within each parking spot of the garage 102, the system 100 may present multiple images to the user to confirm that the system 100 is able to accurately differentiate between the user's vehicles. For example, the system 100 may present an image to the user and ask "Does this image show a vehicle parked in the left parking spot?", and then present another image that it determines shows the same vehicle to be present and ask "Does this image show the same vehicle parked in the right parking spot?" After receiving responses from one or more users with answers to these questions, the system 100 is able to associate the image with an identified condition and store the image. Once the system 100 collects a sufficient number of images of each condition, the system 100 may operate in the use mode 60, described in detail below.

In yet another embodiment, the system 100 autonomously learns the conditions of the garage without any user input or only token user input. In this embodiment, the system 100 records and stores images captured around the time the garage door 104 changes states. The camera 110 may be configured to periodically record an image of the interior of the garage 102. As one example, the camera 110 is a video camera that is constantly recording images of the interior of the garage 102. As another example, the camera 110 captures images regularly or periodically, for example, once a second or once a minute.

In another embodiment, the system 100 captures and/or processes images captured at times relative to when a garage door 104 of the garage 102 changes states. A series of images captured before and after the garage door 104 changes states are more likely to include images that include two or more conditions of the garage 102. For example, a vehicle 115 may enter or exit the garage 102 once the garage door 104 is opened. If the garage door 104 closes, a vehicle 115 may have recently entered or exited the garage. Images captured relative to a detected movement of the garage door 104 may be stored and/or processed. For example, images captured two minutes before and/or after the garage door 104 has changed states may be separately stored or flagged for processing. As another example, the images that are stored and/or processed are images captured for one minute after the movable barrier operator 105 receives a state change request. The movement of the garage door 104 may be detected by a sensor associated with the system 100, for example, door position sensor 150. The system 100 may receive a control signal commanding the movable barrier operator 105 to change the state of the garage door 104 and determine that the state of the garage door 104 may or will be subsequently changed. The movable barrier operator 105 may send a signal indicating that the state of the garage door 104 has changed or may send a log of state changes of a garage door 104 indicating the time when the state of the garage door 104 was changed. The images captured by the camera 110 may be recorded with a time stamp or other indication of the time at which they were taken. The time at which a garage door 104 changed states may also be recorded for a comparison with the time stamp of captured images to determine which images should be processed.

The camera 110 may capture images (e.g., photographs or video) continuously and only save or permanently store the images captured within a certain time period relative to a state change of a garage door, e.g., within two minutes. In one example embodiment, the movable barrier operator 105 or server computer 120 determines the state change of the garage door 104. The movable barrier operator 105 may send or notify state change information to server computer 120. The server computer 120 may also receive or determine the time at which the state change occurred, e.g., by receiving an image from the camera 110 having a timestamp associated with the time the server computer 120 received a state change request from user device 170 to change the state change of the garage door 104. In this approach, the system 100 compares the image(s) of the garage 102 before the state change of the garage door 104 to the image(s) of the garage 102 after the state change to determine the condition of the garage before and after movement of the garage door 104.

As an example, the system 100 may gather or compare a series of images taken within a certain time period of the state change, e.g., within a minute of the state change. The system 100 may then process the series of images, for example, compare the images taken before the time of the state change with those taken after the state change. Differences in the images may indicate a condition change of the garage. As an example using a single stall garage with a single garage door, if a vehicle is parked within the garage and the garage door opens, the images captured before the garage door opened show a vehicle present within the garage with the garage door closed. The images captured after the garage door opens may include images showing the vehicle 115 exiting the garage along with images of the garage after the vehicle 115 has completely exited the garage with the garage door open. If the garage door 104 subsequently closes, the images captured before the garage door 104 closed may be those showing the garage door open with no vehicle in the garage. After the garage door has closed, the images may show images of no vehicle present in the garage with the garage door closed.

Similar images may also be captured when the vehicle 115 enters the garage. Continuing the example above, images just prior to the garage door opening may show the empty garage with a closed garage door. After the garage door has opened, the images may show the vehicle 115 entering the garage. Once the vehicle 115 has parked inside the garage, the camera 110 may capture images of the vehicle parked within the garage with the garage door open. Once the garage door is closed, the images will include an image of the garage with a vehicle 115 present with the garage door closed. Thus, images representing many conditions of the garage may be captured in temporal proximity to a state change of the garage door 104.

In some situations, the garage door 104 may be opened and closed without a vehicle entering or exiting. The system 100 may be in communication with a sensor that is able to provide information regarding whether a vehicle 115 enters or exits the garage. For example, the system 100 may include or be in communication with a photoeye or photobeam system that detects when an object is blocking the path of the door. If the photobeam detects two interruptions (e.g., caused by the front and back wheels of a vehicle) within a short period of time (e.g., three seconds), the system 100 may determine that a vehicle has entered or exited the garage. Where a vehicle is entering at an angle, three or four interruptions may be detected (e.g., an interruption for each wheel of the vehicle). The system 100 may also determine that a vehicle has entered or exited the garage when the photobeam is interrupted for a period of time that is similar to the period of time it takes for the length of a vehicle 115 to pass through the path of the garage door 104 when entering or exiting the garage. In another example, the system 100 may also use an inductive loop, a magnetic sensor, an ultrasonic sensor, radar sensor, temperature sensor (e.g. passive infrared—PIR) and/or optical sensor to detect the presence of a vehicle. In yet another example, the system 100 (e.g., the movable barrier operator 105 or camera 110) may receive a wireless signal from the vehicle 115 indicating the vehicle 115 is present at the garage 102. In one form, the vehicle 115 may communicate with movable barrier operator 105 or camera 110 via a Bluetooth signal (or other direct wireless communication signal) when in proximity to the movable barrier operator 105 or camera 110. In another form, the vehicle 115 may connect to a local network the movable barrier operator 105 or camera 110 are connected to when in proximity to the garage 102. As one example, the local network may be a Wi-Fi network which may be instantiated by the movable barrier operator 105. Upon connection of the vehicle 115 to the local network, the system 100 may determine that the vehicle 115 is present at the garage 102. In yet another form, the movable barrier operator 105 or camera 110 transmits a beacon signal including a code. When the vehicle 115 is proximal to the garage 102, the vehicle 115 may receive the beacon signal. The vehicle 115 may then communicate with the system 100 as described above or may communicate the code to the server computer 120 of the system 100, for example, via a cellular network. Based on the vehicle 115 communicating the code that it received being proximal to the garage 102, the system 100 may determine that the vehicle 115 is present at the garage 102.

Figure 6A:
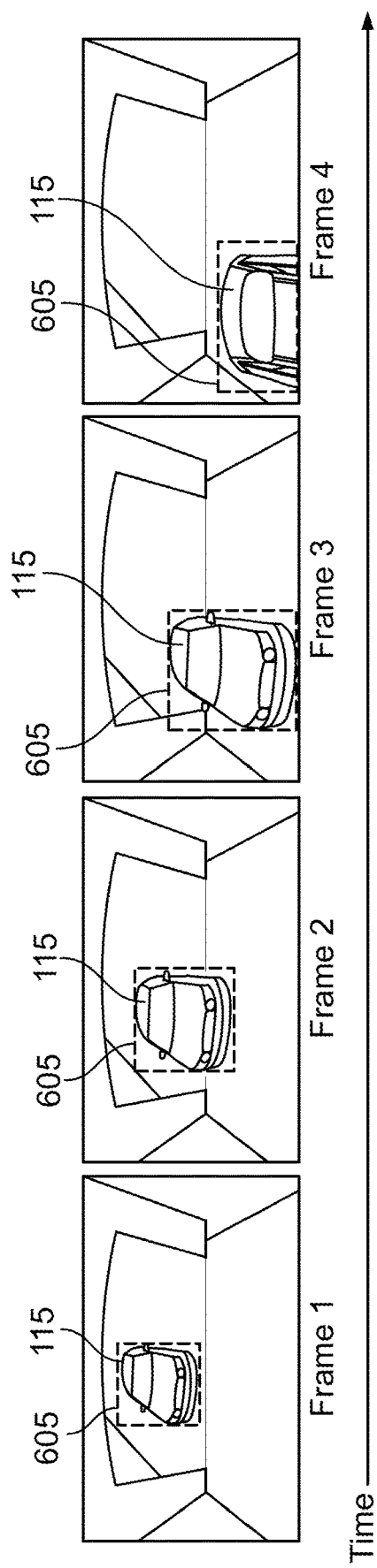
FIGS. 6A-B are an example set of image frames of a vehicle moving relative to the camera of the object monitoring system of FIG. 1.
Figure 6B:
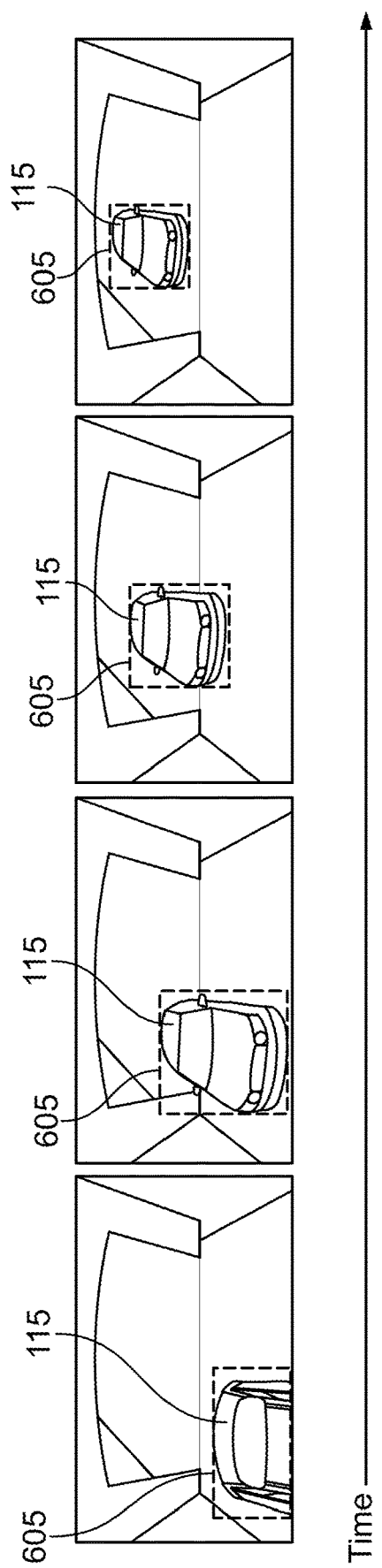

Additionally or alternatively, the system 100 may be programmed to monitor the series of images to identify whether the images actually show the vehicle entering or exiting the garage. The system 100 may be able to determine, based on the series of images, if a vehicle entered or exited the garage. This information may be used to aid in the categorization of the state of the images captured before and after the state change. An example series of images showing the vehicle 115 entering and exiting the garage is shown in FIGS. 6A and 6B. The system 100 may use edge processing at the camera 110 to identify a portion of the vehicle 115 and determine whether the portion of the vehicle 115 is moving into or out of the garage 102. In the embodiments where the camera 110 is mounted to the movable barrier operator 105 such that the camera 110 is centered relative to the garage door, the front (or rear if the driver backs into the garage) of the vehicle 115 may be identified and determined to be moving closer to or farther away from the camera 110 in captured images over time, for example, by observing if the front or rear of the vehicle 115 is moving lower or higher within the field of view of camera 110. Additionally or alternatively, the rear of the vehicle 115 may be monitored for motion relative to the camera 110, such as a distance between the vehicle 115 and the camera 110 or a distance between the vehicle 115 and a portion of the garage 102 (e.g., the path of the garage door 104). A detection of vehicle motion may be used to determine whether the images captured in close temporal proximity to a state change of the movable barrier operator 105 show a change in the condition of the vehicles within the garage.

A determination of the direction of movement of the vehicle into or out of the garage 102 may be used to determine whether the images captured before the state change include a vehicle and whether the images captured after the state change include a vehicle. Consider the scenario where the garage door 104 has been detected to have opened. Since the camera 110 is periodically or continuously recording images, the camera 110 captures a series of images of the vehicle 115 entering or exiting the garage. These images may be processed, for example, using image processing algorithms as described herein, and the direction of movement of the vehicle may be determined. The system 100 may detect the presence of a moving object in an image captured and provide an object identifier, such as a bounding box 605, around the detected object. The bounding box 605 may indicate that an object is within that portion of the image. The system 100 may be configured to identify the type of object (e.g., a vehicle, human, lawnmower) within the bounding box using a neural network objection detection technique as an example. In some embodiments, objection detection technique is "you only look once" (YOLO) which may be used to detect objects in real-time. Upon detecting the objects within an image frame, the system 100 may discard information associated with objects that are determined to not be relevant, e.g., objects that are not detected to be vehicles. For example, if the system 100 detects a shovel is present within an image frame, the system 100 will discard the data associated with the shovel (e.g., that a shovel is present in the image frame, its position within the image frame, etc.) In other examples, the data associated with the shovel is not associated or stored with the image frame as metadata.

For example, as shown in FIG. 6A, when the vehicle 115 is detected to be moving progressively closer to the camera 110 (e.g., lower in the field of view of the camera 110) or to the interior of the garage 102 over time, the system 100 may determine the vehicle 115 is entering the garage 102. In contrast, as shown in FIG. 6B, if the vehicle 115 is detected to be moving farther away from the camera 110 (e.g., progressively higher in the field of view of the camera 110) or the interior of the garage 102 over time, the system 100 may determine that the vehicle 115 is exiting the garage 102. The system 100 may also monitor the relative size of the vehicle 115 within the image frame (e.g., the number of pixels that make up the vehicle 115) and determine that the vehicle 115 is entering the garage 102 if the size of the vehicle 115 relative the rest of the image is increasing over time and determine the vehicle 115 is exiting the garage 102 if the size of the vehicle 115 is decreasing. The system 100 may determine the size of the vehicle 115 based on the dimensions of the bounding box 605 created by the neural network object detection technique, such as YOLO. The system 100 may monitor the size of the bounding box 605 that has been determined to identify a vehicle 115 to determine whether the vehicle is entering or exiting the garage 102.

Additionally or alternatively, the system 100 may track the position of the portion of the vehicle 115 over time relative to the field of view of the camera 110. In embodiments where the camera 110 is mounted to the movable barrier operator 105, centered relative to the garage door 104, and is directed towards the garage door 104, the system 100 may determine whether the portion of the vehicle 115 is moving from the top to the bottom of the image over time or from the bottom to the top of the image over time. If the portion of the vehicle 115 is detected to be moving from the top to the bottom of the captured images over time, then the system 100 may determine that the vehicle 115 is approaching or entering the garage 102. In contrast, where the portion of the vehicle 115 is detected to move from the bottom to the top of the captured images over time, the system 100 may determine that the vehicle 115 is leaving or exiting the garage 102. Based on the determination of whether a vehicle 115 has entered or exited the garage 102, the system 100 is able to determine whether images taken before or after the state change of the garage door 104 include the vehicle 115 or do not include the vehicle 115.

For example, if the vehicle 115 is determined to have entered the garage 102 such as via the system 100 detecting the vehicle 115 moving from the top of the field of view to the bottom of the field of view through the sequentially captured images, then images captured before the state change of the garage door 104 may be determined to show no vehicle 115 is present in the parking spot the vehicle 115 entered. The images captured after the vehicle 115 has entered or moved to the bottom of the field of view (and has not moved back toward the top of the field of view of the camera 110) may be determined to show the vehicle 115 is present in that parking spot. Similarly, when the system 100 determines that the vehicle 115 exited the garage 102 after the state change of the garage door 104, then the system 100 may determine that images captured before the state change show the vehicle 115 present whereas images captured after the vehicle 115 has exited the garage or moved to the top of the field of view of the camera 110 (and has not moved back toward the bottom of the field of view of the camera 110) do not show the vehicle present. In embodiments where there is more than one parking spot within the garage 102, the system 100 may determine whether a vehicle 115 is entering or exiting a specific parking spot by monitoring the relative position of the vehicle 115 within the image. For example, if the system 100 determines that the garage 102 includes a first parking spot within the left half of the field of view of the camera 110 and a second parking spot within the right half of the field of view of the camera 110, then if the vehicle 115 is entering the garage 102 on the left half of an image, the system 100 may determine that the vehicle 115 is entering the first parking spot. The system 100 may similarly determine whether a vehicle 115 is exiting the first parking spot by vehicle motion over time exiting the garage on the left half of the field of view of the camera 110. Where vehicle motion is detected in the right half of the field of view of the camera 110, the system 100 may determine that a vehicle is entering or exiting the second parking spot.

Thus, capturing and processing images within a period of time relative to the state change of the garage door 104 may result in capturing various different conditions of the garage. Moreover, processing images captured within a time period relative to a state change of the garage door 104 may improve the performance of the system 100. For example, the number of images that need to be stored and processed may be reduced. In one example, if a certain period of time has passed (e.g., two minutes) since an image was captured and the garage door 104 did not change states within a period of time before or after the image was captured, the system 100 may delete or overwrite the image since a condition of the garage likely has not changed. In one approach, the camera 110 may include or be in communication with a circular buffer that temporarily stores the images. If the movable barrier is detected to change states, the camera 110 may transfer the images captured in the circular buffer to another portion of memory for processing. After a period of time has passed, the images are overwritten by subsequent images captured by the camera 110 and stored in the circular buffer. This reduces the number of images that are stored in memory while allowing the camera 110 to record images of the interior of the garage 102 with greater frequency, e.g., continuously. Furthermore, the system 100 may only need to process those images captured relative to the movable barrier changing states. This reduces the amount of memory or storage space needed to operate the system 100 as well as reduces the amount of processing and computing performed since only a fraction of the captured images are processed.

In another embodiment, the camera 110 begins recording images once the system 100 determines that the garage door 104 is changing states. The state change of the garage door 104 may be detected by a door position sensor 150 of the movable barrier operator 105. In another embodiment, the door position sensor 150 is in communication with the movable barrier operator 105, such as a tilt sensor mounted on the garage door 104. In another example, the camera 110 analyzes captured images to determine whether a horizontal line is moving upward or downward across a series of images frames. The horizontal line within the image frames may be the bottom edge of the garage door 104 or the interface of two panels or sections thereof. If the horizontal line is determined to be moving upward across the series of image frames, the system 100 may determine that the garage door 104 is moving to an open state. If the horizontal line is moving downward across the series of image frames, the system 100 may determine that the garage door 104 is moving to a closed state. As one example, once a state change of a garage door 104 is initiated, the camera 110 records images for three minutes after the state change has been detected. The camera 110 may capture images of a vehicle 115 entering or exiting the garage and the state of the garage after the vehicle 115 has entered or exited. In yet another example, the camera 110 captures images in response to detecting that the garage door 104 has changed state from a closed position to an open position. The camera 110 may be configured to capture images upon detection of the garage door opening, for example, for three minutes after the garage door opens. This time restriction further reduces the number of images to be processed by the system 100. The system 100 may monitor vehicle motion relative to the garage as described in other embodiments. The system 100 may compare the images captured after the vehicle motion has stopped with images captured after the prior state change of the garage door 104 to determine the difference between the two conditions.

Regarding FIGS. 7A-D, example processes are shown for detecting and determining that a vehicle 115 has entered or exited the garage 102 and for determining which parking spot within the garage 102 the vehicle 115 has entered or exited. Once an entry or exit event has been determined to occur, the system 100 may store one or more images captured before the event and one or more images captured after the event as representing conditions of the garage 102. For example, if a vehicle is determined to exit the left parking spot, images captured before the vehicle exit will be associated with a condition where the vehicle is present in the left parking spot, and images captured after the event will be associated with conditions where the left parking spot is empty.

Figure 7A:
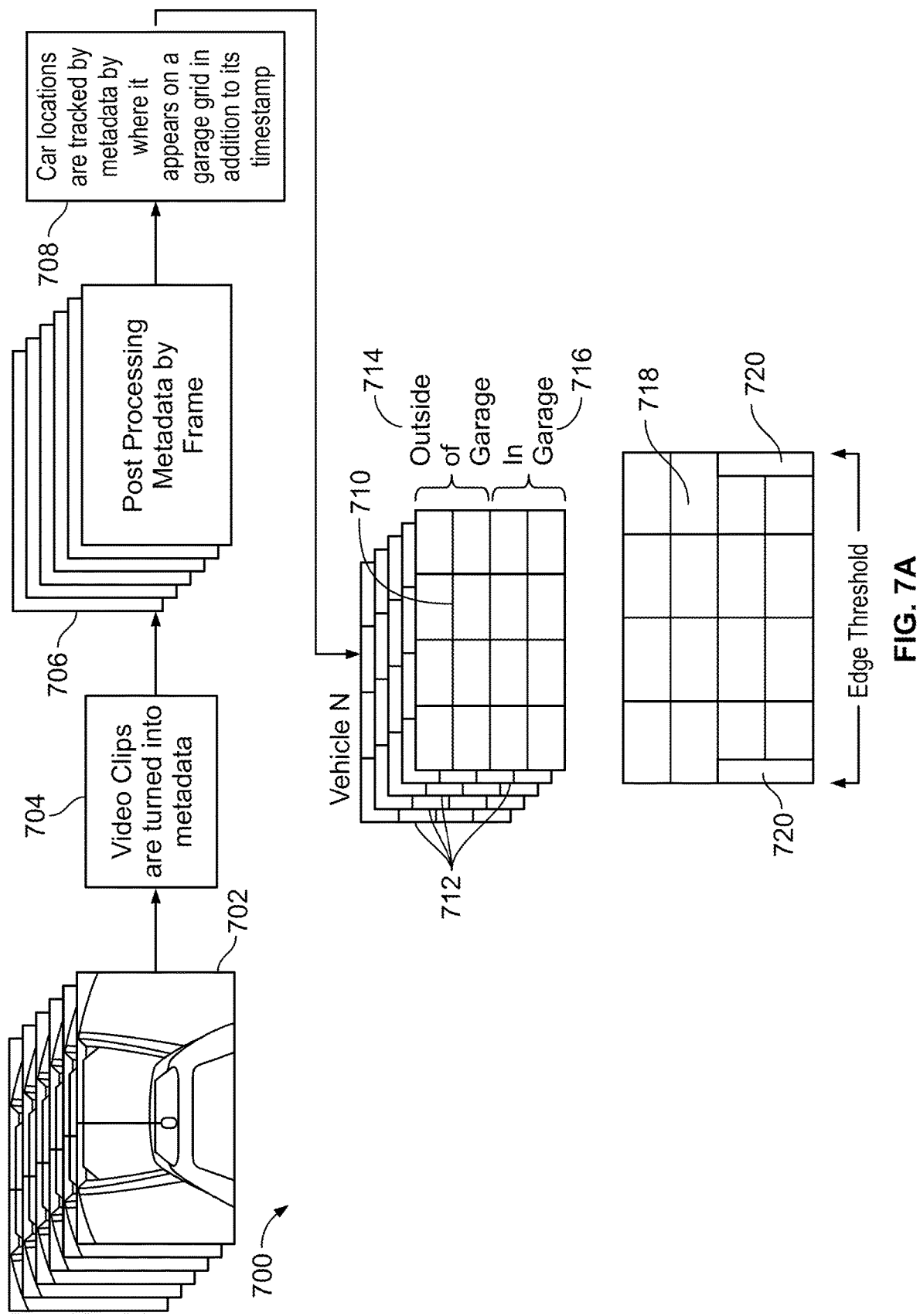
FIG. 7A-D are example diagrams of processes the object monitoring system of FIG. 1 may utilize to process the images and identify one or more conditions.

With regard to the process 700 of FIG. 7A, a video clip 702 recorded by camera 110 of the interior of the garage 102 is processed by the system 100. The system 100, or one or more components of the system 100, may process 704 the image frames and associated data of the video clip 702 to extract metadata. The metadata may include the position of a vehicle 115 within each image frame and a time the image frames were captured as examples. In the example process 700 of FIG. 7A, the system 100 applies a grid 710 to the image frames of the video clip 702, for example, a 4×4 grid. The system 100 processes a plurality of the image frames 712 of the video clip 702 to identify vehicles 115 within the image frames. The system 100 may store the cell(s) of the grid that the identified vehicles 115 are determined to be within for each of the image frames 712. The system 100 may store the extracted vehicle position data along with time information, for example, the time the image frame from which the position data was extracted was captured. The system 100 may determine the position and time information of the identified vehicles 115 for each of the plurality of processed image frames.

The system 100 then processes 706 the extracted metadata of the video clip 702 across the image frames. This may include analyzing the extracted position data of a vehicle 115 over time. For example, the system 100 may analyze the metadata of two or more image frames of the video clip 702 to track 708 a change in position of a vehicle 115 identified within the images over time. The system 100 may determine a vehicle 115 enters the garage 102 when analyzing the position data of the vehicle 115 when the vehicle 115 is progressively moving downward within the image frame over time such that the vehicle 115 enters the bottom row of the grid 710 last in time. For example, the vehicle 115 is identified to be in the top row, later in time in the second from the top row, still later in time in the second from the bottom row, and finally enters the bottom row. Conversely, the system 100 may determine that a vehicle 115 has exited the garage 102 when the vehicle 115 is determined to be in the lowest row of the grid 710, and, over time, the vehicle 115 moves upward within the image frame 712. For example, if image frames captured earliest in time show the vehicle 115 in the bottom two rows of the grid 710, image frames captured later in time show a portion of the vehicle 115 present in the second from the top row, and then image frames captured still later in time show the vehicle 115 present within the top row of the grid 710, the system 100 may determine the vehicle 115 exited the garage 102.

The system 100 may also determine that the vehicle's position in certain rows of the grid 710 indicate the vehicle is inside or outside the garage 102. This may depend on the camera's 110 location within the garage 102 and the direction the image sensor 198 of the camera 110 is facing. In the example shown, the vehicle 115 is determined to be outside of the garage 102 in image frames where the vehicle 115 is detected to be within the upper two rows 714 of the grid 710 of the image frames 712. The vehicle 115 is determined to be inside the garage 102 where the detected vehicle 115 is within the lower two rows 716 of the grid 710 of the image frame 712. Thus, if a vehicle 115 is determined to be outside of the garage 102 (e.g., within the top two rows of the image frame) at a point in time, and then later in time, the vehicle 115 is determined to be inside of the garage 102 (e.g., within the bottom two rows of the image frame), the system 100 may determine that the vehicle 115 entered the garage 102. Conversely, if a vehicle 115 is determined to be inside the garage 102 at a point in time, and then later in time, the vehicle 115 is determined to be outside of the garage 102, the system 100 may determine that the vehicle 115 exited the garage 102.

While an example 4×4 grid has been shown and discussed, grids of different numbers of rows and columns may be used. The position of the camera 110 within the garage 102 may determine the region or cells of the grid 710 of the processed image frames that the vehicle 115 must be present within for a vehicle 115 to be identified as being outside or inside the garage 102. Also, the size of the vehicle 115 may also affect which rows of the grid a vehicle 115 may be present in when outside or inside the garage 102.

The system 100 may further determine which parking spot within the garage 102 the vehicle 115 entered or exited. The system 100 may monitor whether the vehicle 115 is present within a specific region of the image frame to determine whether the vehicle 115 is within a certain parking spot within the garage. As shown in FIG. 7A, the vehicle processing grid 718 includes two edge regions 720 shown on the lower left and lower right portions of the grid 718. The system 100 may monitor, via the vehicle position data extracted from the image frames of the video clip 702, the presence of the detected vehicle 115 within these regions 720 to determine which parking spot of the garage 102 that the vehicle 115 is occupying. If at least a portion of the vehicle 115 is detected in the left edge region 720, the system 100 may determine that the vehicle 115 is parked within the left parking spot of the garage 102. If at least a portion of the vehicle 115 is detected to be within the right edge region 720, the system 100 may determine that the vehicle 115 is parked within the right parking spot of the garage 102. To determine that a vehicle 115 is within the center parking spot of the garage 102, the system 100 may determine that the vehicle 115 is in both of the middle columns of the grid 718 and/or is not present within either of the edge regions 720 of the grid 718. The width of the edge regions 720 may set to be a threshold distance from the edge of the image frame such that a vehicle 115 parked in the center spot does not extend into either of the edge regions 720.

Additionally or alternatively, if the vehicle 115 is detected to be only within the left two columns of the grid 718 (e.g., the left half of the image), the system 100 may determine that the vehicle 115 is present within the left parking spot. Likewise, if the vehicle 115 is detected to be only within the two columns of the grid 718 (e.g., the right half of the image), the system 100 may determine that the vehicle 115 is present within the right parking spot. If the vehicle 115 is present in both the left and right half of the image, the system 100 may determine that the vehicle 115 is parked in the center of the garage 102 or within the center parking spot. The system 100 may evaluate the percentage of the vehicle 115 that is present in the left and right halves of the image frame in making these determinations.

Having determined whether a vehicle 115 entered or exited the garage 102, and into or from which parking spot within the garage 102, the system 100 may then categorize the images captured before the vehicle 115 movement and after the vehicle 115 movement as representing the condition where a vehicle 115 is present or absent from the identified parking spot.

Figure 7B:
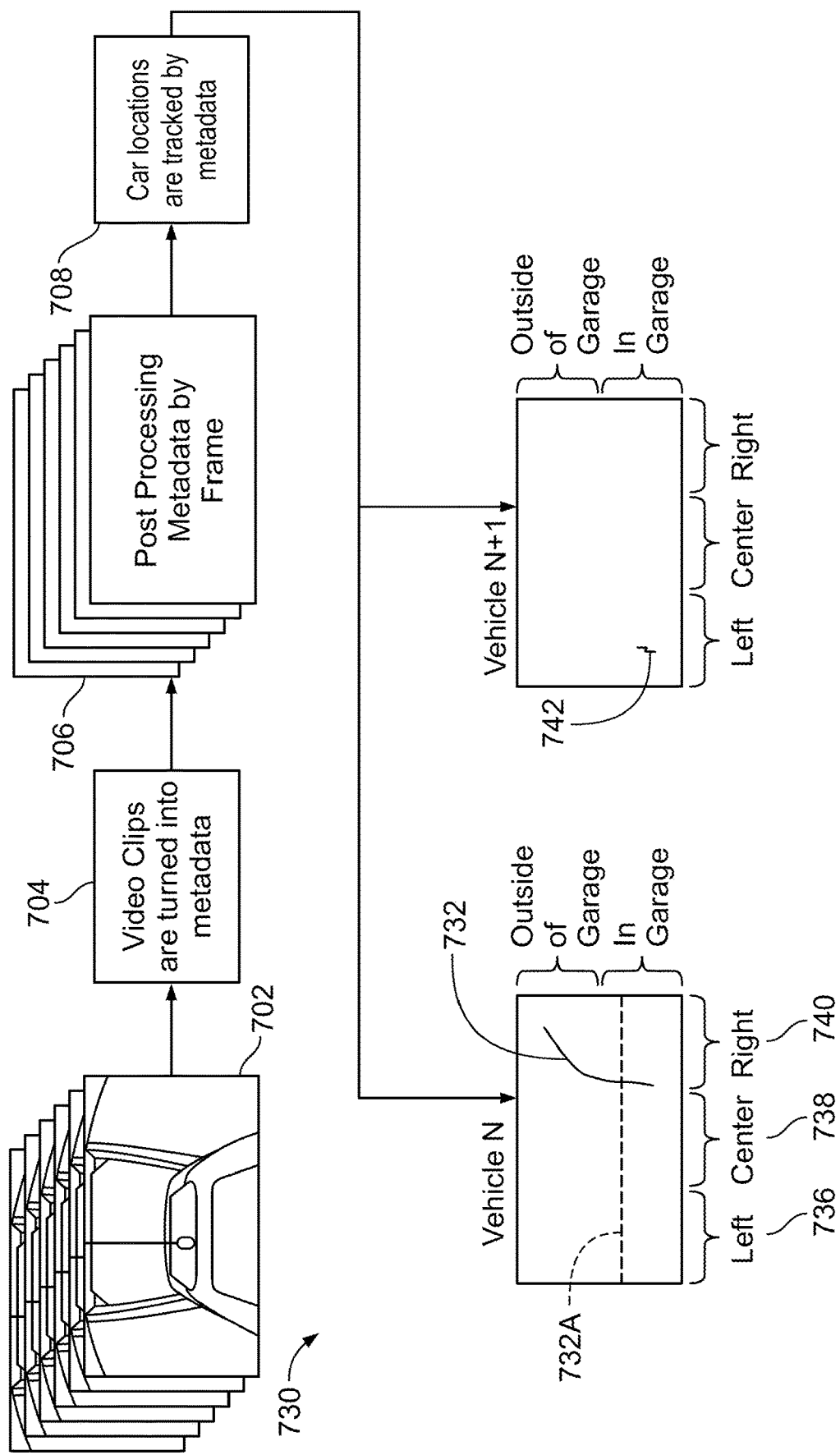
Figure 7C:
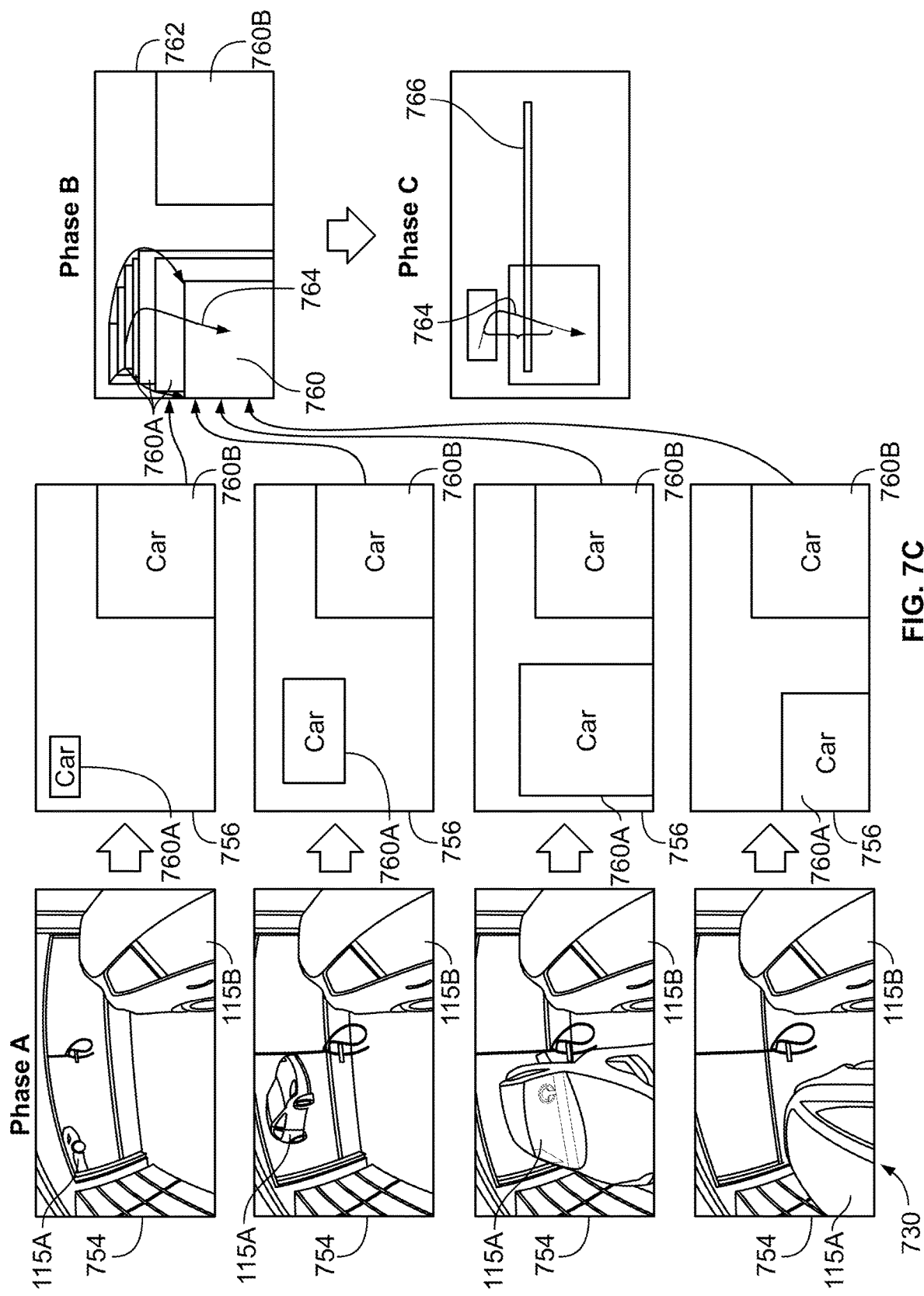

With regard to FIGS. 7B and 7C, another example method 730 for detecting when a vehicle 115 has entered or exited a parking spot of the garage 102 is shown. As with method 700 of FIG. 7A, the system 100 processes a video clip 702 captured by camera 110 of the interior of the garage 102 and turns 704 the video clip 702 into metadata and/or extracts 704 metadata from the video clip 702. The metadata of the series of images of the video clip 702 may include a position of the vehicle within each image frame of the video clip 702 along with a timestamp of each image frame of the video clip 702. The system 100 then processes 706 the metadata of the image frames of the video clip 702 over time. This may include determining the position of the same vehicles over time to determine the travel paths 732 of the identified vehicles 115. The system 100 may determine the position of the vehicle based on a calculation of the midpoint of the vehicle 115 within the image frame. The path 732 may be represented as the positions of the midpoint of the vehicle over time.

Based on the determined path of the vehicle 115, the system 100 may determine whether the vehicle 115 is entering or exiting the garage 102. If the path 732 of the vehicle 115 is toward the garage 102 over time, the system 100 determines that the vehicle 115 is entering the garage. The system 100 may determine that a path 732 is toward the garage 102 when the path 732 is downward within the image frame. The system 100 may require that at least a portion of the vehicle 115 pass within a certain threshold distance of the lower edge of the image (e.g., out of the field of view of the camera 110) before a vehicle 115 entry is determined. In another approach, the system 100 may require that the path of the vehicle 110 cross over a virtual line 732A before determining that the vehicle 110 entered the garage 102. Crossing the virtual line 732A, for instance, may indicate that the vehicle is fully within the garage 102. If the path 732 of the vehicle 115 is away from the garage 102 over time (e.g., upward within the image frame), the system 100 may determine that the vehicle 115 is exiting or has exited the garage 102. The system 100 may similarly require that the path 732 of the vehicle cross a virtual line for the system 100 to determine that an exit has occurred.

Travel path 742 is an example of a travel path 742 that does not show a vehicle entry or exit. The system 100 may require that travel paths extend a minimum distance before an entry or exit is determined to ensure that variation in the position of a stationary vehicle (e.g., such as is shown with the travel path 742 of FIG. 7B) is not mistakenly determined to be a vehicle entry/exit. As shown, the travel path 742 includes some movement, even though the vehicle is stationary. This may occur due to slight variation in the determined position of the vehicle across a series of image frames (e.g., the determined position of a stationary vehicle is not exactly the same in each image frame).

The system 100 may determine the parking spot that a vehicle enters or exits based on the portion of the vehicle path 732 within the lower portion of the image frame (i.e., inside the garage). For example, the system 100 may determine that that a vehicle 115 has entered a certain parking spot of the garage 102 based on the final position of the vehicle 115 along its path 732 into the garage 102. If the final position of the vehicle 115 is within the portion of the image associated with the left spot 736 of the garage, the system 100 determines that images of the vehicle 115 in the final position are of a vehicle 115 within the left spot 736 of the garage 102. Likewise, if the final position of the vehicle 115 is within the portions of the image frame associated with the center parking spot 738 or right parking spot 740 of the garage 102, the system 100 determines that the images of the vehicle 115 at its final position include the vehicle 115 within the center or right spot 738, 740 of the garage 102, respectively.

Where the vehicle is determined to have exited the garage 102, the system may determine which parking spot of the garage 102 that the vehicle exited based on its initial position and initial portion of the vehicle path 732. For example, if the initial portion of the vehicle path 732 is within the portion of the image associated with the left parking spot 736 of the garage, the system 100 determines that images of the vehicle 115 in the initial position are of a vehicle 115 within the left spot 736 of the garage 102. Likewise, if the initial portion of the vehicle path 732 is within the portions of the image frame associated with the center or right parking spots 738, 740 of the garage 102, the system 100 determines that the images of the vehicle 115 at its initial position include the vehicle 115 within the center or right spot 738, 740 of the garage 102, respectively.

With reference to FIG. 7C, example operations for detecting when a vehicle has entered or exited a parking spot of a garage 102 according to the method 730 of FIG. 7B are shown. In processing 706 the video clip 702, the system 100 may detect vehicles 115A, 115B within the series of images 754 of the video clip 702, for example, by using a convolutional neural network. In one approach, the system 100 uses a convolutional neural network to detect the vehicles 115A, 115B and their respective positions within the image frames for every third image frame of the video clip 702 and uses optical flow techniques to estimate the position of the vehicles within the other image frames of the video clip 702 to reduce the resources for processing the image frames.

Image frames 754 are processed to generate or otherwise output representations 756 that simplify, abstract or otherwise filter the captured images to deemphasize non-vehicle objects and focus on the vehicles 115A, 115B within the image frames 754. As shown in Phase A of FIG. 7C, the detected vehicles 115A, 115B are represented as two-dimensional rectangles or boxes 760A, 760B, however, other representations of the vehicles 115A, 115B may be used. As examples, the detected vehicles may be represented as another shape, a set of two or three-dimensional points, and/or a heat map. Two boxes 760A, 760B representing vehicles 115A, 115B are shown within the representations 756 of FIG. 7C because the system 100 has detected two vehicles within the series of images 754.

As shown in Phase B of FIG. 7C, the representations 756 generated in Phase A of the image frames are compared. To compare the representations 756, the system 100 may compare the size and position of the vehicle boxes 760A, 760B over time to track the path of the vehicles 115. The boxes 760A, 760B, shown in FIG. 7C as rectangles, may be smoothed by using averaging or a Gaussian kernel to reduce the noise in the detected position of the vehicle in each image frame. One or more points of the boxes 760A, 760B may be tracked relative to the smoothed positions and sizes of the boxes 760A, 760B over time. As shown in the image 762 of Phase B, the position of the upper corners of the boxes 760 and a middle point of the boxes 760A, 760B of the vehicle are tracked over time to determine the path 764 of the vehicle. In other embodiments, the bottom corners and middle point along the bottom edge of the vehicle 115A may be tracked over time. The system 100 may generate a function of the position of the vehicle over time that represents the path 764 of the vehicle 115A within the video clip 702 that is analyzed. The system 100 may generate a path 764 for each vehicle 115A, 115B detected to be present within the image frames.

As shown within Phase C of FIG. 7C, the system 100 may determine or generate a threshold, such as a virtual point or a virtual line 766 that represents a point the vehicle path 764 must cross to conclude that the vehicle has entered or exited the garage 102. This may be, as an example, a line halfway down the image frame. The virtual line may be a line that the rear edge of the vehicle representation box 760 must pass beyond for the vehicle to be within the garage, e.g., beyond the path of the garage door. As another example, the line 766 is a line that a front portion of the vehicle representation box 760 must pass below within the image frame for the system 100 to conclude the vehicle 115 is within the garage. The virtual line 766 may be generated based on one or more images where the vehicle is known to be within the garage 102. In another example, the virtual line 766 is generated based on the position of the garage door 104 of the garage 102 when in a closed position.

The system 100 may determine whether the vehicle entered or exited the garage 102 based on the determined path 764 of the vehicle. The system 100 may determine whether the vehicle passed beyond or crossed the line 766 before concluding a vehicle entry or exit occurred. The system 100 may further determine whether the vehicle traveled a minimum distance over the time period selected before concluding a vehicle entry or exit occurred. Determining whether a minimum distance has been traveled may be done to ensure that noise in the detection of the position of a stationary vehicle across multiple image frames is not mistakenly determined to be a vehicle entry or exit. The system 100 may be configured to require that the vehicle move at least a threshold distance (e.g., number of pixels) before determining that the vehicle could have entered or exited the garage 102. As an example, the system 100 may require that the vehicle travel a distance of 20% of the height of the image frame. Additionally, the system 100 may determine whether the vehicle is increasing in size or decreasing in size over time relative to the image frame. The system 100 may also determine whether a vehicle that is increasing in size relative to the image frame is also moving downward within the image frame or that a vehicle that is decreasing in size relative to the image frame is moving upward within the image frame. Based one or more of the above determinations, the system 100 may conclude that a vehicle has entered or exited the garage 102.

In one embodiment, the system 100 requires that a detected vehicle pass beyond the virtual line 766, travel a minimum distance, and change in size relative to the image frame for an entry or exit of the vehicle to be detected. If all three requirements are met, the system may conclude that the vehicle has entered the garage 102 if the vehicle was increasing in size and moving downward within the image frame. Conversely, the system may conclude that the vehicle exited the garage 102 if the vehicle was decreasing in size and moving upward within the image frame.

Figure 7D:
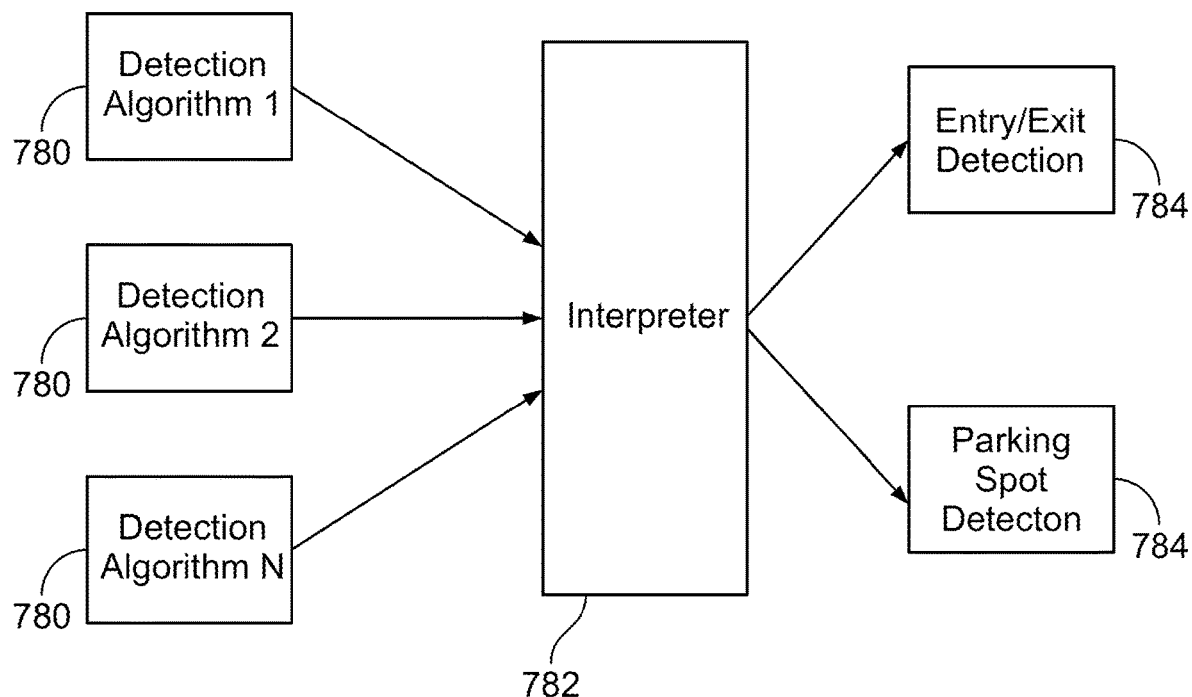

As shown in FIG. 7D, the system 100 may use one or more detection algorithms 780, such as the methods 700, 730 discussed in regard to FIGS. 7A-C, to detect whether a vehicle has entered or exited a parking spot of the garage 102. The system 100 may include an interpreter 782 that receives an input regarding whether a vehicle 115 has entered or exited a parking spot from the output of the one or more detection algorithms 780. The interpreter 782 may evaluate the determination of each of the one or more detection algorithms 780 to ultimately conclude whether an entry or exit from the garage 102 has occurred. Based on its determination, the interpreter 782 outputs an entry/exit detection determination 784 and a parking spot detection determination 786. In one example, the interpreter 782 only concludes a vehicle has entered/exited if each of the detection algorithms 780 used indicate the same conclusion. In another example, the interpreter 780 weighs or accounts for the accuracy of the one or more algorithms. In one form, each of the one or more detection algorithms 780 provide a confidence value for its output determination which the interpreter 782 uses in evaluating whether a vehicle has entered or exited the garage 102 and which parking spot of the garage 102 was entered or exited.

In another form, the interpreter 780 outputs the determinations 784, 786 received from a first detection algorithm 780 unless the system 100 determines that the confidence in the determinations 784, 786 using that detection algorithm are below a certain threshold. In this case, the interpreter 782 may output determinations 784, 786 of a second detection algorithm 780.

The system 100 may collect multiple images associated with each identified condition, for example, three to five images. These images may be captured at different times of day to capture images of the conditions with different lighting. The images may also include images taken with an infrared camera or in greyscale or black and white. An example set of images is shown in the images 805, 810, 815, 820, and 825 of FIG. 8A. In image 805, spot0 is shown with a sports car in in the left spot (spot0) and a vehicle (SUV) in the right spot (spot 1) with the garage door open. In image 810, the sports car is in the left spot and the SUV in the right spot with the garage door closed. In image 815, the sports car is shown in spot0 while the SUV is shown in the driveway just outside of the garage with the garage door open. In image 820, the SUV is shown in the left spot and the sports car is shown in the right spot with the garage door open. In image 825, the garage door is open with both cars outside of the garage and on the driveway.

Figure 8A:
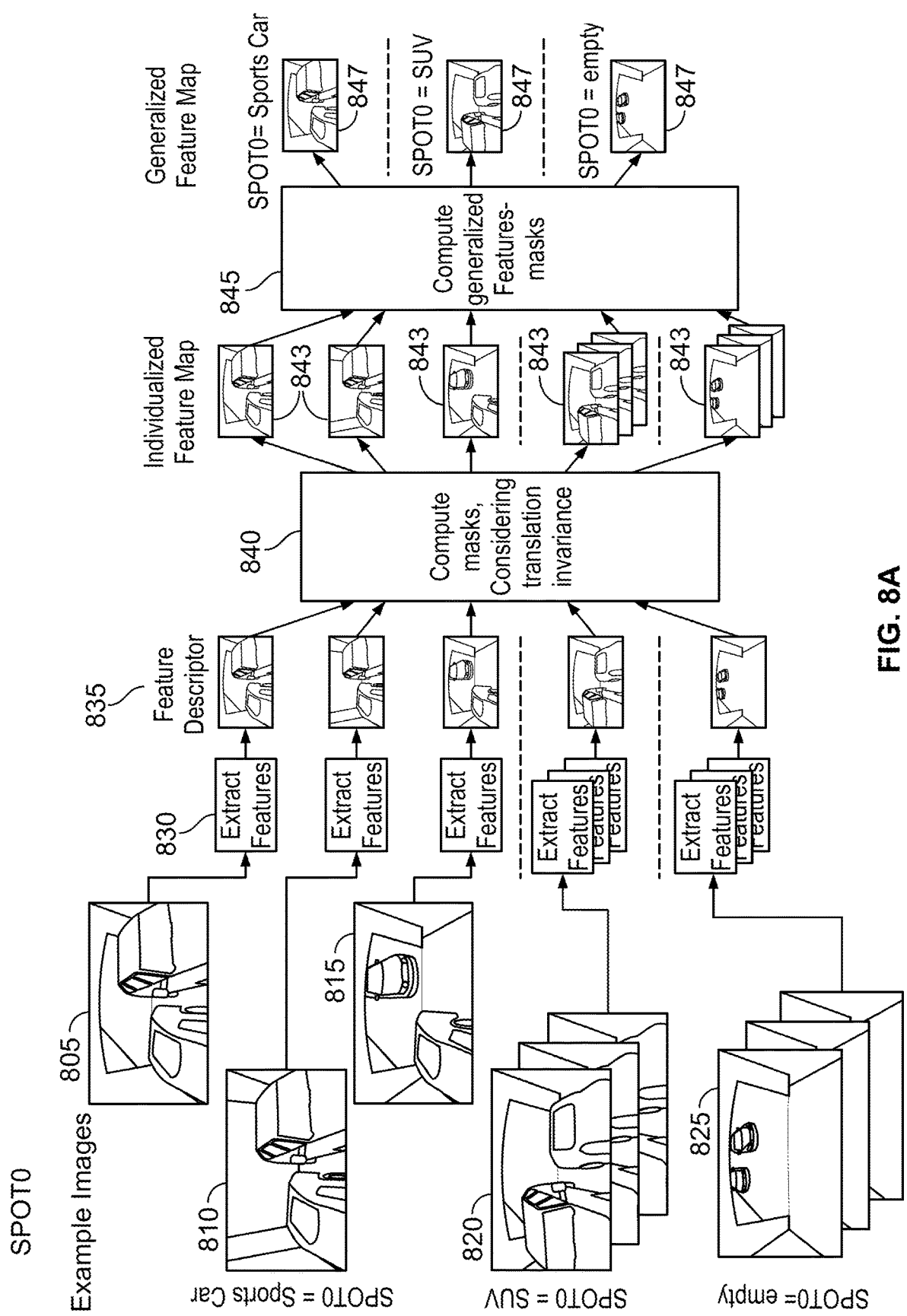
FIGS. 8A-B are example processes for computing feature masks and feature maps for conditions identified by the object monitoring system of FIG. 1.

For each image collected, the image is associated with a condition, for example, using one or more methods described above. The system 100 may determine which features are present within each image, categorize the image as representing a certain condition, and compute generalized masked feature descriptors (e.g., a feature map) for each condition based on the set of images associated with each condition. The system 100 may determine the areas of the images that indicate or correspond to a certain condition being present. For example, the system 100 may first create a feature map (which is a feature descriptor and a corresponding mask) for each image. As shown in FIG. 8A, the system may extract 830 the feature descriptor from each image and create 835 a list, table, matrix, or other data structure containing the extracted features. This may be done, for example, by calculating a histogram of oriented gradients (HOG) for each image. In another example, this may be done by applying Scale-invariant Feature Transform (SIFT) to the images to create a list of feature descriptions within each image. Based on the features extracted from this image and features extracted from other images, the system 100 computes 840 a mask for each image. The mask may be a list, table, matrix, or other data structure that indicates features of the image and locations of those features that are relevant to determine the conditions or conditions represented by an image. The features and masks may be created accounting for translation invariance. For example, the system 100 may copy each image and shift the image or extracted image features up, down, left, and/or right as part of the mask computation. This accounts for situations where, for example, the camera 110 shifts slightly or where a vehicle 115 parks slightly to the left or right within a parking spot. The feature descriptors of each image may be combined with the masks to create individualized feature maps 843 for each image.

From the individualized image feature maps 843, one or more generalized feature maps 847 may be computed 845 based on the individualized feature descriptors and/or feature maps of each image of a condition. Alternatively or additionally, the generalized feature map(s) may be computed 845 based on the pixels of the images. To create the generalized feature maps, the system 100 may compare all the individual feature maps 843 for each category or condition. The system 100 may determine the shapes, features, and/or relative location of the shapes and features that are present in each of the individual feature descriptors for each condition. The generalized feature map 847 may be an average of the individual feature maps 843. For example, the generalized feature map 847 may include the shapes or extracted features present in all of the individual feature maps for a condition at a location or region of the image based on the average location of the shape or features in the individual feature maps.

The individual feature maps 843 and the generalized feature maps 847 indicate specific areas of an image captured by the camera 110 that are of interest to determining when a specific condition is present, as well as a description of the features that should be present in that region. Each feature map 843, 847 includes a plurality of sections (e.g., an 8×8 grid) that indicates what features, shapes, or feature edges should be (or are expected to be) present in each section of an image for a condition to be present.

Figure 8B:
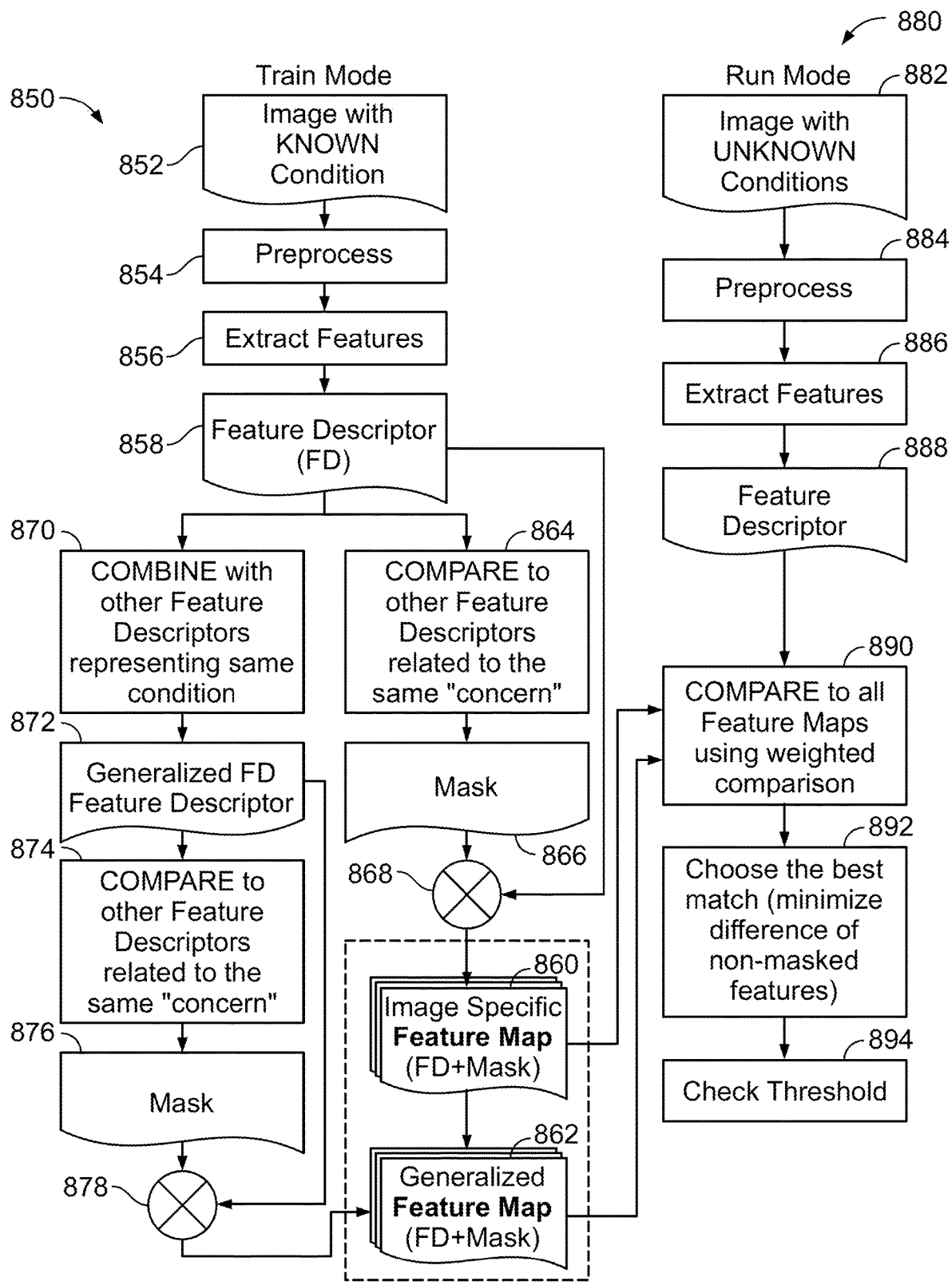

With reference to FIG. 8B, another process for computing feature maps for each condition is shown. In process 850, when in the train mode 50, the system 100 takes images 852 it has categorized as representing a condition and processes them to create feature maps for each condition. The images that are processed may be those that have been associated with a condition, for example, using one or more methods described previously. The steps of process 850 may be performed by the movable barrier operator 105, camera 110, and/or server computer 120. In some embodiments, a portion of the pre-processing and/or processing operations are carried out by the movable barrier operator 105 and/or camera 110 while other processing is performed by the server computer 120.

The image 852 known to represent a condition is preprocessed 854 to prepare the image 852 for processing and for generating features maps. Pre-processing 854 may include resizing the image, reducing the resolution of the image, adjusting the contrast within the image, etc. Performing pre-processing operations on the captured images at the movable barrier operator 105 and/or camera 110 before transmitting the images to the server computer 120 may reduce the data file size for each image and reduce the transmission time and/or network bandwidth to transmit the captured images to the server computer 120. In embodiments where the images are stored and processed on the movable barrier operator 105 and/or camera 110, performing pre-processing steps on the images before storing the images to memory may reduce the amount of memory occupied by each image which may result in more images being able to be stored on the movable barrier operator 105 and/or camera 110, use of a smaller memory 135, or both.

An example of operations for preprocessing the images 852 captured by the camera 110 for generating feature maps is presented below. The image 852 may be resized or cropped to a fixed size. For example, a portion of the image 852 may be cropped to reduce the size of one or more dimensions of the image. As another example, the image 852 may be scaled in one or more directions to fit the image within a predetermined size. The image 852 captured by the camera 110 may be an elongated rectangle, but extraction of feature descriptors and other analysis may need to be performed on a square image. The system 100 may then compress the image along the longer dimension to fit the image to the size and shape of a square. The resolution of the image may also be reduced, for example, reducing the image resolution from 600 pixels per inch (ppi) to 300 ppi. The frequency of the images may also be reduced or lowered to reduce the file size of each image.

Further image preprocessing may be done on the image 852. For example, the image 852 may be converted from a color image to a greyscale image. This may be done using an adaptive histogram equalization to improve the contrast in the images. In another example, contrast limited adaptive histogram equalization (CLAHE) may be used to increase the detection rate of features in images that have a high dynamic range. In one embodiment, the image may be divided into an 8×8 tile size with each of the blocks being histogram equalized.

Once the images 852 have been preprocessed, the system 100 may extract 856 features from the images 852 for the feature descriptor 858. The system 100 may extract features from the images 852, for example, by using applying one or more feature extraction algorithms, such as, for example, HOG, directed acrylic graph (DAG), Scale-invariant Feature Transform (SIFT), Binary Robust Independent Elementary Features (BRIEF), Oriented FAST and Rotated BRIEF (ORB), and/or Fast Approximate Nearest Neighbor Search Library (FLANN). The system 100 may create a list, table, matrix, or other data structure containing the extracted features that form the feature descriptor 858 of each image 852.

In one embodiment, a HOG may be calculated for the image, producing a lower resolution 2D feature descriptor. As one example, the histogram may use a 12×12 cell size, 1×1 cells per block, and 8 orientation bins. A histogram may be created for each cell of the image, with the histogram within each cell of the feature map being normalized. Normalization of the histograms across the entire image, and/or normalization of cells within close proximity to each other, may also be performed.

Once the feature descriptor 858 has been extracted from each image 852, the system 100 may use the feature descriptors of each image to generate image-specific feature maps 860 and/or to generate a generalized feature map 862 for each condition. To create an image-specific feature map 860, the system 100 compares 864 the extracted feature descriptors 858 of images 852 known to represent or relate to the same concern. A concern is an aspect of the garage that is monitored by the system 100 for which the system 100 determines the condition. Each concern may include two or more conditions. Example concerns include the state of the garage door, the occupancy of the left parking spot, the occupancy of the right parking spot, and the occupancy of the center parking spot. The concern of the occupancy of the left parking spot may include, as examples, the conditions of "left parking spot is empty," and "left parking spot has a vehicle present." Where the system 100 monitors the specific vehicle that is present in each spot, the concern may include, as examples, the conditions of "empty," "Vehicle 1 present," "Vehicle 2 present," "Vehicle N present," and/or "unknown vehicle present."

For instance, where a concern is the occupancy of the left parking spot, the system 100 compares the feature descriptor 858 of the images 852 categorized to include a vehicle parked in the left parking spot with the feature descriptors of other images known to include a vehicle in the left parking spot. The system 100 may also compare the feature descriptor 858 with the feature descriptors known to represent no vehicle in the left parking spot. In embodiments where a HOG feature descriptor is used, a comparison is made by calculating a difference in each of the bins of each of the cells of the HOG feature descriptor 858 of one image 852 with the corresponding bin of the corresponding cell of the HOG feature descriptor 858 for another image 852. For each bin within each cell, if the numeric difference of the feature of one image and the corresponding feature of the other image is below a certain threshold, then the system 100 may determine that the features are a match. Based on the comparison, the system 100 is able to determine which features of the feature descriptor are relevant for determining that a vehicle is parked in the left parking spot. By comparing 864 the feature descriptors, the system 100 may determine features present in all or threshold percentage of images known to represent a concern and conclude that these features are relevant for identifying when the concern is present. The system may also determine features that are not present in a threshold percentage of the images and categorize those features as irrelevant for identifying when the concern is present. For example, the system 100 may determine that features indicating the state of the garage door are irrelevant for determining whether a vehicle is parked in the left parking spot. As a result of the comparison of feature descriptors, the system 100 generates a mask 866 that indicates which features of the feature descriptor are relevant for determining whether the concern is present within an image.

The system 100 then combines 868 the mask 866 with the feature descriptor 858 to generate an image-specific feature map 860 representative of the condition known to be present in the image 852. Copies of the feature maps 860 may be made to account for movement or translation of the features within the images, such as shifting the feature maps 860 up, down, left, and/or right. As is discussed in more detail below with regard to use mode 60, the image-specific feature maps 860 may be compared with an image or images with unknown condition(s), herein referred to as "unknown images" to determine whether the condition of the feature map is present within the unknown image based on the degree of correlation between the feature map and the unknown image.

A single image 852 may be used to create multiple feature maps 862 where each feature map 862 represents one aspect of the garage. For example, a single image showing the garage door open, first parking spot occupied with a sedan, and a second parking spot empty may be used to generate feature maps 860 for the conditions that the garage door is open, the sedan is in the first parking spot, and for the second parking spot being empty.

To create generalized feature maps 862, the system 100 combines 870 the extracted feature descriptor 858 of the image 852 with the feature descriptors of other images known to represent the same condition. This may be done by averaging the individual features of the feature descriptors of each image known to represent the same condition. The system 100 may shift the feature descriptors relative to one another to find the highest correlation before creating the averaged feature descriptor. By combining 870 the feature descriptors representative of a single condition, the system 100 generates a generalized feature descriptor 872.

In one approach, the system 100 may determine when the correlation between two or more feature descriptors is below a threshold value. The system 100 may determine that averaging the feature descriptors will not produce an accurate generalized feature descriptor. The system 100 may determine that the same condition may be present, but something is different, for instance, a vehicle is parked two feet to the side of where it typically is parked. To address this situation, the system 100 may create two different feature descriptors for generating two different feature maps associated with the same condition.

The system 100 may then compare 874 the generalized feature descriptor 872 with other feature descriptors of images related to the same concern. For example, where the condition represented by the generalized feature map 870 is the garage door in a closed state, the system 100 may compare 874 the generalized feature descriptor 872 with the feature descriptors of images known to represent conditions where the garage door is in an open state. As discussed in regard to the comparing operation 864 for generating an image-specific feature map 860, comparing the generalized feature descriptor 872 with feature descriptors known to represent other conditions of the same concern may aid in identifying which features of the generalized feature descriptor 872 are relevant for identifying when a condition is present. In one embodiment where a normalized HOG feature descriptor is used, features are compared by computing the numeric difference between the histogram bin values of the normalized HOG feature descriptor from one image (e.g., the generalized feature descriptor 872 of the garage door in a closed state) with the corresponding bin values of the normalized HOG feature descriptor of another image (e.g., the generalized feature descriptor 872 of the garage door in an open state). The lower the numerical difference is between the features of the images indicates a higher degree of similarity between the features.

Based on the comparison 874, the system 100 identifies the features that are relevant to the condition being present (e.g., features that differ between the conditions of a concern) and creates a mask 876 indicating which features are relevant to identifying that condition. The generalized feature descriptor 872 is then combined 878 with the mask 876 to create the generalized features map 862. The generalized features map 862 includes only features that are relevant to determining that a certain condition is present. Copies of the feature maps 862 may be made to account for movement or translation of the features within the images, such as shifting the feature maps 862 up, down, left, and/or right.

The process 850 may be repeated for many or all images 852 known to represent each of the various conditions of the garage 102. Once a sufficient number of images 852 have been processed and the feature maps 860, 862 for each image and/or condition have been generated, the system 100 may enter the use mode 60. The image-specific feature maps 860 and/or generalized feature maps 862 may be used by the system 100 in the use mode 60 to determine the condition of the garage 102 present within an image that is not known to represent a condition of the garage 102. The comparison of the feature maps to the unknown images is discussed below with respect to the system 100 operating in the use mode 60.

As discussed above, the masks (e.g., masks 866, 876) indicate features of the feature descriptors that are relevant for identifying whether a condition is present in the images. The mask may include a vector matrix indicating the features of the feature descriptor that are relevant for determinizing the presence of a condition. A mask may be created, for example, by comparing each of the images associated with the same condition. If a particular feature is present within the other images or a threshold percentage of the other images associated with the same condition, those features may be included in the mask as relevant. Features that vary substantially across the other images may be marked in the mask as irrelevant to determining the condition is present. The feature descriptors of a condition may be compared with the feature descriptors of another condition within the same concern. The features that are determined to be different between two conditions may indicate the particular features within the images that distinguish between the conditions. The system 100 may generate a mask that masks these distinguishing features as relevant. For example, the mask value for those features may be set to "1." All other features of the image may be given a mask value of "0". In another embodiment, the certain features may be given a greater weight indicating an increased relevance in identifying that a condition is present.

Figure 9A:
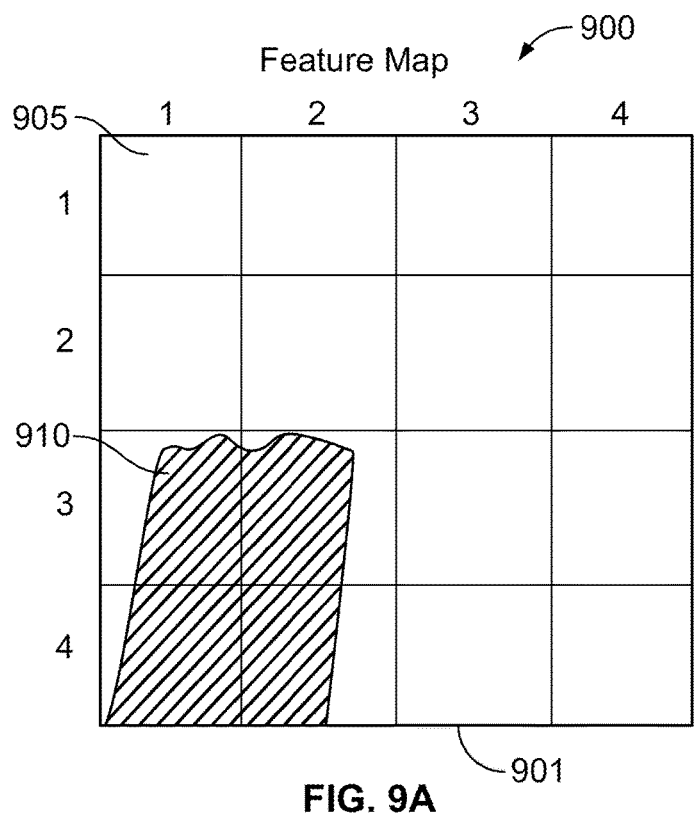
FIGS. 9A-H are example feature maps generated by the object monitoring system of FIG. 1.
Figure 9B:
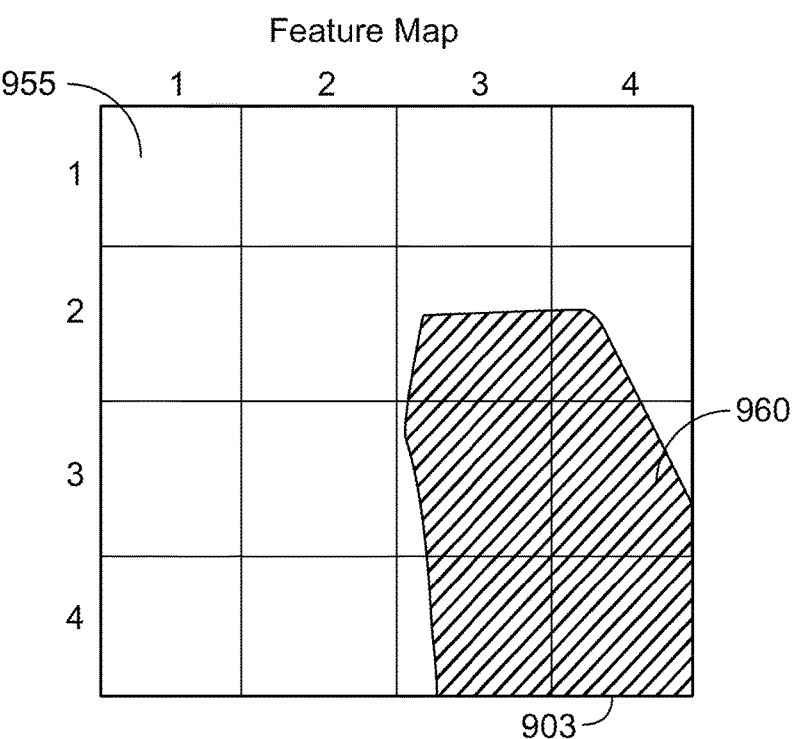

The feature maps may indicate region(s) of the image where the presence of a certain feature is required for a certain condition to be present, where the absence of a certain feature is required for the condition to be present, and where the presence or absence of any feature or any certain feature is not relevant for the condition. As an example shown in FIGS. 9A-B, the feature map for a condition where a vehicle is present in certain parking spot may include an inverted U-shape (representative of the side edges and horizontal edge of the back half of a vehicle) present within a certain region of the image, such as the region where the parking spot is determined to be. The feature maps shown in FIGS. 9A-B depict examples of feature maps that may be used where system 100 uses edge detection techniques to process the captured images. FIG. 9A shows an example of a feature map 901 for the condition where the sports car vehicle is present in the left parking spot (spot0). As shown, the feature map is divided into a 4×4 grid with 16 cells 905 and contains an object 910 resembling the back half of a sports car within the cells of the lower left quadrant of the image. FIG. 9B shows an example feature map 903 for the condition where an SUV is parked in the right parking spot of the garage. As shown, the image is divided into a 4×4 grid with 16 cells 955 and contains a square or boxy object 960 resembling the back half of an SUV in the right half of the image that extends from the bottom of the image to the second row of cells. The feature map 901, 903 may require that specific shapes be identified within certain cells 905, 955 of the image for a match to a condition to be found. For example, with respect for FIG. 9B, the feature map 903 may require that a horizontal line representing the top edge of the vehicle be present in cells (3, 2) and (4, 2) wherein the x-axis variable is the first number and the y-axis variable is the second number. As explained in more detail above, the feature map may be developed by averaging the size and location of the identified features of each image captured by the camera 110 and categorized as representing a certain condition. The system 100 may make copies of each of the extracted features of the images and translate the images in various directions by a certain amount to account for variations in a condition. For example, a user may park their vehicle in a slightly different location each time they park. The system 100 may account for variances by creating the feature map using images where the detected car is translated left or right slightly in the car's parking spot (e.g., one foot).

Figure 9C:
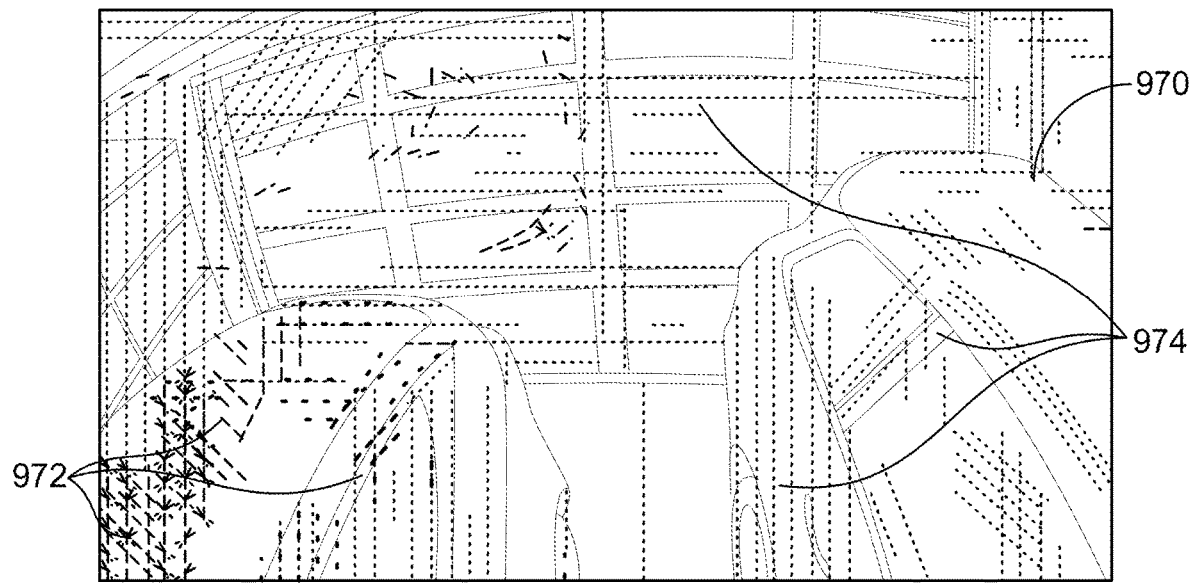
Figure 9D:
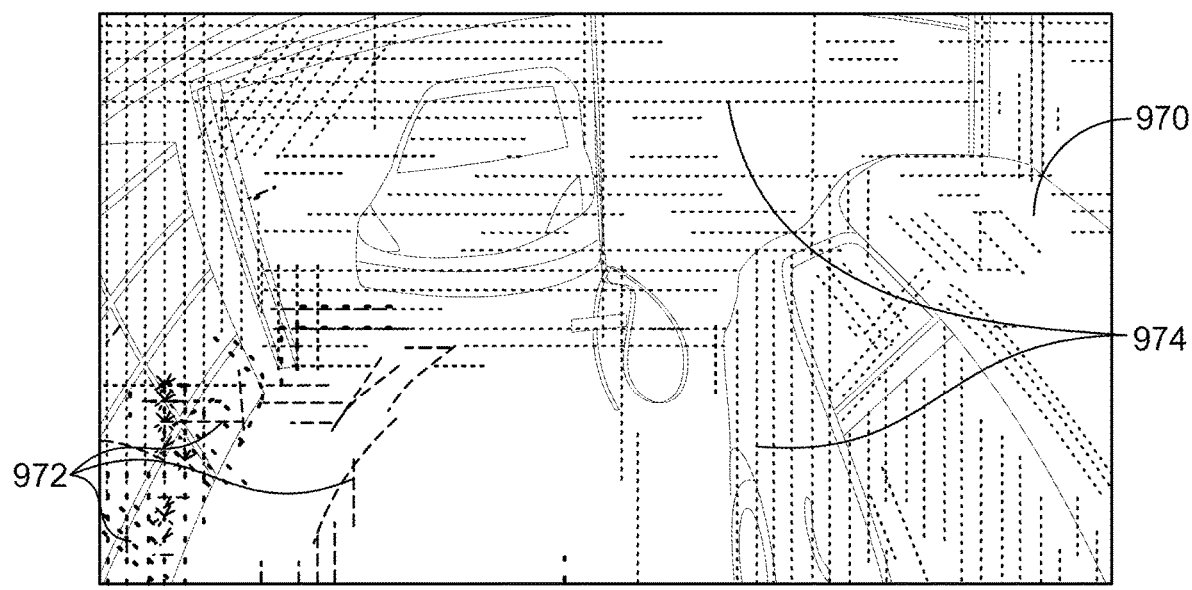
Figure 9E:
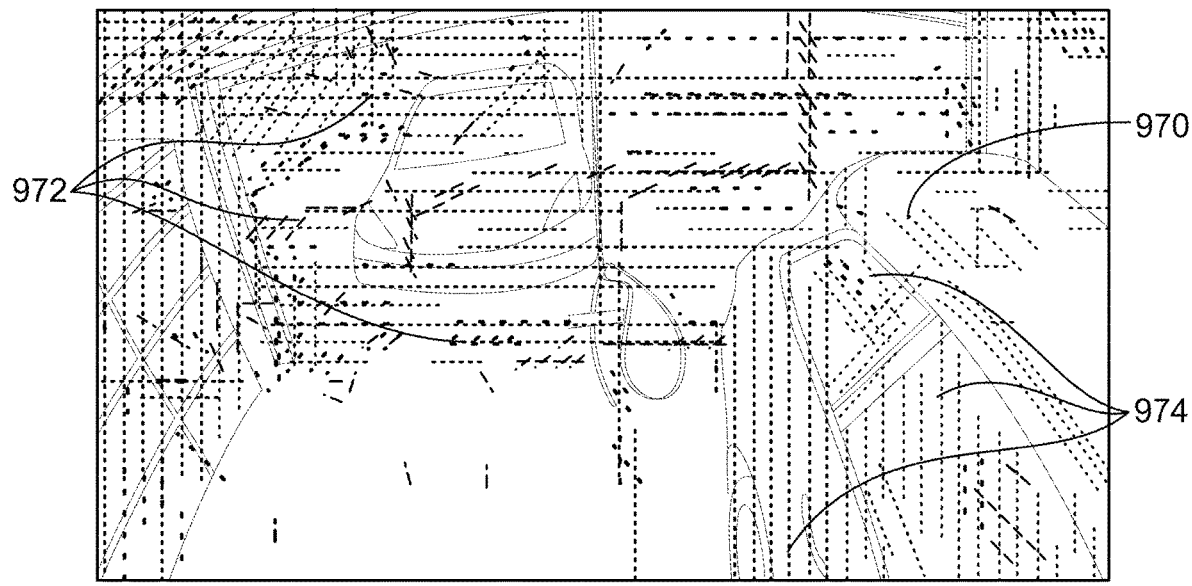
Figure 9F:
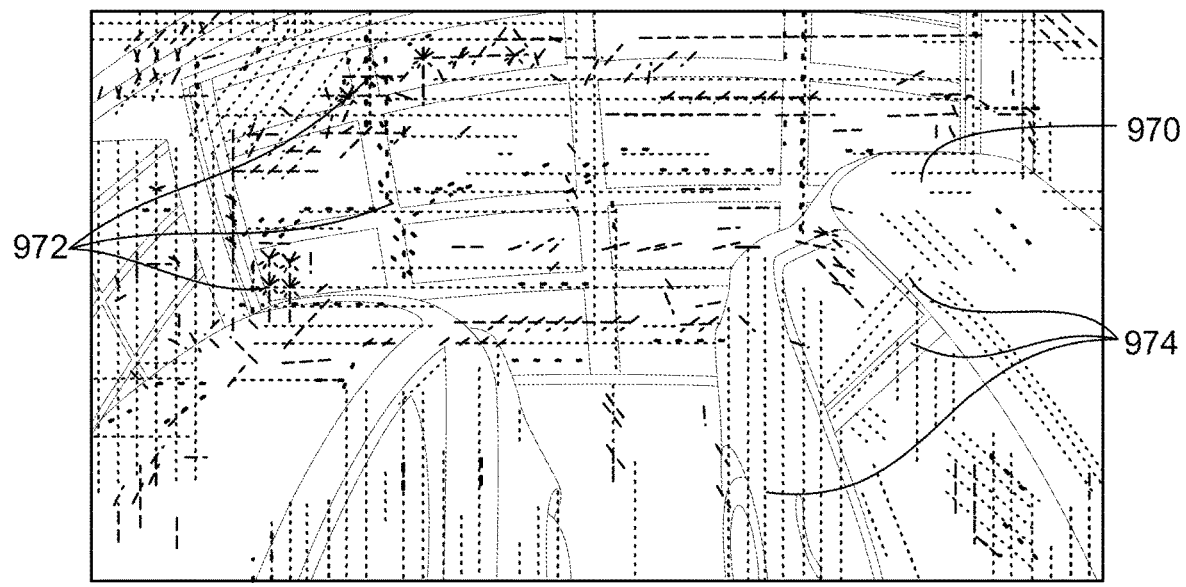
Figure 9G:
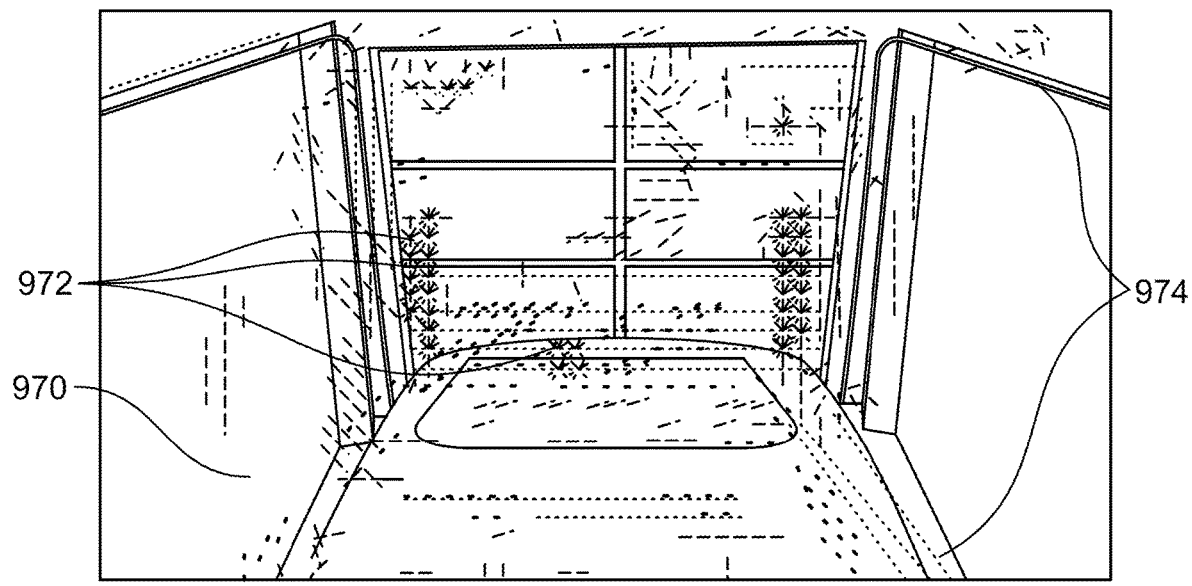
Figure 9H:
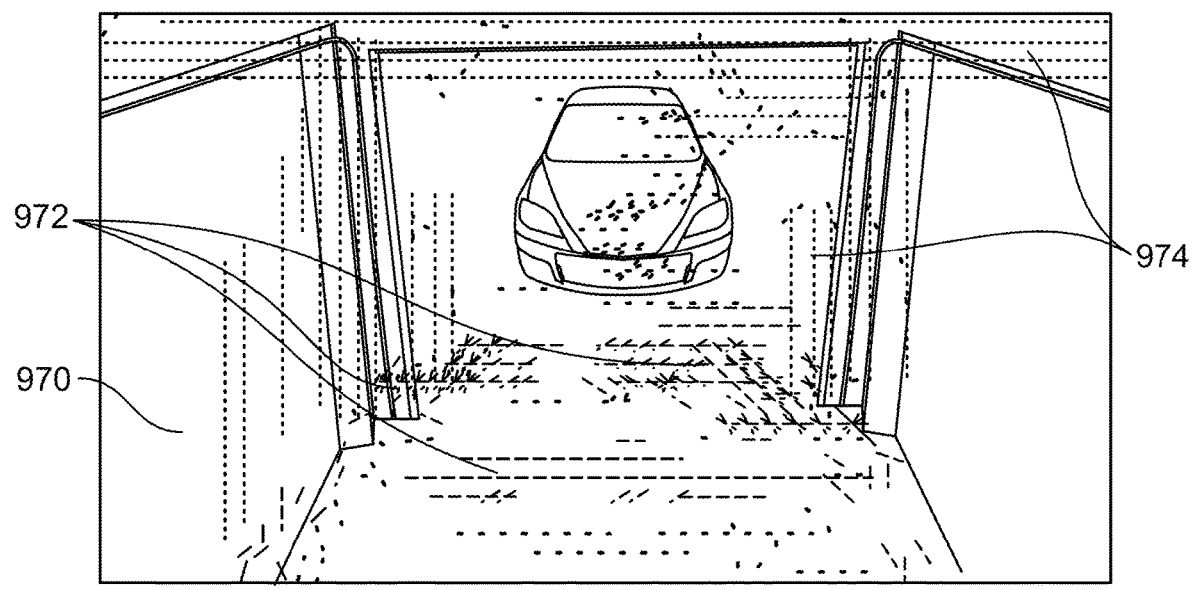

With regard to FIGS. 9C-H, example feature maps 970 are shown where the feature descriptors of the images are extracted using a HOG algorithm rather than edge detection techniques. In FIGS. 9C-H, the features of the feature maps 970 with gradient lines 972 are features the mask indicates are relevant for a determination that a condition is present. The features with gradient lines 974 are those features that the mask indicates are not relevant for a determination that the condition exists. These features are masked out and are not considered when comparing the feature maps to the feature descriptors of captured images in the use mode 60. The mask may be a matrix or table indicating which lines 972, 974 are relevant and which are irrelevant. FIGS. 9C-D show feature maps for the concern of whether the left parking spot includes a sedan. FIG. 9C shows a feature map 970 for the condition of the left spot including a sedan. FIG. 9D shows a feature map 970 for the condition that the left spot is empty. FIGS. 9E-F show feature maps for the concern of the state of the garage door. FIG. 9E shows a feature map 970 for the condition of the garage door in an open state. FIG. 9F shows a feature map 970 for the condition of the garage door in a closed state. FIGS. 9G-H show features maps for the concern of whether a sports car is parked in the center parking spot. FIG. 9G shows a feature map 970 for the condition that the center spot includes a "sports car." FIG. 9H shows a feature map 970 for the condition that the center spot is empty.

A grid may also be applied to the feature maps 970 of FIGS. 9C-H, similar to that shown and discussed in regard to FIGS. 9A-B, in order to compare the feature map to other images to determine whether a condition is present within the other image. The grid may be a 4×4 as discussed above or may be a finer grid, for example, an 8×8 or a 12×12 grid. Since the features of these feature maps are extracted using a HOG algorithm, rather than from an edge detection technique, each cell of the feature maps 970 includes a histogram of orientations rather than a shape of the edges of the relevant features. Thus, when identifying whether a condition is present within an image, the system 100 compares the histogram of orientations of each cell of the image to the histogram of orientations of each cell of the features map 970, rather than identifying whether a certain shape is present within each cell. The feature maps 970 may also be generated accounting for translation invariance, by shifting the features identified as relevant by the corresponding mask such as up, down, left, and/or right.

In embodiments where the system 100 identifies the type of vehicle parked in each parking spot, the system 100 may distinguish each specific vehicle based on the feature maps representing the conditions where that specific vehicle is present. The feature map may include the edges of the vehicle viewed from the perspective of the camera 110. The system 100 may have a first convolution that detects the vertical edges of the vehicle 115 within the image, another convolution that detects the horizontal edges, another convolution that detects the diagonal edges, etc. Alternatively or additionally, the system 100 may use a Hough transform or Sobel edge detection or pixel gradients or any other algorithm to detect edges.

With reference to FIG. 10A, an example flow diagram of the creation of a feature map from an image is shown. An image 1002 is captured by the camera 110 and processed. As shown, the image 1002 shows a sports car in the left parking spot. As a result of the processing step, a feature descriptor 1004 of the image 1002 is extracted. In the example of FIG. 10A, the feature descriptor 1004 is extracted using an edge processing technique, although other processing and extraction algorithms may be applied as discussed above. The feature descriptor 1004 may be compared with other feature descriptors related to the concern of a vehicle parked within the left parking spot to generate a mask that indicates which features are relevant to identifying whether the condition of a sports car in the left parking spot is present within an image. The feature map 1006 may be generated by combining the mask with the feature descriptor 1004, such that the feature map only includes the features relevant to a determination of whether a certain condition is present within the images. In the example feature map 1006, only the edges 1005 of a vehicle in the left portion of the garage are shown, indicating the other features of the feature descriptor 1004 are not relevant to determining whether the sport car is present in the left parking spot.

With regard to FIG. 10B, an image 1008 captured by camera 110 and known to represent the concern of the occupancy of the left parking spot may be processed similar to image 1002 of FIG. 10A to generate a feature descriptor 1010 and a feature map 1012. As shown in image 1008, an SUV is in the left parking spot. Upon processing the image 1008, the feature map 1012 only includes the edges 1014 of a vehicle in the left portion of the garage. This indicates that only the features of the SUV and its position within the image are relevant to determining that an SUV is parked within the left parking spot.

The system 100 may associate the sports car of FIG. 10A with vehicle1 and the SUV of FIG. 10B with vehicle1. To distinguish vehicle1 from vehicle1 for purposes of identifying which vehicle is in the garage and in which parking space, the system 100 may determine whether a portion of the vehicle within the image is present within a region of the image that only the tall SUV of FIG. 10B would extend into. As shown in FIG. 10A-B, to distinguish between the conditions where the sports car is parked in the left parking spot and the conditions where the SUV is parked in the left parking spot, the system 100 may evaluate whether a portion of the vehicle (or a feature descriptor representing the vehicle) is present in region 1016. The system 100 may distinguish between the conditions by using feature maps that include the top edge of the vehicle being at different locations, e.g., the top edge of the SUV is closer to the top of the image than the top edge of the sports car. The feature map for each condition may also include or require a specific shape for the top edge of the vehicle. For example, the feature map for the SUV may require the top edge to be square or boxy as shown in FIG. 10B, whereas the feature map for the sports car may require the top edge to be rounded as shown in FIG. 10A. While the example given in FIGS. 10A-B uses feature descriptors and feature maps created using edge processing techniques, feature descriptors and feature maps extracted using other image processing algorithms, such as those discussed above, may also be used to differentiate the various identified conditions of the garage.

Figure 11A:
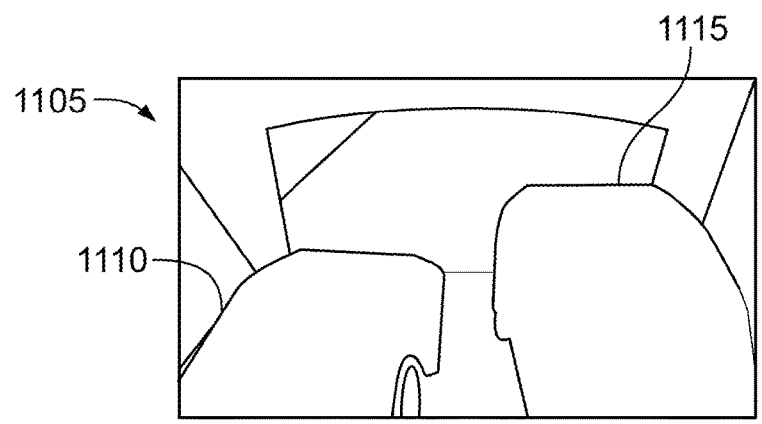
FIGS. 11A-C show example feature maps created by the object monitoring system of FIG. 1 in various environments.
Figure 11B:
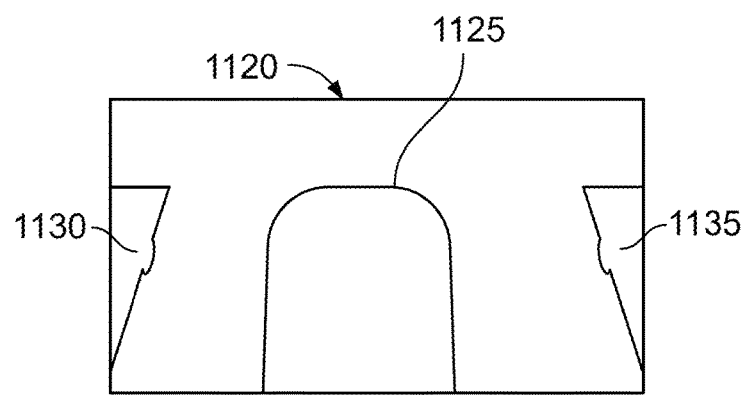
Figure 11C:
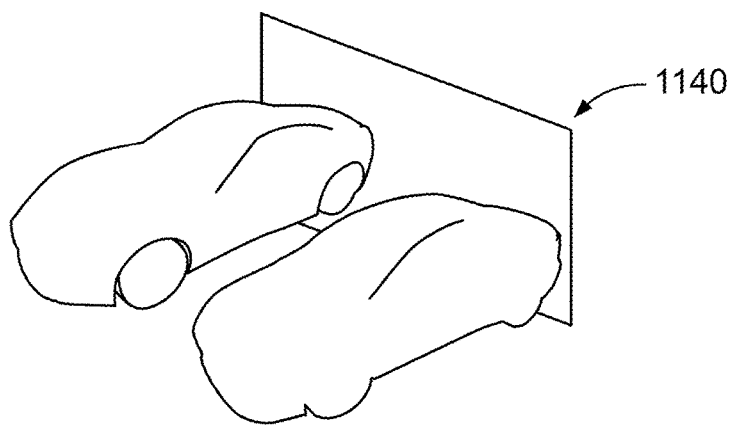

The resulting portion(s) of the feature descriptor that corresponds to whether a condition is present may be combined with a mask to form a feature map of the condition. Feature maps of various conditions are shown in FIGS. 11A-C. FIG. 11A shows an example feature map 1105 of a two-vehicle garage with single (open) garage door with an outline 1110 of sports car in the left parking spot and an outline 1115 of an SUV in the right parking spot. FIG. 11B shows an example feature map 1120 of a three-vehicle garage where the camera is centered on the middle parking spot, with all three vehicles parked within the garage. As shown, the edges 1125 of the back half of a vehicle is shown in the middle portion of the image and the edges 1130, 1135 of portions of the sides of two vehicles on the side of the feature map is shown for the other two vehicles. When determining whether a vehicle is present in each of the parking spots, the system 100 evaluates whether the captured image includes shapes, such as the edges 1125, 1130, 1135 of a portion of the vehicle, in certain locations or regions of the image that have been determined to indicate that a vehicle is present in certain parking spots. FIG. 11C shows an example feature map 1140 for a two-vehicle garage with a single garage door where the camera is at a side of the vehicles and the garage door.

Thus, the system 100 may create feature maps for each condition of the garage 102. The system 100 will then be able to process and compare an unknown image to the feature maps created to determine the condition present in an image. If the unknown image matches a feature map of a condition to a sufficient degree or above a predetermined confidence level, then the system 100 may determine that the unknown image shows the interior of the garage 102 in the condition associated with the matching feature map.

The feature maps for each condition, the feature descriptors for each image, and the masks generated may be stored by the system 100. They may be stored in memory of the server computer 120, the camera 110, the memory of the movable barrier operator 105, and/or in a persistent storage mechanism such as but not limited to a solid state drive, magnetic disk drive, or cloud storage service. The feature maps may be retrieved from the memory in the use mode 60 to determine the conditions present in images captured by the camera 110.

In embodiments where the identified conditions of the garage 102 include all monitored aspects of the garage 102, the system 100 may be able to derive a feature map for a specific condition that has not actually occurred or been captured by the camera 110. Derivation of a feature map may entail performing one or more actions (e.g., modifying, adapting, combining, mirroring, inverting, etc.) on at least one particular feature map. Returning to the conditions outlined in Table 2 for a single garage door having two parking spaces, the camera 110 may capture images of six of the eight conditions, but not capture an image for two of the conditions, e.g., Conditions 1 and 5 where a vehicle is present in both the first spot and the second spot. The system 100 may be able to derive a feature map for the condition by stitching together or combining the feature maps and/or feature descriptors associated with other conditions. For example, to create a mask for Condition 1 shown in Table 2, the system 100 may combine the masks for Conditions 2 and 3 where one vehicle is parked on either parking spot to create a mask for condition 1. The system 100, upon identifying all the conditions that could occur based on the layout of the garage, may further be able to determine which other conditions combine to create conditions for which images have not yet been captured.

As another specific example where the system 100 is configured to identify the vehicle type parked in each spot within a two-vehicle garage, a homeowner owns two vehicles—a sedan and an SUV. The homeowner always parks the sedan in the left parking spot and always parks the SUV in the right parking spot within the garage. The camera 110 is unable to capture an image of the condition where the sedan is parked in the right parking spot and/or the SUV is parked in the left parking spot because these conditions have not yet been captured by the camera 110. The system 100 may identify that no images of these situations have occurred but may determine the conditions may occur in the future. The system 100 may be configured to derive its own images, feature maps, and/or masks of the yet-to-occur condition. In this example, the system 100 may take a masked feature map of the sedan parked in the left parking spot with the right parking spot empty and mirror the masked feature map across a centerline of the garage. The system 100 thereby generates a feature map representing the condition where the sedan is parked on the right side of the garage so that if this situation ever occurs within the use mode, the system 100 can identify the condition. Likewise, the system 100 may derive a feature map of the SUV parked in the left parking spot using a feature map of the SUV parked in the right parking spot. A similar process may be used to develop a feature map of both vehicles within the garage with the SUV in the left parking spot and the sedan in the right parking spot. This mirroring process may be more easily accomplished when the camera 110 is positioned within the garage along a centerline between the two parking spots. However, the system 100 may be configured generate or derive an image based on the relative position and angle of the camera 110 to the parking spots and/or vehicles to develop or derive masks of uncaptured conditions by reconfiguring existing images at any orientation of the camera 110.

In another example of the train mode 50 of the system 100, rather than determining the conditions and categorizing each image relative to the movement of a vehicle into or out of the garage 102, a deep neural network may be used to identify conditions and categorize images as representing the identified conditions. In this method, when the camera 110 captures an image, the image is processed by a server computer 120 to determine the condition present in the image. To determine the condition present, the system 100 uses a deep neural network to identify the various objects contained within the images. The deep neural network may have been trained using images that have previously been categorized as including a feature. For example, the deep neural network may have been trained using images that allow the deep neural network to identify a vehicle of a certain year, make and model, e.g., a 2018 Toyota Corolla.

Using the deep neural network, the system 100 is able to identify the objects within the image captured by the camera 110 and begin developing the conditions of the garage. For example, using the deep neural network, the system 100 may determine that the image includes a 2018 Toyota Corolla within a certain portion of the image. In another image, the system 100 may determine that a 2018 Toyota Corolla is parked within another portion of the image. The system 100 may identify that this is the same vehicle and that it is parked in two different parking spots within the garage. As an example, the system 100 may use the license plates of vehicles to distinguish between different vehicles. The system 100 may further be able to identify images captured by the camera 110 that include a garage door 104 or a portion thereof using the images of the deep neural network. The system 100 may identify that images where any portion of the garage door is visible is associated with conditions where the garage door is closed and images where no portion of the garage door is visible corresponds to images where the garage door is open. Alternatively or additionally, the system 100 may use a pose detection deep neural network to estimate the position of the garage door 104 relative to the camera 110, whether open, closed, or at a position in between open and closed, and use this information to identify the conditions applicable to the image. Alternatively or additionally, the system 100 may use a pose detection deep neural network to estimate the position of the vehicles 115 within the garage 102 relative to the camera 110. This process may continue until the system 100 determines that there are no other conditions or after a period of time passes during which no new conditions are identified.

Figure 12:
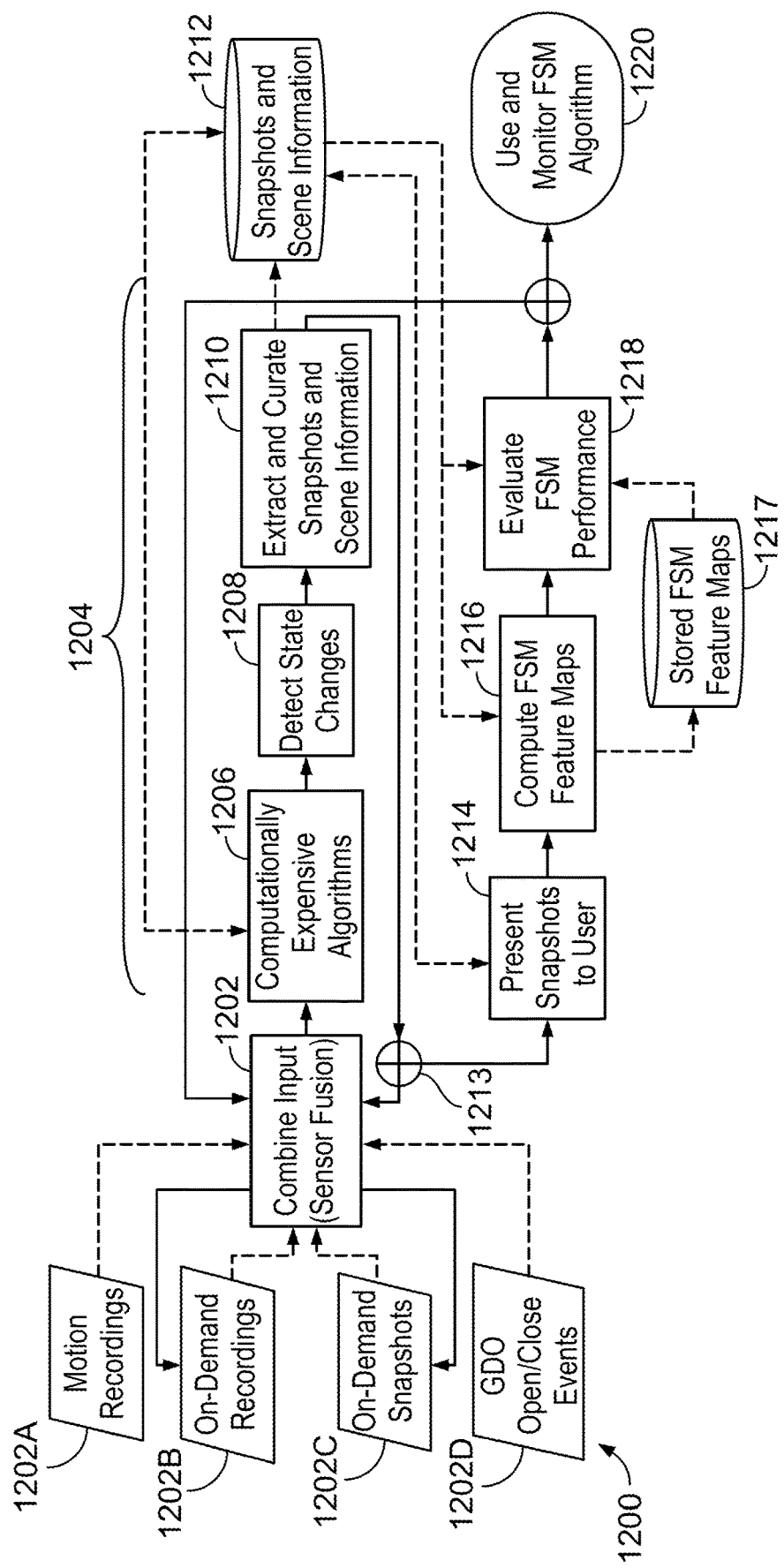
FIG. 12 is an example flow diagram of a method of operation of the "Train Mode" of the object monitoring system of FIG. 1.

In the embodiment shown in FIG. 12, the system 100 trains 1204 and identifies images representative of the various conditions of the garage using a more resource intensive algorithm, such as a deep neural network. The resource intensive algorithm may be able to detect and track vehicles, estimate the position of the garage door, select white-balance anchors, estimate the position of the vehicle within the image, determine the identified vehicles make, model, year, and/or color. The system 100 may train 1204 by using data provided by various sensors of the system 100. The system 100 may combine or fuse 1202 together the sensor data to determine when a condition is present or when a condition changed. As an example, the system 100 may receive pictures or video of motion 1202A of the interior of the garage and correlate the timestamps of the garage door opener (GDO) open/close events 1202D to determine when a condition of the garage 102 may have changed. The system 100 may also be able to request and receive video recordings 1202B and snapshot images 1202C of the interior of the garage from the camera 110 on demand, for example, upon receiving a signal that the garage door opener has received a state change request.

Using the sensor data, the system 100 runs 1206 the resource intensive algorithm to detect 1208 condition changes within the garage. The system 100 may extract and curate 1210 one or more images representing each identified condition of the garage. The images may be stored along with metadata including, for example, the door position in the image, areas of interest in the image, white-balance anchors, the vehicle color, and/or the vehicle make, model, and year. The system may also determine garage 102 scene information or environment information and store this information in memory. The scene information may include the number of doors of the garage 102, the number of parking spots within the garage 102, the location of the garage door(s) 104, the location of the parking spots, the size of the vehicles, the current state of the garage door 104, and current parking spot occupancy as examples. The system 100 may curate the collected images by removing or deleting images where more than a sufficient number of images have been captured for a certain condition. The system 100 may ensure a sufficient quantity of images and scene information 1212 has been captured and/or stored for each identified condition.

The system 100 then determines 1213 whether a sufficient number of images have been captured and associated with each identified condition to sufficiently identify the condition represented in a new image. The system 100 may present 1214 the images captured and associated with each condition to a user for verification. For example, the system 100 may prompt the user to verify whether the condition is present in the image via a client application. The captured image may be displayed to the user via a display screen (e.g., a smartphone or personal computer) along with a question for the user to answer, for example, "Does this image include two vehicles?" or "Is a vehicle present in the left parking spot?"

Once the training using the more resource intensive algorithm is complete or has been verified, the system 100 computes 1216 the feature maps for a simpler, lightweight algorithm that is less resource intensive, for example, Fast Scene Matching (FSM). The computed feature maps are stored 1217 in memory for use by the system 100 in the use mode 60. In the use mode 60, the system 100 may thus use the less resource intensive algorithm to compare images captured by the camera 110 to the computed feature maps rather than using the deep neural network to categorize each new captured image. The system 100 may evaluate 1218 the less resource intensive algorithm to determine whether the algorithm is able to successfully identify the condition of new images. This may include prompting the user to verify whether certain conditions are present in the new images. The system 100 may also evaluate whether the system 100 can identify the condition of a sufficient number of images. For example, if the system 100 is unable to identify the condition in more than 70% of the new images captured, the system 100 may reenter a training step. As another example for evaluating the accuracy of the less resource intensive algorithm, the system 100 categorizes a set of images using both the resource intensive algorithm and the less resource intensive algorithm. The system 100 may compare whether the conditions identified by the less resource intensive algorithm are the same as the conditions identified using the more resource intensive algorithms for each image. The system 100 may evaluate the accuracy of the less resource intensive algorithm based on, for example, the percentage of images that the less resource intensive algorithm categorizes the same as the resource intensive algorithm. If the system 100 determines that the less resource intensive algorithm is sufficiently accurate, the system 100 may then run 1220 the less resource intensive algorithm.

The use of deep neural networks in training may be less effective for systems 100 where the camera 110 is mounted or positioned at a unique angle within the garage. For example, many cameras 110 of garage door openers are positioned above the vehicles 115 within the garage 102 and provide images where only a top down view of the back half of the vehicle is visible within the image. The database of images used to train the deep neural network may not include images taken from such an angle. For example, the camera may be mounted low on a side wall of the garage and the deep neural network may be unable to identify a sedan from a side elevational view of the sedan.

Thus, a plurality of images of vehicles from the unique position and angle of camera 110 may need to be collected and identified in train mode 50 before the conditions of the garage 102 may be able to be identified with the requisite confidence to enable the system 100 to accurately predict the current condition of the garage 102 based on the images collected by the camera 110 in use mode 60. To collect images captured at the unique positions and angles for use with a deep neural network, the server computer 120 may be in communication with a system storing the images collected from a plurality of systems 100 installed within many garages. Each of these installed systems 100 may use a histogram of oriented gradients method or another method (e.g., manual identification) for identifying the conditions present within the images captured by the cameras 110 of the respective systems. Once the conditions are identified by the systems 100, these images may be stored or used by the server computer 120 to develop a database of images taken from the angles representative of various conditions commonly captured by cameras 110 of systems 100. These images may be further processed by a computer or humans to identify other details within the images that may be associated with the images for use within the deep neural network. For example, a human may review the content of the images and identify and tag features within the images. As an example, the make and model of a vehicle within the image may be identified and the section of the image containing the vehicle 115 may be tagged as including the identified image. Other details of the image may be identified and tagged as well, for example, whether the garage 102 is open or closed, what other objects are shown in the garage (e.g., snowblower, lawnmower, motorcycle, etc.) In this way, the database of images for comparison to new images captured by camera 110 of systems 100 may be expanded or developed, so that a deep neural network method of processing the images may be employed by the systems 100 for accurate identification of various conditions of garages.

Having a large database of images for comparison to new images captured by camera 110 may be desired where specific details about the condition of the garage are to be determined, e.g., the year, make, and model of each car parked within the garage. Using a deep neural network, the system 100 is able to identify these specific details of the conditions. Initially, the system 100 may only be able to provide generic conditions such as whether the garage door(s) is open/closed and whether vehicles are present in the one or more parking spots of a garage. As the database of identified images expands, the system 100 may periodically retrain (e.g., enter retrain mode 70) using the updated information available on the database of collected and identified images of the deep neural network. The database may be stored in the memory 160 of the server computer 120 and continually updated with data from other installed systems 100. As the database of identified images expands, the systems 100 may be able to identify conditions of the garage with greater detail and accuracy, for example, identify the specific make and model of the vehicle in each parking spot within the garage.

To aid object recognition when the camera 110 is mounted such that it captures images of portions of vehicles at unusual or unconventional angles, the system 100 may capture an image of the vehicle 115 as the vehicle 115 approaches and/or enters the garage. The image may include a front view of the vehicle 115 that is more readily identifiable by comparison to images of a deep neural network. For example, the system may identify that the vehicle that entered the garage 102 is a 2018 Toyota Corolla. The system 100 may then continue to monitor the motion of the vehicle 115 that entered the garage 102 over time. If the vehicle 115 enters the garage 102 and parks, the system 100 may categorize images of the vehicle 115 parked within the garage as including a 2018 Toyota Corolla.

As another example solution, the system 100 may identify and process the license plate number of a vehicle 115 as it enters the garage (e.g., the front license plate of the vehicle). The system 100 may also be configured to capture an image of the rear license plate. For example, a mirror may be positioned such that the camera 110 may capture an image of the rear license plate as the vehicle enters the garage 102. As another example, the system may include a camera 110 positioned to capture the rear license plate of a vehicle parked within the garage 102. In one embodiment, the system associates a certain license plate with a certain vehicle (e.g., vehicle1). The system 100 may be able to lookup the make and model of the car by searching a database of registered vehicles. Alternatively, monitoring the license plate number as a vehicle 115 enters the garage may aid the system 100 in distinguishing between two similar vehicles 115 that enter the garage 102, for example, if a homeowner owns two identical vehicle types that are the same color. As another example, the camera 110 may capture an image including the vehicle identification number (VIN) of a vehicle. The system 100 may then process the image to determine the VIN (e.g., using optical character recognition) and search or compare the VIN with a VIN database to identify the vehicle.

Figure 13:
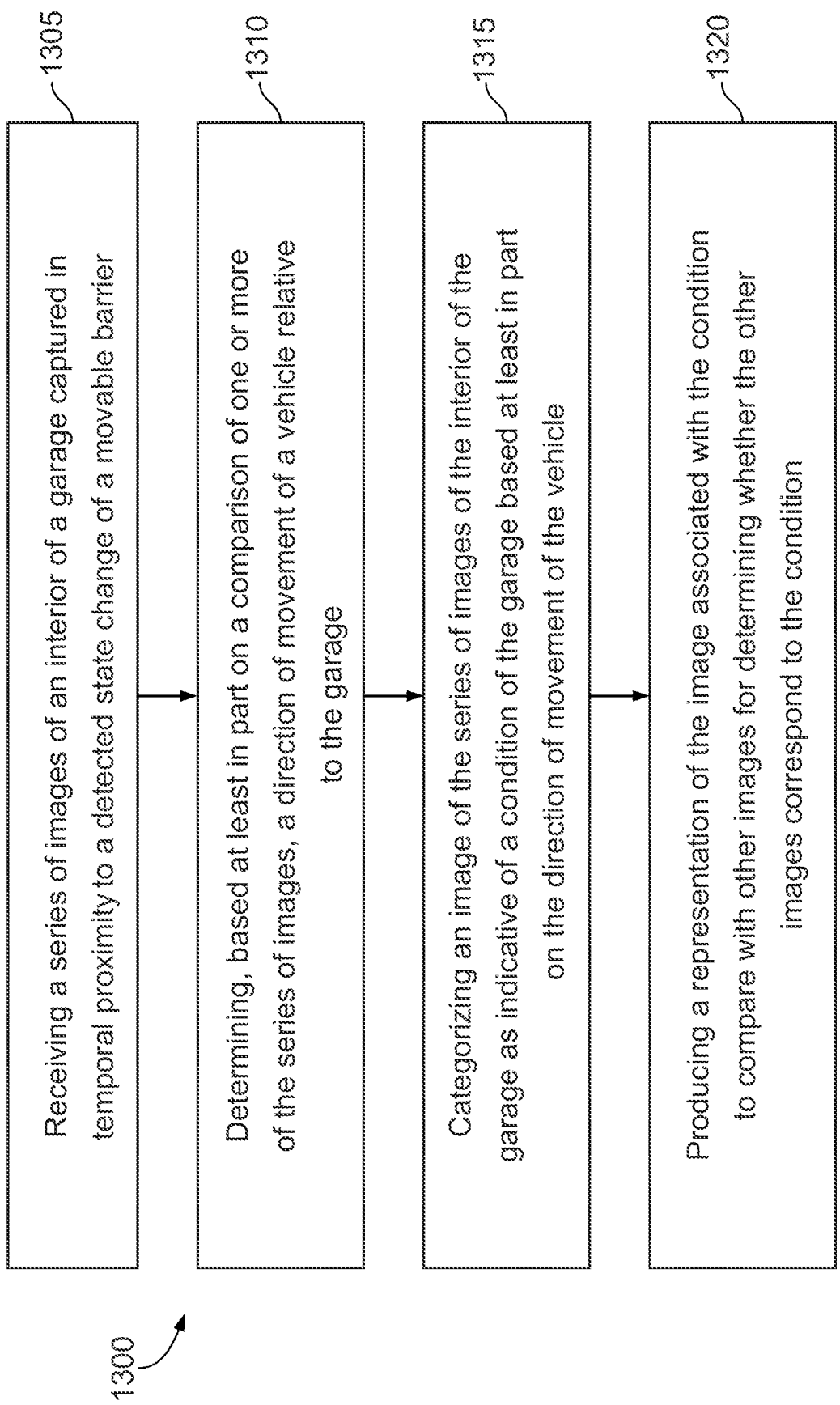
FIG. 13 is a flow diagram of an example method of training the object monitoring system of FIG. 1.

Regarding FIG. 13, a method 1300 for training the system 100 is described. The system 100 receives 1305 a series of images of an interior of a garage. The series of images may be captured in temporal proximity to a detected state change (e.g., opening or closing) of a movable barrier, e.g., a garage door. The series of images may be a series of images of a video (or a burst of still images) capturing a state change of the movable barrier. The system 100 determines 1310 a direction of movement of a vehicle relative to the garage in the series of images. The direction of movement may be determined based on a comparison of one or more of the series of images. For example, if the vehicle detected in the series of images increases in size over time and/or the vehicle moves toward the bottom of the image over time, the system 100 may determine that the vehicle is entering the garage. If the vehicle within the series of images decreases in size over time and/or the vehicle moves toward the top of the image over time, the system 100 may determine the vehicle is exiting the garage.

The system 100 then categorizes 1315 an image of the series of images of the interior of the garage as indicative of a condition of the garage. The categorizing 1315 may be based at least in part on, for example, the direction of movement of the detected vehicle, the position of the vehicle, and/or the change in size of the vehicle. For example, if the vehicle is determined to be entering the garage, then an image captured a period of time after the state change of the movable barrier and after the detected vehicle has stopped moving may be categorized as including a vehicle parked within a certain portion of the image. The images captured before the state change of the movable barrier may include the movable barrier in a closed state with no vehicle present in a portion of the image.

As another example, if the vehicle is determined to be exiting the garage, then an image captured before the state change may be categorized as including a vehicle in a portion of the image with the movable barrier in a closed position. An image captured a period of time after the movable barrier has changed states or after the detected vehicle is no longer present in the images may be categorized as not including a vehicle in the portion of the image where the vehicle was initially located. The system 100 may also determine that the vehicle or movable barrier is no longer in motion by evaluating the change in pixels from frame to frame. If the percentage change in pixels over period of time is low, the system 100 may determine that the transition between conditions is complete and that a new condition is present. The system 100 may then categorize the images once motion has been determined to stop.

The system 100 may then produce 1320 a representation of the image associated with the condition to compare with another image for determining whether the other image corresponds to the condition. The representation may include, for example, a feature descriptor, a feature map and/or a mask based on the image. For example, the system 100 may create an image specific feature map or use the image along with one or more other images to create a generalized feature map. The system 100 may create a feature map indicative of the features that should be in an image for the condition to be present in the image.

Use Mode

Once the feature maps have been created for each condition during the train mode 50, the system 100 may enter the use mode 60. In use mode 60 the system 100 operates to identify the condition of the garage 102 based on a new, uncategorized image captured by the camera 110. The system 100 determines whether the new uncategorized image captured by the camera 110 matches one of the conditions identified by the system 100 in the train mode 50. In one embodiment, the determination is performed by comparing the new image to the images categorized during the train mode 50. In another embodiment, this determination is accomplished by comparing the new image to the feature maps of each of the conditions to determine which conditions are present and which are not present in the image. If the new image corresponds to a condition identified during the train mode 50, the system 100 may determine the condition of the categorized image is present. The system 100 may the store the identified condition of the garage 102 along with the time the new image was captured by the camera 110. In some embodiments, the system 100 may also output the identified condition of the garage 102, for example, by the server computer 120 to a user's smartphone or smartphone application.

With reference again to the example system 100 operation of FIGS. 5A-5B, the system 100 may enter the use mode 60 once training is complete. The system 100 may obtain 520 an image for analysis. The image may be an image recently captured by the camera 110. The system 100 runs 522 the algorithm trained in train mode 50 to determine the condition of the garage. As shown in this example, the algorithm is the Fast Scene Matcher that uses HOG to analyze the images. To determine the condition of the garage 102, the system 100 compares the captured image to the feature maps generated in train mode 50. If the captured image corresponds to a condition with a high enough confidence value, the system 100 may determine that that condition is present in the captured image. The system 100 may then determine 524 whether the garage 102 has changed states by comparing the present condition determination with the previous condition determination. If the condition has changed, the system 100 may update 526 and/or store the present condition and may notify the user and/or other systems of the current condition of the garage 102. If the condition is determined to be the same as it was previously, the system 100 may store the current condition along with the time the current condition was confirmed to still exist. If the system 100 is unable to determine the current condition, for example, the captured image does not match any of the previously identified conditions learned in the train mode 50, the system may determine 528 that the system 100 must be retrained and enter the retrain mode 70, discussed below.

With reference to FIG. 8B, an example process 880 used by the system 100 to compare a captured image to the feature maps generated in the train mode 50 is shown. An unknown image 882 (i.e., an image that has not been previously categorized as representing a condition) captured by camera 110 is processed similar to the process used by the system 100 in the train mode 50. The unknown image 882 is subjected to preprocessing step 884 such one or more actions described in relation to the preprocessing step 854 of the train mode 50. The system 100 may then extract 886 features from the unknown image 882 to generate a feature descriptor 888, for example, using one or more of the extraction techniques discussed in relation to the extraction step 856 in the train mode 50. In one embodiment, the same preprocessing and extraction operations used in train mode 50 are applied to the unknown image 882 in the use mode 60.

The feature descriptor 888 of the image 882 may then be compared 890 to all of the feature maps 860, 862 generated during the train mode 50. The system 100 may determine the degree of correlation of the features of the feature descriptor 888 to one or more of the feature maps 860, 862. In one embodiment using a HOG feature descriptor and a grid mask, the degree of correlation may be calculated by computing the numeric difference in each of the bins of each of the cells of the HOG feature descriptor 888 with the corresponding bin of the corresponding cell of feature maps 860, 862. The system 100 may only compare the cells that are indicated to be relevant by the mask 866, 876 of the feature map 860, 862. If the numeric difference is below a certain threshold, then the system 100 may determine that the feature of the feature descriptor 888 matches the feature of the feature map 860, 862. The degree of correlation of feature descriptor 888 to an individual feature map 860, 862 may be calculated by dividing the number of features that are considered to be a match by the total number of features that the features map 860, 862 indicates are relevant. In another embodiment, the degree of correlation between the feature descriptor 888 and the feature maps 860, 862 may be calculated by summing all of the difference values computed between each bin of each of cell of the feature descriptor 888 and the corresponding bins the features map 860, 862 and dividing that sum by the total number of features that the feature map 860, 862 indicates to be relevant. This provides a mean value which may be used to indicate the degree of correlation between the feature descriptor 888 and the feature map 860, 862. In one example, the mean value is subtracted from 100 percent to provide a correlation value.

The system 100 may use a weighted comparison to determine the condition present in the unknown image 882. The system 100 may, for example, generate a correspondence score of the unknown image 882 to each of the feature maps 860, 862 for each condition or concern. The system 100 may determine feature maps 860, 862 with the highest correspondence score(s), and choose 892 such feature maps as possibly representing the conditions present in the unknown images 882. The system 100 may then check 894 whether the correspondence score is above a minimum threshold for determining that a match exists.

In one embodiment, the unknown image 882 is compared 890 to each of the generalized feature maps 862. If the correspondence value between the generalized feature maps 862 and the unknown image 882 is below a threshold for a concern, the system 100 may compare the unknown image 882 to each of the image-specific feature maps 860 associated with that concern. One or more of the image-specific feature maps may return a correlation value that is above the threshold, which the system 100 may use in determining the condition present in the unknown image 882 (e.g., the condition associated with the image-specific feature map is present). This approach of comparing first to the generalized feature maps 862 and then to the image-specific feature maps 860 only if a minimum correspondence value has not been found for a condition may reduce the amount of processing the system 100 must do to determine the condition present within the unknown image 882.

In some embodiments, to compare 890 the feature descriptor of the unknown image 882 to the feature maps 860, 862, the system 100 compares each feature of the feature map 860, 862 to the features extracted from the unknown image 882. The system 100 may determine whether each feature of the feature map 860, 862 is present in the unknown image. The system 100 may determine a correspondence score based on the percentage of features of the feature map 860, 862 successfully found within the feature descriptor of the unknown image 882. For example, if more than 50% of the features of the feature map is found to be present in the feature descriptor of the unknown image 882, the system 100 may determine the condition of the feature map is present in the unknown image.

Figure 14A:
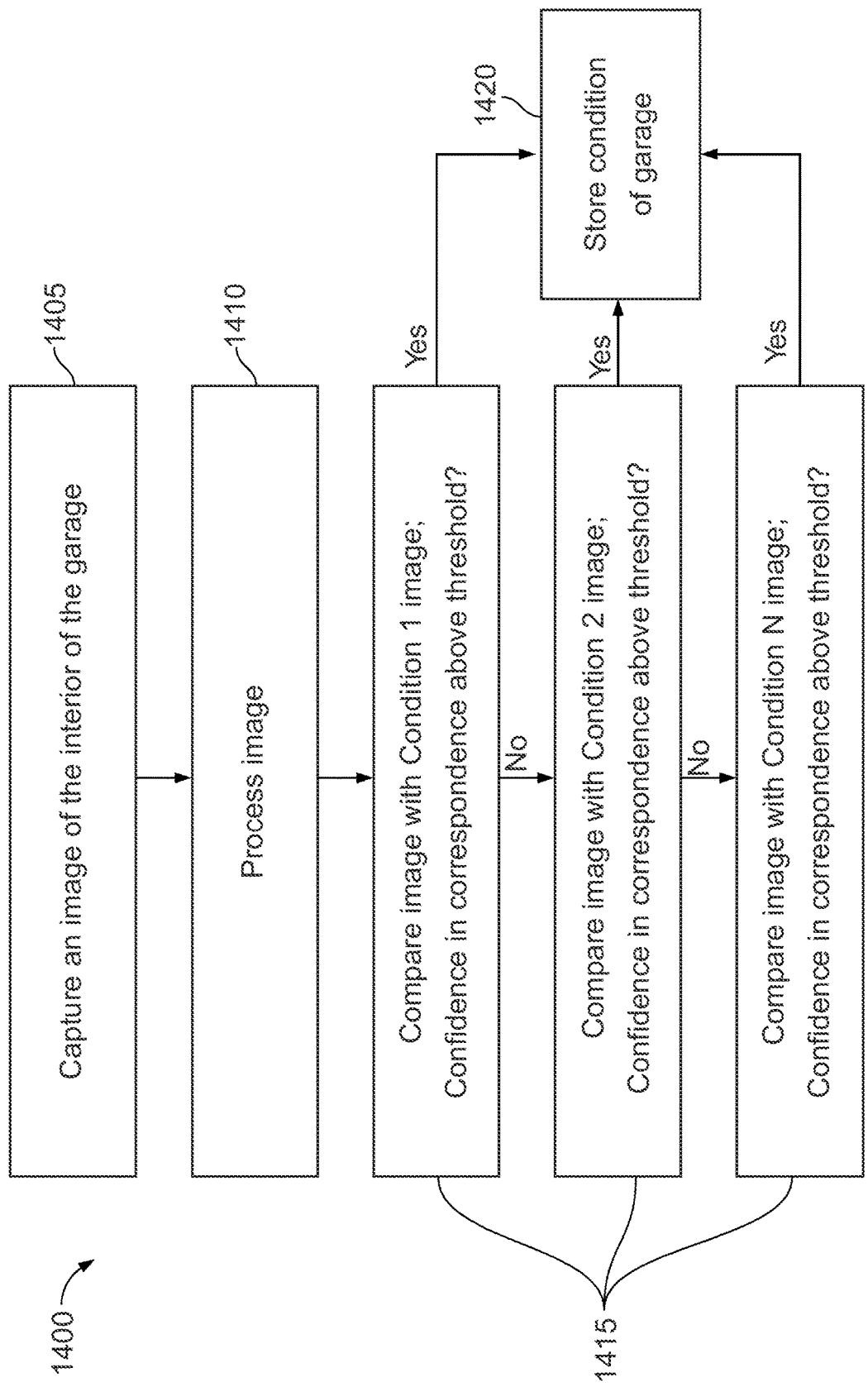
FIGS. 14A-B are flow diagrams of example methods of condition identification utilized in the "Use Mode" of the object monitoring system of FIG. 1.

Regarding FIG. 14A, an example method 1400 for identifying an unknown condition of the garage is provided. Initially, the camera 110 captures 1405 an image of the interior of the garage 102. The camera 110 may capture an image periodically, for example, every hour. In another example, the camera 110 captures an image of the interior of the garage 102 in response to a trigger or an input, for example, a user's request whether a vehicle 115 is present in the garage 102 via a smartphone application. As another example, the input may include a user requesting a remote start of the vehicle 115. As yet another example, the camera 110 captures one or more images a period of time upon a state change of the movable barrier, e.g., capturing a plurality of images for two minutes after a state change. The camera 110 may be commanded to capture an image by the movable barrier operator 105 or server computer 120. Alternatively, the camera 110 continuously captures images (e.g., a video stream) of the interior of the garage 102 and the movable barrier operator system 105 or server computer 120 selects one or more images of the video stream for processing.

Once the image is captured, the method 1400 includes processing 1410 the image. The processing may be performed by the movable barrier operator 105, the camera 110, and/or the server computer 120. In one embodiment, the camera 110 is connected to the network 125 and transmits images the camera 110 captures to the server computer 120 and/or the movable barrier operator 105. The movable barrier operator 105 may process the image or transmit the image to the server computer 120 for processing. In one embodiment, the image is pre-processed by the camera 110 or movable barrier operator 105 and then transmitted to the server computer 120 for further processing. During pre-processing, the image may be resized to fit the required dimensions for processing and comparison to the categorized images stored during the train mode 50. The image may otherwise be preprocessed by reducing the resolution of the image, adjusting the contrast within the image, deleting features within the image, and/or reducing the image frequency similar to the image pre-processing steps described in regard to the images captured in the train mode 50. CLAHE may be applied to the image with an 8×8 tile size. A low-resolution 2D feature map may be extracted from the image similar to the process described in the train mode 50. In this regard, a HOG may be calculated for the image, for example, with a 12×12 cell size, 1×1 cells per block, and 8 orientation bins. The histogram may be normalized within each cell of the feature map. The images may be pre-processed and processed using the same pre-processing and processing steps used on the images processed during the train mode 50. When using some processing algorithms, for example, a HOG algorithm, the same parameters (e.g., cell size, cells per block, and orientation bins) used to process images in the train mode 50 should be used when processing the images in use mode 60.

The image may be compared 1415 to the images and/or feature maps associated with each condition stored in memory from the train mode 50. To compare the images, a feature descriptor is generated using the HOG algorithm on the image. The feature descriptor of the image is then compared to the feature maps of one or more conditions stored in memory. For each feature, a distance may be computed between the values of the feature descriptor of the new image and the feature maps for the conditions. This distance may be a difference in the relative position of the features of the new image within the image frame to the relative position of the feature of feature maps within the image frame. The distance may be a difference in the position values of the features listed in a table or matrix. For certain conditions, the feature descriptor of the new image may be shifted left, right, up, and/or down to find the best correspondence between the feature descriptor of the image and the feature maps of the conditions. This may be done when using grid-based feature extraction algorithms.

Based on the comparison between the feature descriptor of the image and the feature maps of the conditions, a match percentage or correspondence value may be computed. The match percentage or correspondence value may represent how close the new image corresponds to each condition's average feature map.

A confidence value for the correspondence between the new image and a condition may be calculated. The confidence may be calculated, for example, according to the following confidence formula:

Confidence Value=(bestCorrespondence−secondBest-
Correspondence)*confidenceMultiplier.

By subtracting the correspondence value of the second-best correspondence from the best correspondence value, the system 100 is able to determine the degree to which the image corresponds to only one of the conditions. This allows the system 100 to determine whether the image has a similar correspondence value to more than one condition, which would indicate that condition of the best correspondence value is not clearly better than the second-best correspondence condition. If the difference is not great enough, e.g., above a certain threshold, the system 100 may determine that no correspondence has been found. If the difference is greater than the predetermined threshold, then the system 100 may determine that a correspondence has been found with the condition that resulted in the best correspondence value. The system 100 may then store 1420 the identified condition of the garage in memory. The time the image was captured may also be stored or associated with the stored condition of the garage. The confidenceMultiplier may be a fixed constant that is predetermined to be effective in determining a confidence in a match.

In some embodiments, the system 100 may compare more than one new image captured by the camera 110 for comparison to the conditions identified during the train mode 50. The new images may be a series of images taken close in time to one another, for example, spaced apart by one second. A correspondence value and confidence value may be calculated for each image. The system 100 may compare the confidence values in the correspondence identified and determine the condition of the garage based on all of the series of images. For example, the system 100 may determine that if the confidence value of a correspondence for two of three images is above the threshold level then a correspondence is found. Alternatively, the system 100 may average the correspondence values of each of the images to each condition and determine a confidence value in a match to the conditions based on the averaged correspondence values. If the average correspondence value to one of the conditions is above a threshold confidence value, the system 100 may determine the condition is present.

In embodiments where a new image is initially only compared to the generalized feature maps for each condition, upon a determination that the computed confidence value is not high enough (i.e., it is below a certain threshold), the system 100 may then compare the new image to the feature map for the individual images of each condition, rather than the generalized feature maps. This may account for situations where the new image has a high correspondence with an individual feature map stored for the condition but does not provide a high correspondence value when compared to the generalized feature map. The best and second-best image correspondence for each condition are again kept. Then, the best correspondence and second-best correspondence may be entered in the confidence computation formula. If this produces a high enough confidence value in the correspondence, then the system 100 may determine that a correspondence to the condition that best matched the new image has been found. The system 100 may then store 1420 the condition of the garage and the time which the image was captured.

The method 1400 may also be performed for each sub-condition forming the condition. A sub-condition may be the features that make up a certain condition where, for example, a condition includes two or more concerns. Where the condition is that the garage door is open, a vehicle is parked in the left spot and a vehicle is parked in the right spot, there are three sub-conditions (e.g., (1) the garage door is open, (2) a vehicle is parked in left spot, and (3) a vehicle is parked in right spot). A correspondence value may be generated for each sub-condition of the condition rather than generating a single correspondence value for the match to the entire condition. For example, a condition may be that the garage door is closed, a vehicle is parked in spot 1, and a vehicle is parked in spot 2. To determine that the condition is present in the new image, the system 100 may match each sub-condition of the condition (e.g., state of garage door, whether there is a vehicle in spot 1, whether there is a vehicle in spot 2) with all feature maps of conditions where that sub-condition is present. As an example, to determine if the new image includes a vehicle parked in spot 2, the system 100 may compare and generate a correspondence value of the new image to the portions of the feature map or images of all conditions where a vehicle is parked in spot 2. These conditions may or may not match other sub-conditions of the new image. For example, the new image may be compared with images where the garage door is open rather than closed or a vehicle is not parked in spot 1. The system 100 may generate a low correspondence value for the sub-conditions that are not present in the image (e.g., garage door closed and parking spot 1 empty), but may indicate that the new image corresponds to all conditions indicating a vehicle is parked in spot 2. Thus, if the system 100 generates a high correspondence level across multiple conditions that all include a vehicle parked in spot 2, the system 100 may determine that the new image includes that sub-condition, i.e., that the new image includes a vehicle in spot 2.

In other embodiments, the system 100 may compare a portion of image to only a portion of the conditions. This may be done when the system 100 receives additional information (e.g., from a sensor) or determines that only certain aspects of the garage have changed. For example, if the system 100 receives information or determines that movement (e.g., vehicle movement) has only occurred on the right side of the garage, the system 100 may compare only the right side of a new image with the right side of the feature map of each of the identified conditions. As another example, the system 100 may receive information regarding the current position of the garage door from a sensor, such as door position sensor 150. The system 100 may determine the state of the garage door at the time an image was captured before comparing the image to the conditions. If the system 100 determines that the garage door was closed when the image was captured, the system 100 may only compare the image to the conditions where the garage door is closed.

A correspondence value may be calculated for specific regions or portions of the image that are associated with certain sub-conditions. A confidence value may also be generated similar to the method described above. Similar correspondence and confidence determinations may be made for each sub-condition within the new image. Once the sub-conditions have been analyzed, the system 100 may determine which condition includes all the sub-conditions identified in the new image and determine that the condition is present. Also, if one or more sub-conditions do not have a correspondence with a high enough confidence level, the system 100 may still be able to identify at least one or more aspects of the condition of the garage 102 and store the sub-conditions identified. The system 100 may optionally present the identified sub-conditions to a user.

Figure 14B:
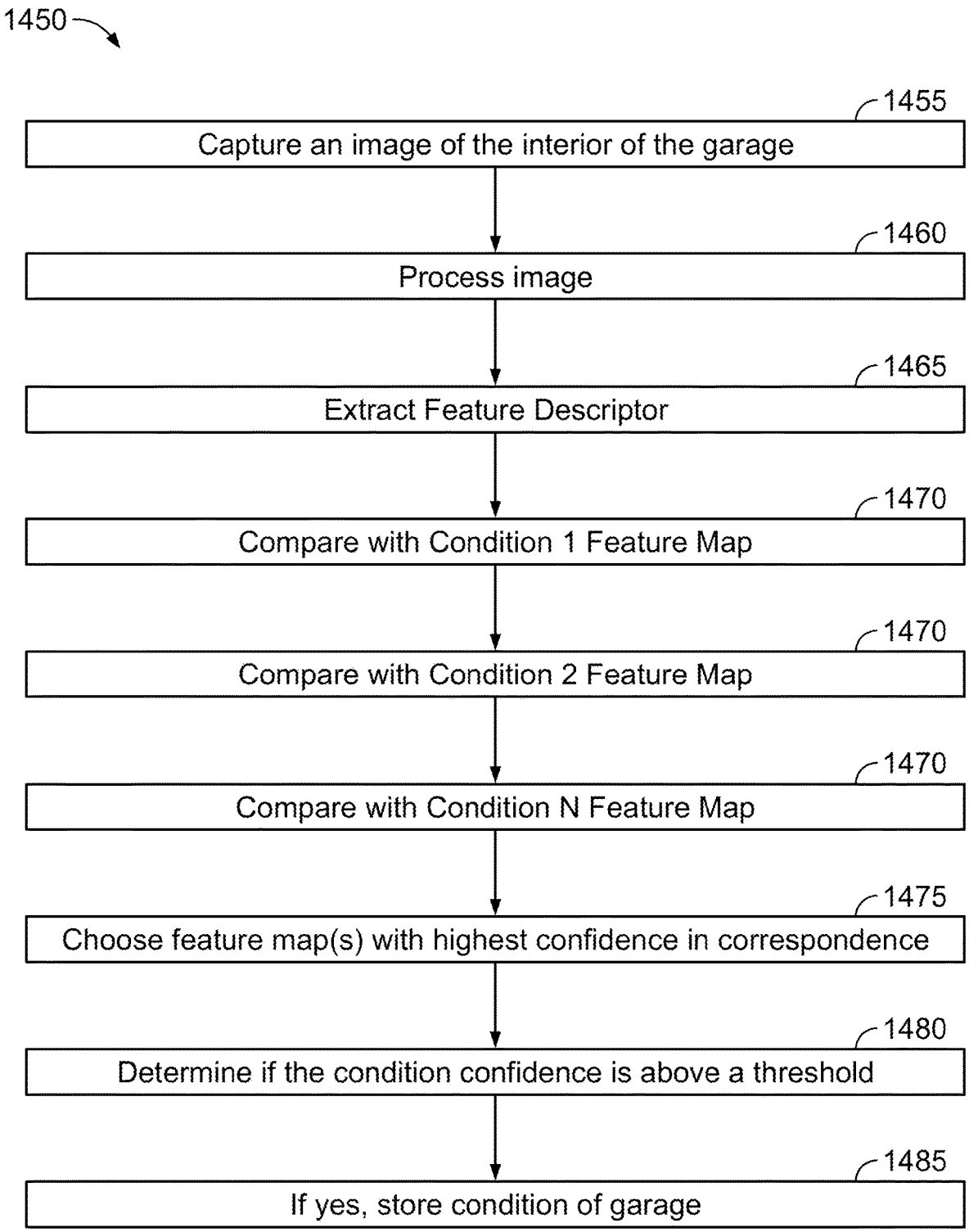

In another embodiment, shown in FIG. 14B, an example method 1450 for identifying a condition of the garage is provided. In this embodiment, the camera 110 captures 1455 an image of the interior of the garage 102. The system 100 then processes 1460 the image to prepare the image for feature extraction, for example, using one or more of the preprocessing steps described previously. The system 100 extracts 1465 a feature descriptor from the image captured by the camera 110.

The system 100 compares 1470 the feature descriptor of the image with each feature map stored in the system 100 associated with a condition. Each feature map may, for instance, represent a single condition of a single concern. For example, a first feature map may include only features relevant for a determination that a vehicle is parked in the left parking spot, a second feature map may include only features that are relevant for a determination that no vehicle is parked in the left parking spot, a third feature map may include only features that are relevant for a determination that a vehicle is parked in the right parking spot, a fourth feature maps may include only features relevant to a determination that no vehicle is parked in the right parking spot, etc.

Upon comparing the feature descriptor of the image to each of the feature maps associated with the conditions, the system 100 may choose 1475 the feature map with the highest confidence value. A feature map may be chosen for each concern of the garage 102 (e.g., the state of the garage door, the condition of the left parking spot, and the condition of the right parking spot). A confidence value may be generated using the difference between the feature maps producing the highest correspondence value and the second highest correspondence value. For example, the system 100 may compare the correspondence value between the feature maps with the highest correspondence value and the second highest correspondence value to evaluate the confidence in the correspondence between the image and the highest corresponding feature maps. A confidence value in the selection of a feature map for each concern may be generated.

The system 100 then determines 1480 whether the confidence value for the chosen feature map(s) is above a minimum threshold for concluding that the condition is present in the image. As an example, the minimum threshold for the confidence value may be 50% or 70%. If the confidence in the correspondence is above the set minimum threshold value, the system 100 concludes that the condition is present in the image and stores 1485 the current condition of the garage 102 in memory. If the confidence in the correspondence is below the minimum threshold value, the system 100 may determine that it was unable to determine the condition present in the image for that condition. The minimum threshold may be set at a value below which the confidence is too low for a match to be found with a certain degree of confidence.

The system 100 further may determine that a condition cannot be found where the correspondence value between the feature maps of the conditions are below a certain value. For example, if the highest correspondence value between the feature descriptor of the unknown image and the feature map for a concern is below a 40% correspondence, the system 100 may conclude that the condition is not present.

In some embodiments, the system 100 may use multiple cameras 110 to determine whether a condition is present within the garage 102. In train mode 50, the system 100 may capture and store images captured by all cameras 110 of the system 100 within the garage 102 upon determining that a condition is present (e.g., based on images captured by one camera 110). For example, where system 100 includes a camera 110 mounted to the movable barrier operator 105 and a camera 110 mounted at a sidewall of the garage 102, if the system 100 determines that a condition is present (e.g., a vehicle 115 is within the left parking spot), the system 100 may capture or store images captured at that time by both cameras 110 for use in generating feature maps for the identified condition. The use of multiple cameras 110 captures images of the interior of the garage 102 at different perspectives may result in the generated feature maps for each condition being based upon different features of the interior of the garage 102.

In use mode 60, the system 100 may use the images captured by both cameras 110 to determine whether the various conditions are present within the garage 102. If one of the images of one camera 110 results in a sufficiently high correspondence, the system 100 may conclude that the associated condition is present, even if the comparison based on the image captured by the other camera 110 results in a low correspondence. The system 100 may determine that a portion of the environment within the field of view of the camera 110 resulting in a low correspondence has changed. In some embodiments, this image may be stored and used to generate or update the feature maps for the identified condition for that camera 110.

Alternatively or additionally, in generating feature maps, the system 100 may concatenate features extracted from the images captured by both cameras 110. The concatenated features of the images associated with each condition may be used to generate a feature map for the condition associated with the images. Using this approach, in use mode 60, the system 100 may determine the condition of the garage 102 using images captured by both cameras 110 based on the degree of correspondence between the concatenated feature maps and the extracted features of images captured by both cameras 110. This may aid to increase the accuracy of a determination that a condition is present when the environment within the garage 102 has changed slightly, for example, the vehicle 115 is shifted to the left or right side of the parking spot or has entered the garage 102 at an angle. The change in the environment within the garage 102 may have little impact on the comparison with the features of the feature map associated with one camera 110 while having a larger impact on the comparison with features of the feature map associated with the other camera 110. Thus, use of multiple cameras 110 within the system 100 for determining whether conditions are present may increase the probability that a condition will be properly identified in use mode 60 when the vehicle 115 or garage 102 environment changes slightly. While the above example describes the system 100 including two cameras 110, the system 100 may include three or more cameras 110 and use methods similar to those described above in identifying when various conditions are present within the garage 102.

Retrain Mode

Upon determining that a new condition is present or that the confidence in the correspondence of a captured image is too low in the use mode 60, the system 100 may operate in a retrain mode 70 to update the representation of one or more previously identified conditions and/or identify new conditions. With reference again to FIGS. 5A-5B, in use mode 60, the system may determine 528 that the system 100 needs to be retrained. As an example, the system 100 may be unable to identify the condition present within a captured image. Upon determining that the system 100 needs to be retrained, the system 100 may follow the same or similar steps as those taken as those discussed in regard to the train mode 50 to retrain the system 100. The system 100 may retrieve or collect 540 an image or series of images captured by the camera 110 and analyze 542 each image to extract metadata. The system 100 may then analyze the metadata to determine the conditions present within each image or across the series of images. The system 100 determines 544 whether a sufficient number of images have been collected, stored, and associated with each identified condition. If not, the system repeats steps 540, 542, and 544. If enough images have been categorized, the system 100 may present 548 one or more images to the user to confirm the system 100 accurately identified the condition present in the images. If the user indicates the system 100 has not accurately identified the conditions, the system 100 may continue collecting and analyzing images. If the user indicates the system 100 has accurately identified the conditions the system 100 may in operation 550 regenerate one or more feature maps for the algorithm used during use mode 60.

In one example, the system 100 updates the conditions previously identified by the system in the train mode 50. The system 100 may determine that one or more conditions no longer exist and purge these conditions from the system 100. This purging may occur, for example, when a previously unknown vehicle (e.g., a temporary rental/loaner vehicle, a newly purchased/leased vehicle, etc.) is captured in an image. The system 100 may determine that the old vehicle is no longer present in the images captured by the camera 110 and delete the conditions including the user's old vehicle. The system 100 may add conditions including the new vehicle. In another example, upon entering the retraining mode, the system 100 erases the conditions and the associated images it previously categorized and begins retraining the system 100 from a factory reset-type condition, i.e., enters train mode 50.

Figure 15:
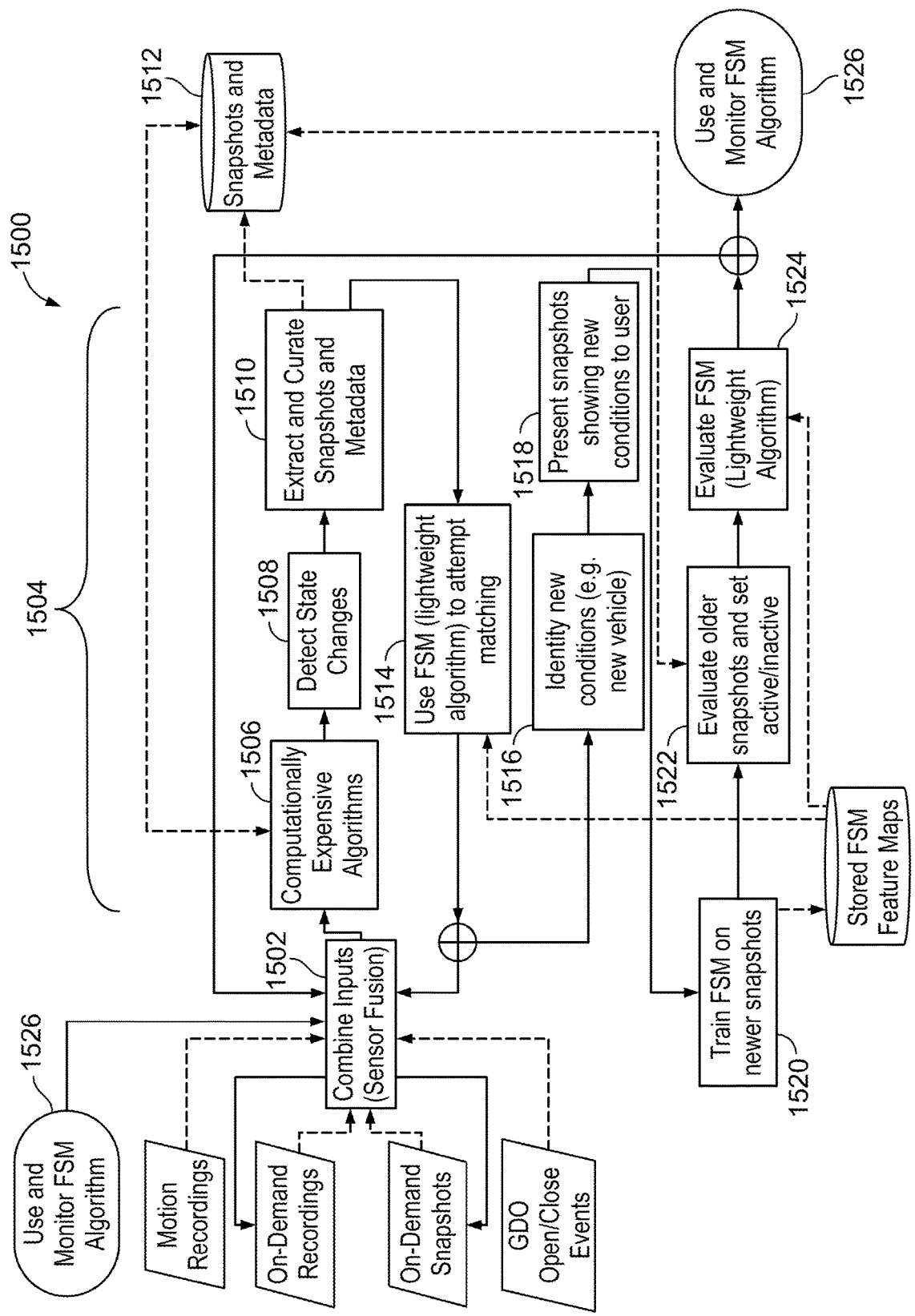
FIG. 15 is an example flow diagram of a method of retraining the object monitoring system of FIG. 1 when a new condition is identified.

As shown in FIG. 15, the system 100 may train and retrain using a more resource intensive algorithm, such as a deep neural network, but run a less resource intensive or lightweight algorithm such as Fast Scene Matching during the use mode 60.

As an example, the system 100 may determine that a new condition exists. A new condition may be, as an example, when a homeowner buys a new vehicle and parks it within the garage 102 and the system 100 is unable to identify the vehicle type of the vehicle parked in the garage 102 based on the identified conditions from train mode 50. The system 100 may then retrain 1504 using method 1500 shown in FIG. 15. Method 1500 is similar in many respects to the training method 1200 described in relation to FIG. 12 with the differences between the methods discussed below.

To retrain the system 100, the system 100 may run 1506 the more resource intensive algorithm to identify the condition(s) the system 100 was unable to identify using the less resource intensive algorithm. The system 100 may receive and compile 1502 the data from the sensors of the system 100. The system 100 may detect 1508 changes in the condition of the garage and extract and curate 1510 images and metadata for each detected condition of the garage and store the images and metadata in a database 1512. The system 100 may use 1514 the same algorithm previously employed (or to be employed) in use mode 60 to identify the condition of a new image using the representations, data, and/or algorithms from the previous training. Where the system 100 is unable to identify the condition present in the image using the previous training, the system 100 may determine that a new condition exists and identify 1516 the new condition. The system 100 may also flag and/or store images the system 100 is unable to identify in the use mode 60 for processing when the system 100 enters the retrain mode 70.

Once a sufficient number of images have been captured and processed for a new condition, the system 100 may identify the condition and generate a representation of an image of the condition. The identification may include presenting 1518 the images to the user for verification as described in relation to FIG. 12.

The system 100 may then train 1520 the less resource intensive algorithm, such as Fast Scene Matching (FSM), using the new captured images identified using the more resource intensive algorithm. The system 100 may then evaluate 1522 whether to keep the conditions and related representations for the old conditions that the system 100 may determine may no longer occur (e.g., the homeowner sold a vehicle and it hasn't appeared in any images for a year). The system 100 may determine whether to modify the previous conditions with the conditions or information learned using the more resource intensive algorithms or to remove the old conditions. The system 100 may then evaluate 1524 and use 1526 the less resource intensive algorithm in the use mode 60.

Alternatively, upon identifying that a new condition exists, the system 100 may completely retrain. In this embodiment, the system 100 may delete or replace the previous training entirely. The retrain mode 70 of the system 100 may be similar to train mode 50, where the system 100 collects and categorizes images of the interior of the garage 102 over time for all conditions. Once a sufficient number of images have been captured for each identified condition, the system 100 may reenter the use mode 60. The system 100 may also use a less resource intensive algorithm (e.g., FSM) to retrain the system 100 to identify conditions. In an embodiment where the system 100 initially trained and learned the conditions of the garage using HOG, the system 100 may retrain using HOG. In another embodiment, the system 100 may retrain using a deep neural network. In an embodiment where the system 100 initially trained and learned the conditions of the garage using a deep neural network, the system 100 may retrain using a deep neural network as described in relation to FIG. 12. In still other embodiments, the system 100 may train using a first technique (e.g. HOG) and retrain using a second technique (e.g. deep neural network).

Figure 16:
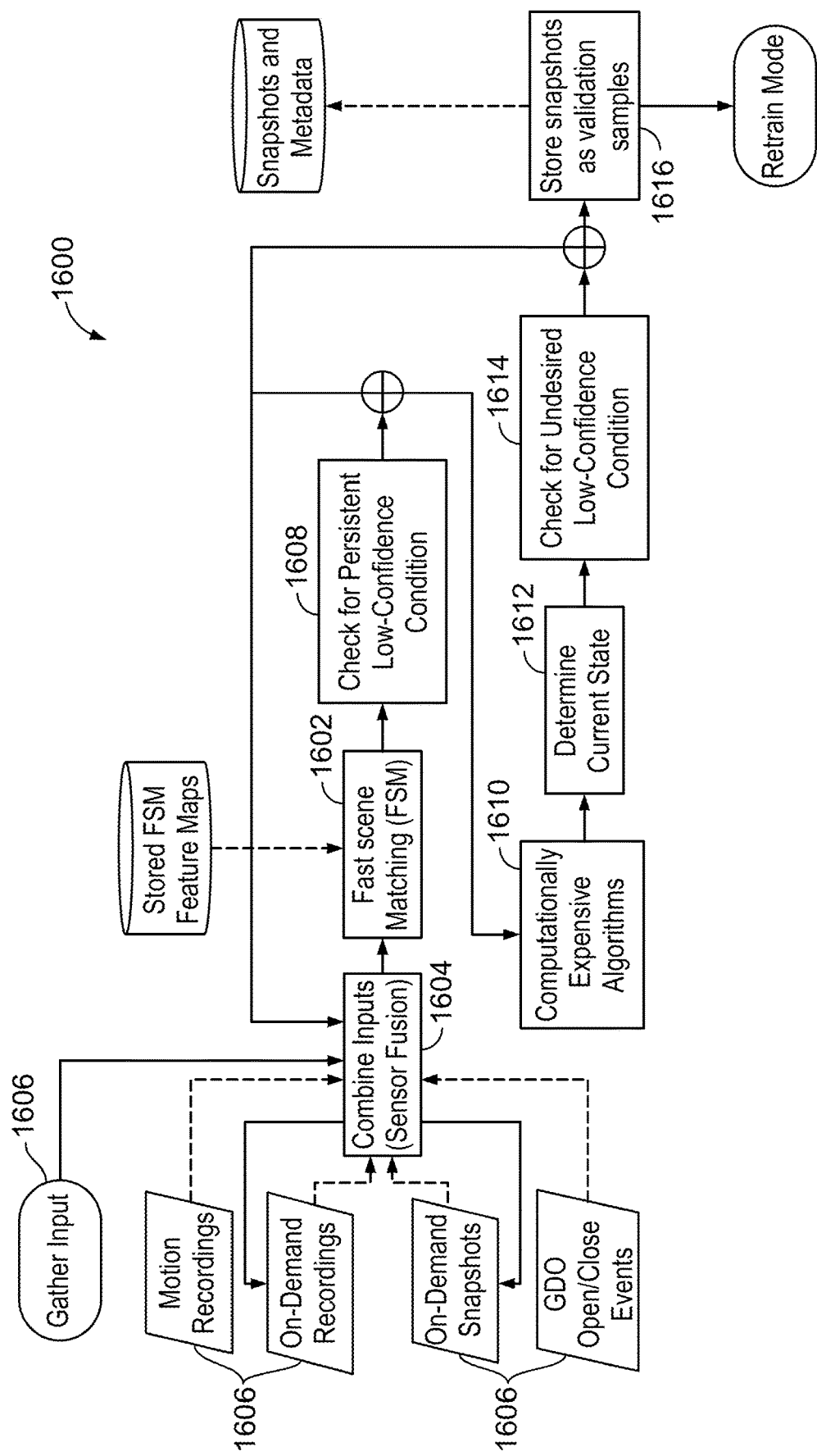
FIG. 16 is an example flow diagram of a method of operation of the "Retrain Mode" of the object monitoring system of FIG. 1 when one or more condition identification confidence values are persistently low.

With reference now to FIG. 16, the system 100 may perform method 1600 upon the system 100 consistently returning a low confidence value for the correspondence between a captured image and the stored conditions during the use mode 60. The system 100 may run 1602 a less resource intensive algorithm such as an FSM algorithm when the system 100 is running in the use mode 60. The system 100 may receive and compile 1604 input from various sensors and data input sources 1604. The system 100 may be configured to check or identify 1608 when the correspondence confidence level for a captured image is too low for the image to be associated with any of the identified conditions. As an example, movement or shifting of the camera 110 capturing images of the interior of the garage 102 may have occurred. Upon determining that the confidence in the correspondence of a captured image is too low, the system 100 may enter the retrain mode 70 and run 1610 a more resource intensive algorithm to identify the condition of the garage 102 in the captured image and/or to update the representation for each condition (e.g., the feature maps) of each previously identified condition and identify new conditions.

As shown in FIG. 16, upon running the more resource intensive algorithm(s), the system may determine 1612 the condition of the garage shown in the image causing the low confidence value. The system 100 may further check 1614 for an undesired low confidence condition, i.e., a condition where the less resource intensive algorithm shows persistent low confidence values, but should show a high confidence value based on the results of the more resource intensive algorithms (e.g., deep neural network). The system 100 may then store 1616 the new image, associating the new image with the identified condition. The system 100 may regenerate the representation(s) of the image(s) of the condition, e.g., feature maps for the identified condition. The system 100 may retrain the less resource intensive algorithms using the new images and/or representations and reenter the use mode 60.

Figure 17:
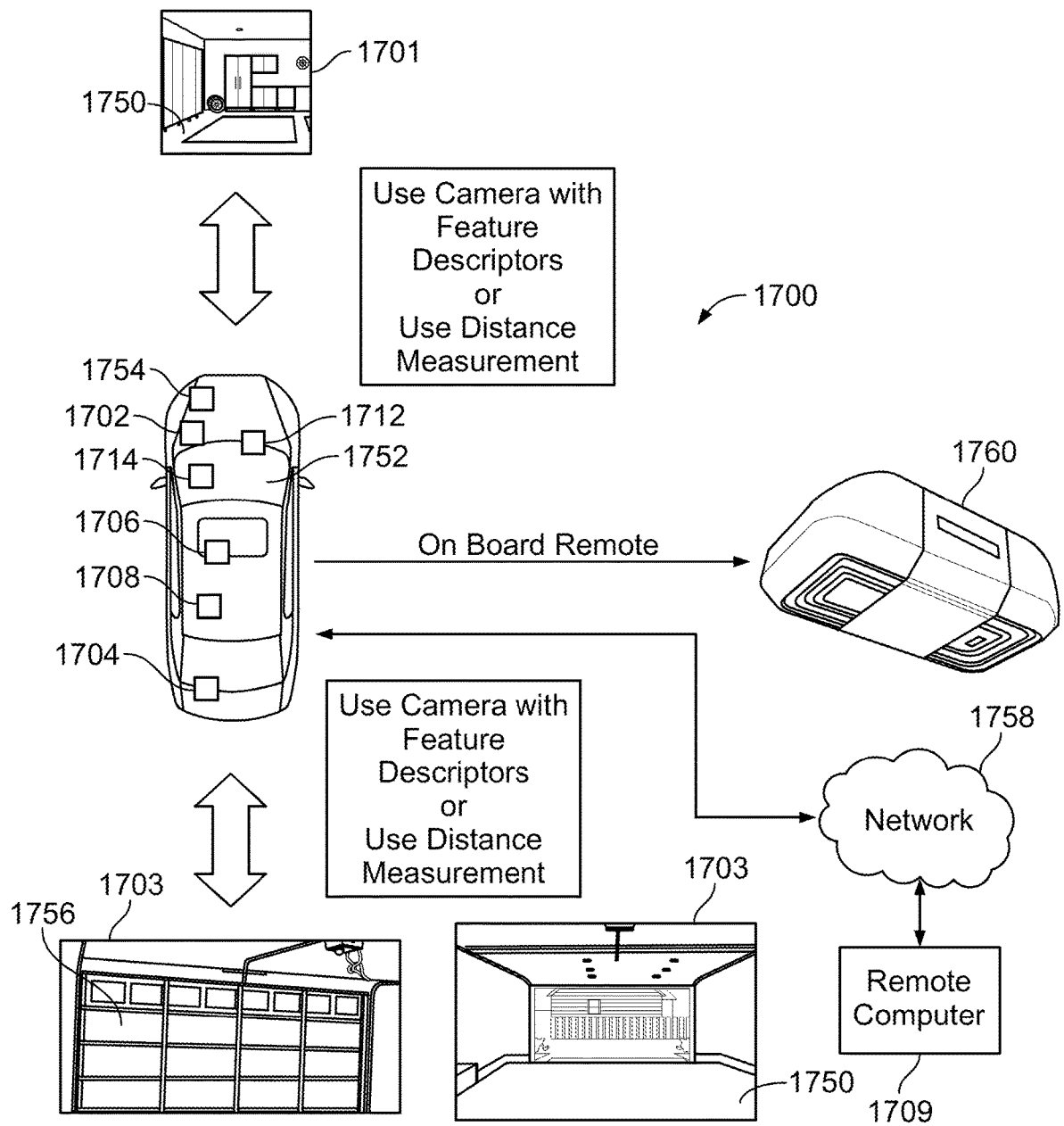
FIG. 17 is an example block diagram of another object monitoring system.

With reference to FIG. 17, another system 1700 for determining one or more conditions of the garage 1750 is provided. In this embodiment, the system 1700 may determine the presence of the vehicle 1752 within the garage 1750 using images or data 1701 provided by a camera 1754 or sensor 1702 of the vehicle 1752 instead of or in addition to using a camera mounted within the garage 1750 (e.g., a camera 110 of the movable barrier operator 105) as in system 100. The system 1700 may use similar image processing techniques such as those described in detail in regard to system 100 of FIGS. 1-16 to determine when identified conditions of the garage 1752 are present. The system 1700 may also determine the state of the garage door 1756 of the garage 1752 using images and/or data 1703 provided via the camera 1754 or sensor 1702 of the vehicle 1752. In some embodiments, system 1700 may be used along with system 100 described above to provide redundancy and/or multiple inputs for determining the conditions of the garage 102.

The vehicle 1752 may include one or more cameras 1754 and sensors 1702 mounted to the vehicle 1752 to aid in determining whether the vehicle 1752 is in the garage 1750. The one or more cameras 1754 may include one or more front facing cameras, one or more rear facing cameras, and/or one or more side-facing cameras. In some embodiments, one or more cameras 1754 may be mounted to the exterior of the vehicle 1752. In some embodiments, one or more of the cameras 1754 are mounted within the vehicle with the image sensor facing outward through a window of the vehicle (e.g., a forward-facing camera mounted to the dashboard facing outward through the windshield). The vehicle 1752 may also include one or more sensors 1702 at the exterior of the vehicle 1752 to aid in determining the conditions of the vehicle 1752 and/or the state of the garage door 1756. The sensors 1702 may be, for example, parking sensors of the vehicle 1752. The sensors 1702 may be, for example, radar or ultrasonic proximity sensors configured to measure the distance between the vehicle 1752 and an object. Alternatively or additionally, the sensors 1702 may include one or more LIDAR sensors. In some forms, the sensors 1702 include light sensors, configured to measure the brightness of light about the vehicle 1752. The vehicle 1752 may further include GNSS circuitry 1714 which may be used to determine the location of vehicle 1752, using, for example, the Global Positioning System (GPS).

The vehicle 1752 includes a processor 1704 and memory 1706 in communication with the cameras 1754 and sensors 1702 of the vehicle 1752. The processor 1704 may communicate with the cameras 1754 to cause the cameras 1754 to capture images. The processor 1704 may also communicate with the sensors 1702 to cause the sensors 1702 to gather data. The cameras 1754 and sensors 1702 may communicate the images and data to the processor 1704. The processor 1704 may store the images and sensor data to the memory 1706. The processor 1704 is also in communication with the GNSS circuitry 1714. The processor 1704 may be configured to request and receive the location of the vehicle 1752 via communication with the GNSS circuitry 1714.

The processor 1704 may be configured to process the images, sensor data, and/or location data to determine the condition of the vehicle 1752 and state of the garage door 1756. The processor 1704 may communicate all or a portion of the images, sensor data, and/or location data to a remote computer 1709 for processing and/or storage via communication circuitry 1708 of the vehicle 1752. Where the system 1700 is described herein as performing one or more operations, those having skill in the art will recognize that the operation may be performed by one or more components of the system 1700 such as via the processor 1704 of the vehicle, via the remote computer 1709, and/or a processor of a movable barrier operator 1760 of the garage 1750.

The communication circuitry 1708 of the vehicle 1752 may be configured to communicate with remote devices via a wireless connection, for example, one or more of Wi-Fi, Bluetooth, cellular, Near Field Communication (NFC), Zigbee, Z-Wave, Starlink, ad hoc peer-to-peer link (e.g., V2V, V2I, V2X) and the like. The communication circuitry 1708 may be configured to communicate with remote devices via a network 1758. The network 1758 may be or include, as an example, a local Wi-Fi network that is connected to or in communication with the internet. As one example, the communication circuitry 1708 may communicate with a server computer associated with the vehicle 1752 via the internet. The communication circuitry 1708 may also be configured to communicate directly with devices, for example, the movable barrier operator 1760.

The communication circuitry 1708 of the vehicle 1752 may also include a transmitter 1712 that is configured to communicate with the movable barrier operator 1760. The transmitter 1712 may, for example, communicate state change requests to the movable barrier operator 1760 to cause the garage door 1756 to move between open and closed positions. The transmitter 1712 may also be configured to act as a transceiver to request and receive the status of the garage door 1756 from the movable barrier operator 1760. The transmitter 1712 may be in communication with the processor 1704 such that the processor 1704 may cause the transmitter 1712 to send a state change request to the movable barrier operator 1760. The processor 1704 may also cause the transmitter 1712 to request status information of the garage door 1756. The transmitter 1712 may communicate information pertaining to the status of the garage door 1756 to the processor 1704 upon receiving the status of the garage door 1756 from the movable barrier operator 1760. The transmitter 1712 may be configured to communicate, unidirectionally or bidirectionally, one or more security codes such as changing or rolling codes with the movable barrier operator 1760 as part of the state change requests.

The system 1700 may operate, in many respects, similar to system 100 described above. The system 1700 enters a train mode where the system 1700 captures a plurality of images. The images may be categorized as representing one or more conditions of the garage 1750. Example conditions in this embodiment include that the vehicle 1752 is in the garage 1750 and the garage door 1756 associated with the garage 1750 is closed. Once a sufficient number of images have been collected for the relevant conditions, the system 1700 may process the images associated with each identified condition to produce feature maps for each condition as described previously. When the condition of the vehicle 1752 and/or garage 1750 is desired to be known, the system 1700 may capture images, extract features from the images, and compare the extracted features of the images to the feature maps for each condition. If the extracted features of the captured images sufficiently correspond with one or more conditions, the system 1700 may conclude that the one or more conditions are present.

Figure 18:
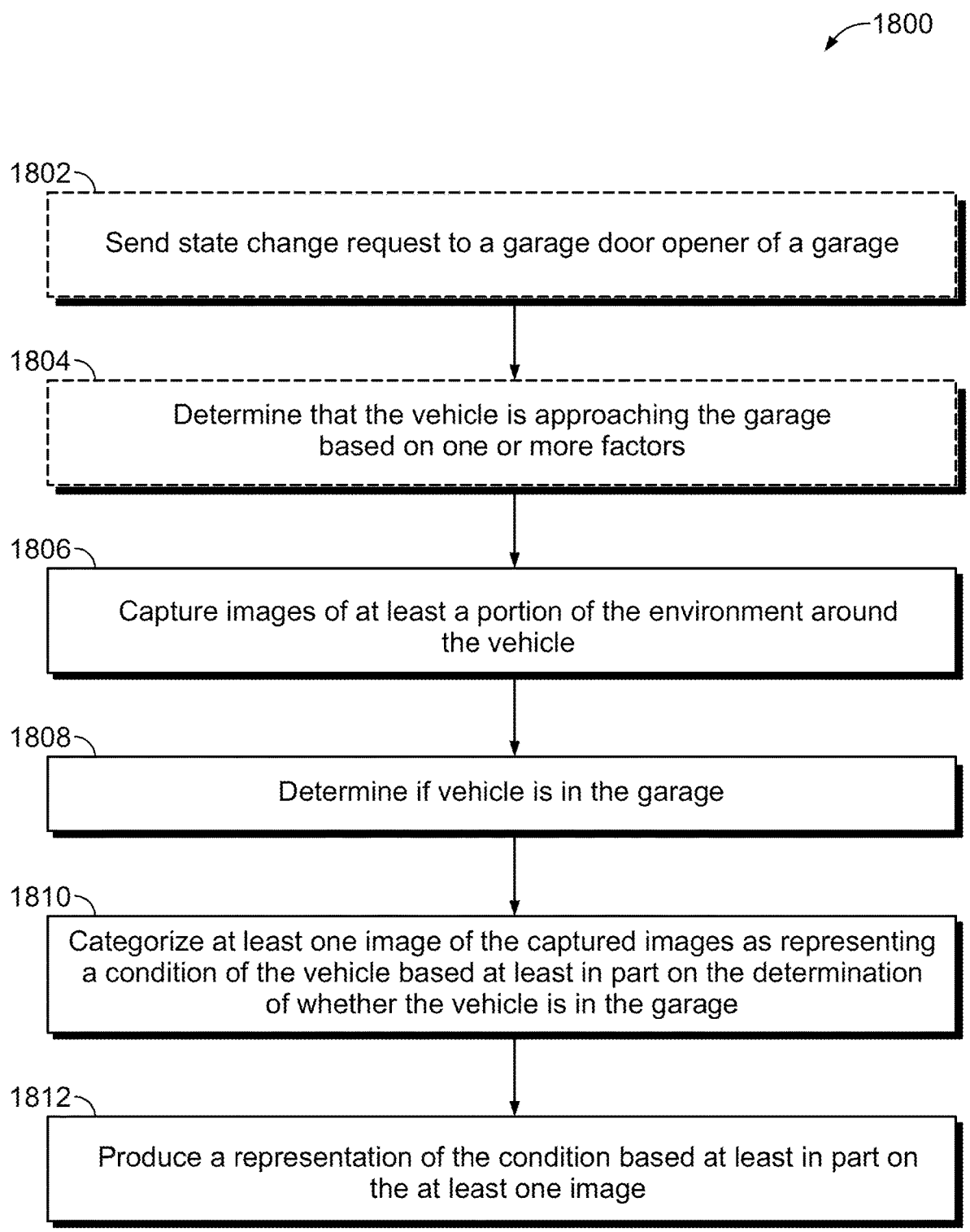
FIG. 18 is an example flow diagram of a method of operation of the "Train Mode" of the object monitoring system of FIG. 17.
Figure 19:
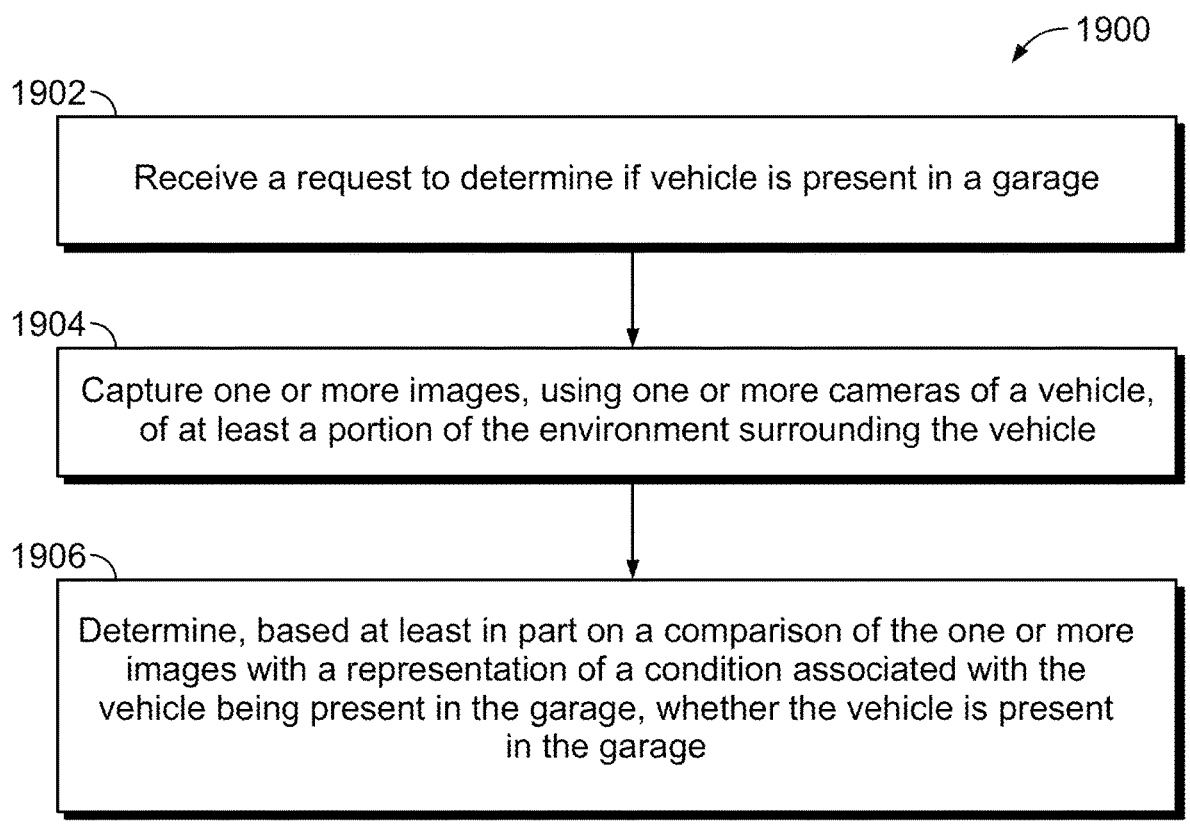
FIG. 19 is an example flow diagram of a method of condition identification used in the "Use Mode" of the object monitoring system of FIG. 17.
Figure 20:
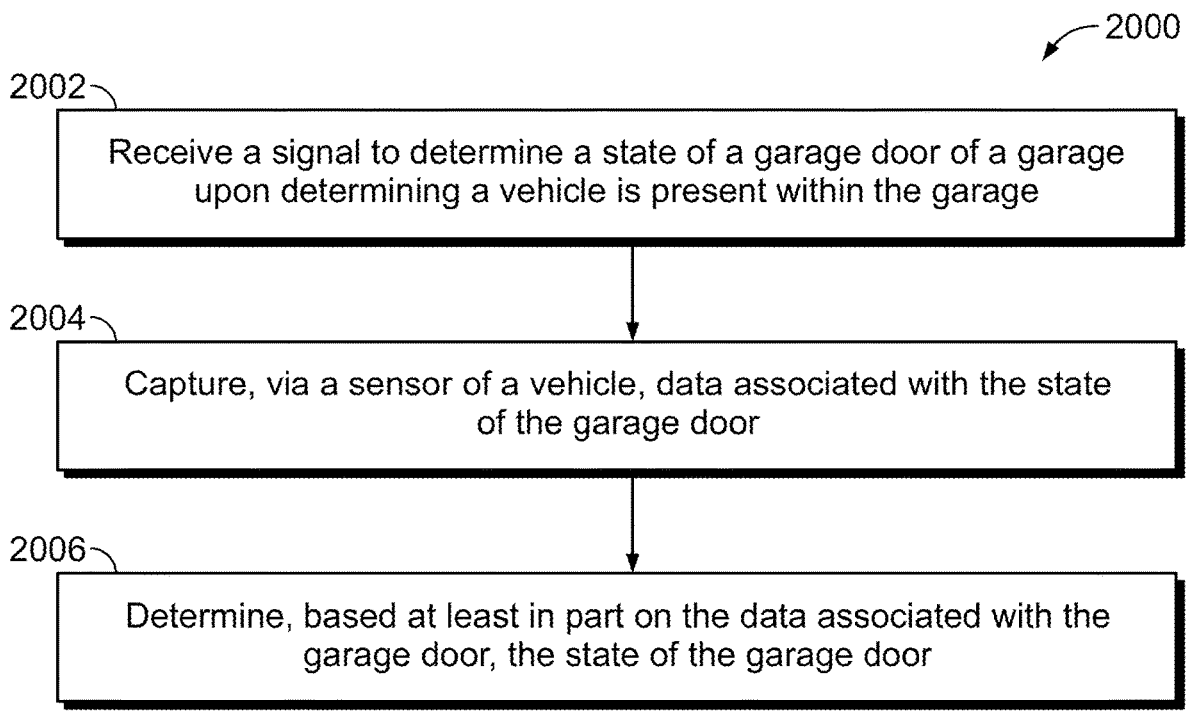
FIG. 20 is an example flow diagram of a method of condition identification used in the "Use Mode" of the object monitoring system of FIG. 17.

With reference now to FIG. 18, an example method 1800 for training the system 1700 to identify when the vehicle 1752 is within the garage 1750 is shown. In some forms, the method begins with the transmitter 1712 of the vehicle 1752 sending 1802 a state change request to the movable barrier operator 1760. The state change request may be sent when an occupant/operator (e.g. the driver or passenger) of the vehicle 1752 operates a user interface of the vehicle 1752 to send the state change request via the transmitter 1712. This may be done, for example, when the operator presses a button (physical or virtual) or speaks a command to a microphone of the vehicle 1752 to change the state of a garage door 1756 associated with the garage 1750. The state change request may also be automatically sent by the vehicle 1752 upon the vehicle 1752 entering a geofenced area associated with the garage 1750. For example, when the vehicle 1752 is within 200 feet of the garage 1750, the processor 1704 of the vehicle 1752 is configured to cause the transmitter 1712 to send a state change request to the movable barrier operator 1760. The vehicle 1752 may determine its position relative to the garage 1750 using the GNSS circuitry 1714.

In some forms, the system 1700 may begin collecting data (e.g., images or sensor data) upon the system 1700 determining 1804 the vehicle 1752 is approaching garage 1750 based on one or more factors indicating the vehicle is proximate the garage 1750. This step of determining 1804 that the vehicle 1752 is proximate the garage 1750 may aid in filtering or reducing the amount of images and data that is collected, stored, and/or processed during the train mode. For instance, images and data collected when the vehicle 1752 is not near the garage 1750 will likely not be relevant to the conditions that the vehicle 1752 is in the garage 1750 or that the garage door 1756 is closed.

The factors indicating that the vehicle is proximate the garage 1750 may include that a state change request was recently sent to the movable barrier operator 1760. The sending of a state change request may indicate to the system 1700 that the vehicle 1752 is near the garage 1750, because state change requests are likely sent when the vehicle 1752 is in proximity to the garage 1750. The sending of a state change request may also indicate that the vehicle 1752 may enter the garage 1750. Another factor may be whether the communication circuitry 1708 of the vehicle 1752 connects to, or begins communicating with, a device associated with the garage 1750 via a direct wireless connection. As one example, the communication circuitry 1708 connects to a Wi-Fi network associated with the garage 1750 (e.g., a homeowner's Wi-Fi network). As another example, the communication circuitry 1708 connects to the movable barrier operator 1760 or a communication hub or access point associated with the vehicle 1752 via a Bluetooth connection.

Another factor may be based on location information the system 1700 receives via the GNSS circuitry 1714 and GPS. In one example, the user inputs the user's home address to the vehicle 1752 such as during setup of the vehicle's navigation system. As another example, the user provides the user's home location to the vehicle 1752 to cause the transmitter 1712 to automatically request a state change of the garage door 1756 associated with the garage 1750 when in proximity to the garage 1750. As another example, the system 1700 may collect location data via the GNSS circuitry 1714 over a period of time. As yet another example, the system 1700 may collect location data by triangulating signals from cell sites or wireless access points with which the vehicle 1752 communicates via the communication circuitry 1708. Based on the time that the vehicle 1752 dwells at various locations, the system 1700 may identify the approximate location of the user's home. For example, if the vehicle 1752 is typically at a certain location at night, the system 1700 may determine that location is where the garage 1750 is located. The system 1700 may use the proximity of the vehicle 1752 to the location of the movable barrier operator 1760, which the movable barrier operator 1760 may determine by triangulating signals from cell sites and provide to the system 1700, when determining if the vehicle 1752 is near the garage 1750. The system 1700 may also determine the orientation and direction of the vehicle 1752 using a compass of the vehicle 1752. For example, if the system 1700 is able to determine that the vehicle 1752 enters the garage 1750 facing North (when in drive), the system 1700 may determine that the vehicle may be entering the garage 1750 when the vehicle 1752 is near the garage 1750 and heading North.

Another factor may be that the vehicle 1752 has been recently turned off. Because the vehicle 1752 may be parked in the garage 1750 upon being turned off, turning off the vehicle 1752 may indicate to the system 1700 a probability that the vehicle 1752 was parked in the garage and thus that images and data collected after the vehicle is shut off may be captured when the vehicle 1752 is within the garage 1750.

The system 1700 may use and weigh one or more of these factors to determine whether data collected via the cameras 1754 and sensors 1702 may contain images and/or data relating to one or more of the conditions. The system 1700 may determine that, based on one or more factors, there is a higher probability the vehicle 1752 will be entering the garage 1750. For example, if the location data provided to the system 1700 via the GNSS circuitry 1714 indicates the vehicle 1752 was away from the garage 1750 and has recently moved to be in proximity to the garage 1750, the system 1700 may determine that the vehicle 1752 is approaching the garage 1750. As another example, the vehicle 1752 may factor the sending of a state change request to the movable barrier operator 1760 to increase the probability that the vehicle 1752 will enter the garage 1750. The system 100 may increase the weight given to the sending of a state change request when the vehicle 1752 is shut off shortly after the state change request has been sent which indicates the vehicle 1752 opened the garage door 1756 and parked in the garage 1750. As described, multiple factors may be used to indicate to the system 1700 that the vehicle 1752 is approaching the garage 1750 and that the images and/or data captured and gathered relative to one or more of these factors may have increased relevance in generating feature maps associated with the conditions. Knowing when the vehicle 1752 is approaching the garage 1750 may be used to reduce the number of images and/or amount of sensor data that is collected, stored, and/or processed, since the system 1700 is able to determine when the images and/or sensor data is likely not relevant.

The system 1700 may capture 1806 images and data via the cameras 1754 and sensors 1702 of the environment outside of the vehicle 1752. In some embodiments, the system 1700 begins collecting data once the system 1700 determines 1804 that the factors indicate the vehicle 1752 is approaching the garage 1750. In other embodiments, the system 1700 may always capture images and data via the cameras 1754 or sensors 1702, and once the system 1700 determines that the factors indicate the vehicle 1752 is approaching the garage 1750, the system 100 may store into memory 1706 for processing the images and sensor data captured around the time the system 1700 determines the vehicle 1752 is approaching the garage 1750. In another embodiment, the system 1700 may store all images and data collected and tag or otherwise indicate that the images and data surrounding a time the vehicle 1752 is determined to be approaching the garage 1750 be processed. The system 1700 may capture and store images and data constantly when the vehicle 1752 is on. The system 1700 may be configured to delete the images and data if the system 1700 does not determine that the vehicle 1752 is approaching the garage 1750 or within a certain time period of being collected, for example, within one minute.

The system 1700 may process the data collected via the cameras 1754 and sensors 1702. The system 1700 may be configured to process the data collected around the time the system 1700 determines that the vehicle 1752 approached the garage 1752. For example, the system 1700 may process the images and sensor data from one minute before such a determination and for two minutes after. In another example, the system 1700 begins collecting images and sensor data after the determination for a period of time, e.g., three minutes.

The processing of images and sensor data by the system 1700 may include determining 1808 whether the vehicle 1752 is in the garage 1750 using the images and data captured by cameras 1754 and sensors 1702 of the vehicle 1752. The system 1700 may process all images and sensor data collected. In other embodiments, the system 1700 only processes a subset of the images and data, for example, the images and sensor data captured proximal to the determination 1804 that the vehicle 1752 is approaching the garage 1750. In one embodiment, the system 1700 may determine 1808 if the vehicle 1752 is in the garage 1750 by presenting one or more images captured by a camera 1754 of the vehicle 1752 to the user. For example, the system 1700 may collect images after multiple instances where the system 1700 has determined 1804 the vehicle is approaching the garage 1750 to present to a user. As one example, the system 1700 may begin collecting images after detecting a state change request has been sent to the movable barrier operator 1760. The system 1700 may select one or more images captured one minute after the vehicle 1752 has been shut off to present to the user. After capturing a sufficient number of images from one or more instances where the vehicle 1752 has been shut off for a minute subsequent to a state change request, the system 100 may present one or more images to a user for confirmation of the location of the vehicle 1752. The system 1700 may communicate the images to a remote computer 1709 associated with an application, for example, a smartphone application associated with the vehicle 1752. The application may display the images to the user along with the prompt "Select the images captured when the vehicle is in the garage."

Upon receiving the user's selection of the images, the system 1700 may store the images the user selected as showing the vehicle as in the garage 1750 and associate or categorize 1810 the images with the condition where the vehicle 1752 is in the garage 1750. The sensor data collected at the time the categorized image was captured may also be associated and categorized with the condition where the vehicle 1752 is in the garage 1750. Once a sufficient number of images (e.g., three, four, or five) have been associated with the condition of the vehicle 1752 being present within the garage 1750, the system 1700 may process the images and create one or more feature maps for the condition using the images. If a sufficient number of images have not been associated with the condition, the system 1700 may continue capturing images and occasionally presenting the images to the user to confirm whether the images show the vehicle 1752 in the garage 1750.

In another example, the system 1700 may determine 1808 the vehicle 1752 is in the garage 1750 by monitoring the images captured by the front facing cameras 1754 of the vehicle 1752 as the vehicle drives toward the garage 1750. For instance, the system 1700 may process the images captured by the front facing camera 1754 subsequent to the sending of a state change request to the movable barrier operator 1760. The system 1700 may process the images and detect whether images include features typically found about a garage 1750. For instance, the system 1700 may be configured to identify the door frame of an entrance to a garage. The system 1700 may process the captured images 1700 and search for two vertical lines spaced apart from one another and connected by a horizontal line at a top portion of the vertical lines. Once an image is identified as including the garage door frame, the system 1700 may monitor whether the garage door frame within the captured images increases in size (relative to the image frame) over time. If the size of the garage door frame within the images are increasing in size, the system 1700 may determine that the vehicle 1752 is approaching the garage 1750. If the garage door frame subsequently expands to be out of the field of view of the image frame, the system 1700 may determine that the vehicle 1752 has entered into the garage 1750. The system 1700 may select images captured a period of time after the vehicle 1752 has been determined to enter the garage 1750 and conclude that the images were captured while the vehicle 1752 is within the garage 1750. The system 1700 may associate, as a sub-operation of the categorization performed in block 1810, these images with the condition of the vehicle 1752 being within the garage and store them to memory 1706.

The system 1700 may capture images at various lighting conditions. For example, once the system 1700 has determined the vehicle 1700 is within the garage 1750 and has not moved, the system 1700 may capture additional images, for example, when the lighting conditions change. The change in lighting conditions may be measured by a light sensor of the vehicle 1752. The change in lighting may be caused, for example, by a garage door 1756 being closed, a light within the garage 1750 being turned on or off, and/or by the change in light between day and night. Once a sufficient number of images have been captured and associated with the condition of the vehicle 1752 being within the garage 1750, the images may be processed and feature maps created for the condition.

In another example, the images may be processed for the presence of a specific object within the images. As one example, the system 1700 may process the images captured for the presence of a garage door opener. The system 1700 may use an image processing system (e.g., a neural network or YOLO) to identify the presence of a garage door opener within the images. The system 1700 may use detection of the garage door opener in determining 1808 when the vehicle 1752 is in the garage 1750. As an example, the system 1700 may determine the vehicle 1752 is in the garage if the camera 1754 of the vehicle 1752 detects a garage door opener, the garage door opener within an image gets larger in the camera frame, and the vehicle 1752 subsequently parks. The system 1700 may store and associate, as a part of the categorization operation 1810, one or more images with the condition of the vehicle 1752 being within the garage 1750. The system 1700 may determine that the vehicle 1752 has moved into the garage 1750 if images include the garage door opener, subsequently captured images do not include the garage door opener, and the vehicle 1752 was moving forward (e.g., still in drive) as the images were captured. The system 1700 may associate images captured a period of time after the vehicle 1752 has shut off with the condition that the vehicle 1752 is in the garage 1750. Waiting a period of time after the vehicle 1752 has shut off may reduce the change the vehicle operator or passengers appear within the images.

In another example, the system 1700 may process the images captured by side-facing cameras 1754 of the vehicle 1752 for a sudden change in environment. As the vehicle 1752 enters the garage 1750, the images may include a vertical line that represents the door frame of the garage entrance. The environment on one side of the vertical line may be different from the other. This may be due to the change in lighting inside the garage 1750 versus outside. This also may be due to the presence uniformly colored walls inside the garage 1750 versus the portion of the image showing the outside of the garage 1750 which may include trees, houses, a street, etc. As the vehicle 1752 moves further into the garage 1750, the vertical line of the entrance of the garage 1750 moves from one side of the image to the other. Where the image is captured by a right facing camera of the vehicle 1752 and the vehicle 1752 is in drive, the vertical line may move left to right across the image frames, whereas the images captured by a left facing camera 1754 may show the vertical line moving right to left across the image frames over time. When the vehicle 1752 is backing into the garage 1750, the direction of movement across the images frames will be reversed from the drive/forward-entry that was described. The system 1700 may determine that the change in environment or the entrance of the garage 1750 moving across the images captured by the side cameras 1754 indicates the vehicle 1752 is passing into the garage. The system 1700 may then determine 1808 the vehicle 1752 is in the garage and associate, as part of the categorization operation 1810, images captured after the vehicle 1752 shuts off with the condition that the vehicle 1752 is within the garage 1750.

The system 1700 may use one or more of the above examples for determining 1808 that the vehicle 1752 is in the garage 1750. In one form, the system 1700 may present images to the user for confirmation that each of the images automatically associated with the condition of the vehicle 1752 being within the garage 1750 were indeed captured when the vehicle 1752 was within the garage 1750. In other forms, the system 1700 may process the images and sensor data, and determine 1808 if the vehicle 1752 is in the garage 1750, and categorize 1810 one or more images as representing the condition of the vehicle 1750 being in the garage without receiving confirmation from a user. The system 1700 may produce 1812 a representation of the condition (i.e., that the vehicle 1752 is in the garage 1750) based on the one or more images associated with the condition. The representation may be a feature map as described in detail herein. The producing 1812 may include the system 1700 creating feature maps based on the images captured by one or more cameras 1754 of the vehicle 1752. For example, the system 1700 may generate feature maps based on images captured by a front camera, feature maps based on images captured by the left and right side cameras, and/or feature maps based on images captured by a rear camera.

In generating the feature maps, the system 1700 may generate image-specific feature maps and generalized feature maps as discussed in detail above. In generating the feature maps, the system 1700 may compare each image (or the extracted features thereof) captured by a specific camera 1754 and associated with the same condition (e.g., the vehicle 1752 is in the garage 1750) to determine whether the images correspond with one another. The system 1700 may shift the extracted features of the images in one or more directions to account for translation, for example, if the vehicle parks slightly to one side of the other of the parking spot of the garage 1750. The system 1700 may determine that one or more subconditions exist for the condition of the vehicle 1752 being parked in the garage 1750. The subconditions may result from the vehicle 1752 capturing images within the garage 1750, but from different parking spots within the garage 1750. For instance, the system 1700 may determine that one or more images (or the extracted feature(s) thereof) associated with the condition of the vehicle 1752 being parked within the garage 1750 have a low correspondence value when compared to other images (or the extracted feature thereof) associated with the condition. The system 1700 may create a subcondition for each subset of the associated images that correspond with one another for use when generating generalized feature maps. The system 1700 may create a generalized feature maps for each identified subcondition. As an example of subconditions for the condition where that the vehicle 1752 is parked within the garage 1750, the system 1700 may create a new subcondition for the vehicle 1752 parked within each parking spot within the garage 1750. One subcondition may be that the vehicle 1752 is in the right side parking spot of the garage 1750 and another subcondition may be that the vehicle 1752 is in the left side parking spot of the garage 1750. The system 1700 may create these subconditions because, while each subcondition represents the same condition (e.g., the vehicle 1752 is within the garage 1750) the images and the resulting features maps created based on images captured with the vehicle within each spot may be different. Other examples of subconditions may include separate subconditions for images taken in daylight or at nighttime, subconditions for images captured where the vehicle 1752 backed into the garage 1750, and subconditions where images captured include various combinations of other vehicles parked within the garage 1750.

Once a sufficient number of images (e.g., three, four, or five) have been captured for the condition that the vehicle 1752 is within the garage 1750 and/or for any identified subconditions, the system 1700 may enter the use mode. In use mode, the system 1700 may use method 1900 to determine whether the vehicle 1752 is within the garage 1750. The system 1700 may receive 1902 a request from the vehicle 1752 or a remote device via the communication circuitry to determine if the vehicle 1752 is present within the garage 1750. The system 1700 may capture 1904 one or more images of the environment surrounding the vehicle 1752 using the one or more cameras 1754 of the vehicle 1752. The system 1700 may capture images using at least one of the cameras 1754 used in generating the feature maps for the conditions/subcondition(s) of the vehicle 1752 being present within the garage 1750. For example, if the system 1700 only generated feature maps based on the images captured by the front camera, the system 1700 may cause only the front camera to capture one or more images for use in comparison to the feature maps.

The system 1700 may then determine 1906 whether the vehicle is present in the garage 1750 using the images captured by the camera(s) 1754 of the vehicle 1752 and the feature map(s) created during the train mode. The system 1700 may extract features from the images using the image processing techniques described in detail above. The system 1700 may compare the extracted features of the captured images with the feature maps and determine 1906 that the vehicle 1752 is in the garage 1750 when the comparison results in a sufficiently high correspondence between the extracted features of the images captured in use mode and the feature maps.

In determining 1906 whether the vehicle 1752 is within the garage 1750 based on images captured by multiple different cameras 1754 of the vehicle 1750 and multiple feature maps associated with the different cameras 1754, the system 1700 may determine the vehicle 1752 is in the garage 1750 even if the image of only one of the multiple different cameras 1754 returns a high correspondence value when compared to the feature maps. For instance, if the system 1700 includes a feature map associated with a condition for each of the front camera, left side camera, and right side camera, the system 1700 may require only a high correspondence with the feature map associated with one or two of the cameras, rather than all three. This may aid to account for situations where features within the garage 1750 are different than when the feature maps were generated. As one example, the feature maps may be generated using images where the vehicle 1752 was parked in the right parking spot of the garage 1750 and no vehicle was present in the left parking spot of the garage 1750. The system 1700 may still determine that a high correspondence based on images captured by the front and right side cameras 1754 and feature maps associated with the front and right side camera indicate the vehicle 1752 is within the garage 1750, even where an image captured by the left side camera 1754 has a low correspondence to the feature maps associated with the left side camera 1754 (e.g., because a vehicle is now present in the left parking spot). The system 1700 may also store and associate the image captured by the left side camera 1754 as representing the vehicle 1752 being within the garage 1750 for use in generating a feature map associated with the left side camera 1754 for future comparisons. By using images captured by multiple cameras 1754 of the vehicle 1752 for use in a comparison with feature maps associated with the multiple cameras 1754, the system 1700 may be able to adapt to changes within the field of view of one camera, and accordingly update the feature maps for that camera 1754.

As another example, the feature map(s) associated with the front camera may be generated using images where trash bins were within the images. When the trash bins are removed from the garage 1750, the features extracted from the images captured by the front camera when the vehicle is within in the garage 1750 may have a lower correspondence when compared to the feature map(s) associated with the front camera. This may be because the extracted features of the trash bins were included in the feature maps associated with the vehicle 1752 being within the garage 1750. The system 1700 may still determine the vehicle 1752 is within the garage 1750, however, based on a high correspondence using images captured by the other cameras 1754 (e.g., side cameras) where the associated feature maps do not include the extracted features of the trash bins. Other examples of situations where the system 1700 may receive a lower correspondence based on images captured by one camera while receiving a high correspondence based on images captured by other cameras include where the vehicle 1752 is parked to one side of the parking spot within the garage 1750 or at a different orientation (e.g., entered at a slight angle) within the garage 1750 than the vehicle 1752 was when the images were captured that were used in generating the feature maps of the conditions.

In another embodiment, the system 1700 may use the images captured by multiple cameras 1754 of the vehicle 1752 in generating a single feature map. The system 1700 may extract the relevant features from the images captured by multiple cameras 1754 for the condition that the vehicle 1752 is within the garage 1750. The system 1750 may then concatenate the extracted features and use the concatenated features to generate a feature map for the condition that the vehicle 1752 is within the garage 1750. Using this approach, the system 1700 may determine that the condition of the vehicle 1752 being within the garage 1750 is present when a comparison of extracted features from images captured by the multiple cameras 1754 sufficiently correspond to the concatenated feature map. Thus, even if some features of the feature maps are not present in the extracted features of the images captured by the multiple cameras 1754 (e.g., the trash bins have been moved), a sufficient number of features may correspond to the feature maps for the system 1700 to conclude the condition of the feature maps is present.

The system 1700 may retrain upon determining that comparisons based on images captured in the use mode consistently have a lower correspondence value to the feature maps generated in train mode. A sudden decrease in the average correspondence values when comparing extracted features of images to the feature maps may indicate that the interior of the garage 1750 has changed. For instance, the garage 1750 may have included a shelf that the homeowner has recently removed. If the shelf was a feature that was included in the feature maps for comparison with extracted features of images captured in the use mode, the correspondence value will likely be lower. Upon determining that the correspondence values in the use mode have decreased over time, the system 1700 may enter the retrain mode to recapture images of the garage 1750 for generation of new feature maps.

In retrain mode, the system 1700 may also create additional feature map(s) using images captured by the camera(s) 1754 returning a low correspondence when compared to a feature map, when another camera 1754 of the vehicle 1752 returned a high correspondence with a feature map. Returning to the example above where the feature map associated with the front camera included features associated with the trash bins, if the system 1700 determines that the vehicle 1752 is within the garage 1750 based on images captured by the other camera(s) (e.g., a side camera) the system 1700 may determine that the image captured by the front camera 1750 was indeed captured when the vehicle 1752 was in the garage 1750 even if the correspondence with the feature maps of the front camera returned a low correspondence. The system 1700 may store this image and may generate a feature map based on that image when the system 1700 enters a retrain mode. This may aid to identify that the vehicle 1752 is within the garage 1750 using the front camera when the trash bins are removed in the future (e.g., when the trash bins are moved to the street). The system 1700 may also determine that one or more features previously included in the feature maps are not relevant or should not be relied on when determining whether the vehicle 1752 is within the garage 1752. For example, the system 1700 may regenerate feature maps that do not include the trash bins as these features may not always be present within the field of view of the camera 1754 when the vehicle 1752 is within the garage 102. Thus, the system 1700 is able to update the existing feature maps over time, which may aid to properly identify when the vehicle 1752 is within the garage 1750 as the environment about the vehicle 1752 when it is within the garage 1752 changes over time.

Regarding the use of the sensors 1702, the system 1700 may also capture and store sensor data upon determining that the vehicle 1752 is within the garage 1750 in the train mode. The system 1700 may determine the approximate distance between the front, back, and/or sides of the vehicle 1752 to nearby objects when the vehicle 1752 is in the garage 1750. In use mode, the system 1700 may collect sensor data and compare the distance of objects about the vehicle 1752 to the distance of objects about the vehicle 1752 when the vehicle 1752 is known to be within the garage 1750. If there is a high correspondence between the sensor data collected in use mode and the sensor data collected during the train mode, the system 1700 may determine the vehicle 1752 is within the garage 1750. The system 1700 may use the sensors 1702 as an alternative or in addition to the use of the cameras 1754 and feature maps in determining whether the vehicle 1752 is in the garage.

Determining that the vehicle 1752 is within the garage 1750 may be useful for a variety of reasons. For instance, upon determining that the vehicle is in the garage 1750, the system 1700 may communicate that it is within the garage 1750 to other devices. For instance, the system 1700 may communicate that the vehicle 1752 is present within the garage 1750 to a thermostat system controlling the temperature within the garage 1750. The thermostat system may be configured to keep the garage 1750 at a higher temperature if the vehicle 1752 is parked within the garage 1750 and a lower temperature if the vehicle 1752 is not present. In another example, the system 1700 may notify a smart home or home automation system that the vehicle 1752 has entered the garage 1750. The smart home system may be configured to unlock a door to enter a home associated with the garage 1750. The smart home system may also be configured to turn on a light, such as an entryway light, upon receiving a notification from the system 1700 that the vehicle 1752 has entered the garage 1750. In other examples, upon a determination that the vehicle 1752 is within the garage 1750, the vehicle 1752 may receive a software update or an inductive charging process may begin.

In yet another example, a determination that the vehicle 1752 is within the garage 1750 may be used in determining whether the vehicle 1752 may be remotely started. For instance, if the user of the vehicle 1752 selects to remotely start the vehicle 1752 (e.g., via a key fob or smartphone client application associated with the vehicle), the vehicle 1752 or an associated remote computer may be configured to determine whether the vehicle is within the garage 1750 and whether the garage door 102 is closed. If the vehicle 1752 includes a combustion engine the remote start system may prevent the vehicle 1752 from starting if the garage door 1756 is closed and the vehicle 1752 is within the garage 1750. The remote start system may be configured to communicate with the movable barrier operator 1760 to open the garage door 1756. Once the system 1700 determines that the garage door 1756 has moved to an open position, the remote start system may start the vehicle. In some embodiments, the vehicle or remote computer associated with the vehicle may be in communication with the movable barrier operator 1760 of the garage 1750 to determine the state of the garage door 1756. In other embodiments, the system 1700 may also be used to determine whether the garage door 1756 is closed.

To determine whether the garage door 1756 is closed, the system 1700 may communicate with the movable barrier operator 1760 to receive the current state of the garage door 1756. For example, the system 1700 may communicate with the movable barrier operator 1760 directly (e.g., Bluetooth or other short-range/local communication link) using the communication circuitry 1708 to receive the status of the garage door 1756. In another example, the system 1700 communicates with the movable barrier operator 1760 or an associated remote computer (e.g., server computer 1709) via a network 1758 such as a cellular network or the internet. In embodiments where the transmitter 1712 is configured to request and/or receive the status of the garage door 1756, the system 1700 uses the transmitter/transceiver 1712 to receive the state of the garage door 1756. The system 1700 may communicate the state of the garage door 1756 to the vehicle 1752 or associated remote computer for use in a determination of whether to remote start the vehicle 1752. In other embodiments, the system 1700 receives the remote start request and determines whether to remote start the vehicle based on the presence of the vehicle 1752 within the garage 1750 and the state of the garage door 1756.

In another embodiment, the system 1700 uses one or more sensors 1702 of the vehicle 1752 to determine whether the garage door 1756 is closed. Where the system 1700 determines that the vehicle 1752 is parked in the garage 1750 with the rear of the vehicle 1752 adjacent the garage door 102 (e.g., the extracted features of images captured by the cameras 1754 have a high correspondence with feature maps indicating the vehicle 1752 is in the garage 1750), the system 1700 may use the sensors 1702 to measure the distance to the nearest object behind the vehicle 1752. Likewise, if the system 1700 determines the vehicle 1752 backed into the garage 1750, the system 1700 may use sensors 1702 to measure the distance of the nearest object in front of the vehicle 1752. If the sensor 1702 returns a distance within a certain range (e.g., two inches to three feet), the system 1700 may determine that the object detected is the garage door 1756 and that the garage door 1756 is closed. The system 1700 may use the measurement reading of two or more sensors of the vehicle 1752 to determine if the sensors return similar distance measurements. Since garage doors 104 are generally flat, similar distance measurements from multiple sensors across the width of the vehicle 1752 may increase the likelihood that the object measured is the garage door 102. If the sensors return a large distance (e.g., greater than 4 feet) or do not detect an object behind or in front of the vehicle 1752 (i.e., no objects within the range of the sensor 1702) the system 1700 may determine that the garage door 1756 is open.

The system 1700 may determine the approximate distance that the garage door 1756 typically is from the vehicle 1752 by recording measurements with sensors 1702 when the vehicle 1752 is determined to be within the garage 1750. For instance, when the vehicle 1752 is determined to have recently entered the garage 1750 (e.g., during train mode or during use mode of the system 1700 described above), the system 1700 may monitor the measurements recorded by the sensors 1702. If the sensors 1702 (e.g., a distance/range-detecting sensor of an adaptive cruise control or front/rear collision-avoidance system) show a large distance (or no object within range to the sensor 1702) and then suddenly an object within the range of about two inches to three feet, the system 1700 may determine that the garage door 1756 has closed and the object detected is the garage door 1756. The sudden change in distance may aid to distinguish a vehicle parking in the driveway behind the vehicle 1752, which would be expected to get closer to the vehicle 1752 at a slower rate than the vertical closing of a garage door. The system 1700 may monitor the proximity of the garage door 1756 to the vehicle 1752 across multiple instances where the vehicle 1752 has recently parked within the garage 1750 to determine the typical range the garage door 1756 is within relative to the vehicle 1752. This may aid in identifying the presence of the garage door 1756 based solely on a distance, rather than also monitoring for a sudden change in distance to determine that the garage door 1756 has closed each time.

In other embodiments, the system 1700 may enter a train mode to capture images using a camera 1754 of the vehicle 1752 directed toward the garage door 1756 when the system 1700 determines the vehicle 1752 is parked within the garage 1750 to capture images of the garage door 1756 in open and closed states. Based on the images captured in each state, the system 1700 may generate feature maps for each condition. If the system 1700 determines that the vehicle 1752 has recently entered the garage 1750, the system 1700 may monitor the images recorded by a camera 1754 (e.g., rear facing camera) of the vehicle 1752 to determine if the garage door 1756 closes. The system 1700 may process the captured images and determine if the garage door 1756 is shown to move to a closed state after the vehicle 1752 parked within the garage 1750. For instance, the system 1700 analyzes captured images to determine whether a horizontal line is moving downward across a series of images frames captured by the camera 1754. The horizontal line within the image frames may be the bottom edge of the garage door 1756 or the interface of two panels or sections thereof. If the horizontal line is moving downward across the series of image frames, the system 100 may determine that the garage door 1756 is moving to a closed state. The system 1700 may store and associate an image captured after motion has stopped as an image showing the garage door 1756 in a closed position. The system 1700 may also store and associate an image captured before the horizontal line (i.e., portion of the garage door) entered the image frame as representing the garage door 1756 in an open state. These images may be presented to a user (e.g., via an application) for confirmation. If the user indicates the association of the images with the state of the garage door 1756 is incorrect, the image may be disassociated from the condition. The images associated with each condition may be processed and used to generate feature maps associated with each state of the garage door 1756. Since both states (e.g., fully open and fully closed) cannot be present at the same time, the feature descriptors of the images associated with these conditions may be compared with one another to determine the features within the images that differentiate the two states for use in generating feature maps representative of the state of the garage door 1756.

In another example where one or more sensors 1702 of the vehicle are or include light sensors, the system 1700 uses the light sensors to detect a sudden or rapid change in the brightness after determining that the vehicle 1752 has entered the garage 1750. For example, when the system 1700 determines that the vehicle has entered the garage 1750, the system 1700 may monitor the brightness of the garage 1750. The system 1700 may monitor brightness via, for example, the camera 1754 of the vehicle 1752, a camera of the movable barrier operator 1760 and/or a dedicated light sensor. If the brightness of the garage 1750 decreases over a short period of time, the system 1700 may determine that the garage door 1756 closed. The system 1700 may consider the period of time over which the light continues to decrease. This may aid in distinguishing the reduced brightness within the garage 1750 due to a light shutting off and the garage door closing over a period of time (e.g. 3-10 seconds) compared to the more gradual reduction in ambient light as the sun sets. The system 1700 may collect ambient light data of the garage 1750 when the system 1700 determines the garage door 1756 is open and when the system 1700 determines the garage door 1756 is closed. The system 1700 may further determine the state of the garage door 1756 along with whether a light within the garage 1750 is on (e.g., a worklight of the movable barrier operator 1760). The system 1700 may then use the collected ambient light data in determining whether the garage door 1756 is open or closed based on the brightness of the garage at any given moment. The system 1700 may factor in the time of day and the time of year when making an assessment of the state of the garage door 1756 using the light sensor. For example, if the garage door 1756 opens or closes at nighttime, there may not be a rapid reduction or increase in light within the garage.

The system 1700 may use one or more of these example methods of determining the state of the garage door 1756. In one embodiment, the system 1700 uses multiple methods and the determination of the state of the garage door 1756 under each method is factored into the ultimate determination of the state of the garage door 1756. For example, if the distance sensors detect that an object suddenly appeared one foot away from the vehicle, and at that same moment, the brightness of the garage 1750 was rapidly decreasing, the system 1700 may increase its confidence that the object that appeared in front of the distance sensor was the garage door 102 closing which also caused the rapid reduction in brightness within the garage.

Once a sufficient number of images and/or a sufficient amount of sensor data has been collected, the system 1700 may enter a run mode where the system 1700 determines the state of the garage door 102 using method 2000. The vehicle 1752, associated remote computer, or other device may request system 1700 determine whether the garage door 1756 is in an open or a closed state. The vehicle 1752, associated remote computer, or other device may be configured to only request the state of the garage door 1756 after determining 1906 that the vehicle 1752 is within the garage 1750.

The system 1700 receives 2002 the request to determine the state of the garage door 1756. The system 1700 may first confirm that the vehicle 1752 is within the garage 1750, for example, using method 1900 described above. The system 1700 may then capture 2004 one or more images and/or sensor data using at least one or more of the cameras 1754 and/or sensors 1702 used to collect images/sensor data in the train mode. The system 1700 may compare the extracted features of the captured image(s) with the feature maps associated with the state of the garage door 1756 as described in greater detail herein. The system 1700 may likewise compare the captured sensor data with the data captured and associated with each state of the garage door 102. Based on the correspondence of the images and/or sensor data to the images and/or sensor data captured during train mode, the system 1700 may determine 2006 the state of the garage door 1756.

Figure 21:
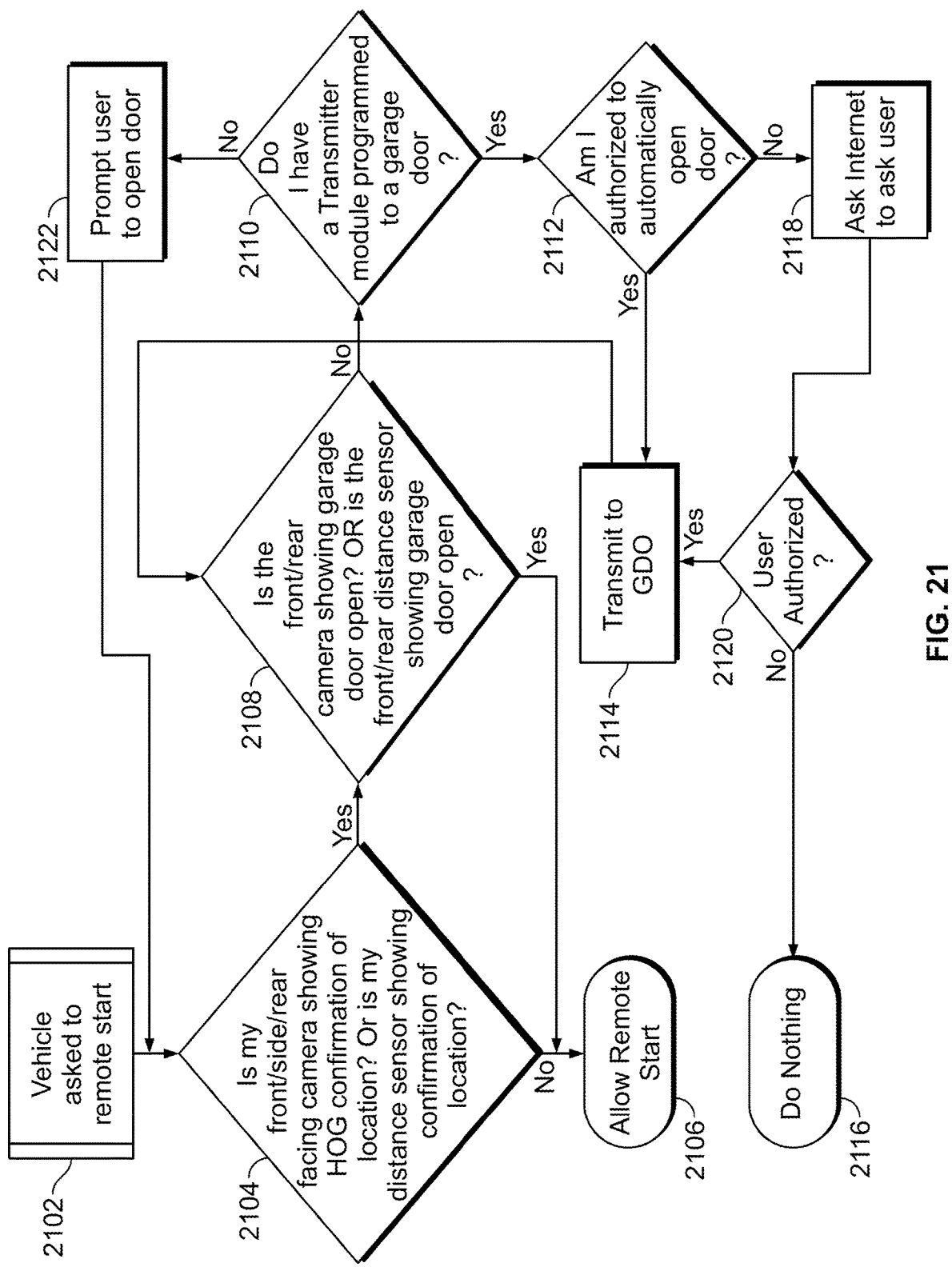
FIG. 21 is an example flow diagram of a method the object monitoring system of FIG. 17 may use to determine whether to allow a vehicle to be remotely started.

An example flow diagram of a method using the system 1700 to remotely start a vehicle 1752 is shown in FIG. 21. The user requests 2102 that the vehicle 1752 be remotely started. As examples, the user may request the vehicle 1752 be started via an application on the user's smartphone, via a button on the key fob of the vehicle 1752 or a voice command to a digital virtual assistant. Upon receiving the request from the user, for example, via the communication circuitry 1708, the system 1700 determines 2104 whether the vehicle 1752 is within the garage 1750. The system 1700 may capture images via the cameras 1754 that are associated with the feature map generated in train mode for the condition that the vehicle 1752 is within the garage 1750. The system 1700 determines whether the images have a sufficiently high correspondence with the feature map to conclude the vehicle 1752 is within the garage 1750. Alternatively or additionally, the system 1700 captures data via the sensor(s) 1702 to determine the distance between objects about the vehicle 1752. If the distance of objects detected about the vehicle 1752 are similar to or sufficiently correspond the distances of captured when the vehicle 1752 was known to be within the garage 1750, the system 1700 may conclude the vehicle 1752 is within the garage 1750.

If the vehicle 1752 is determined to not be within the garage 1750, the system 1700 allows 2106 the vehicle 1752 to be started. If the vehicle 1752 is within the garage 1750, the system 1700 determines 2108 whether the garage door 1756 is open or closed. The system 1700 may capture images via cameras 1754 of the vehicle 1752 and compare the extracted features of the images to feature maps representing the conditions that the garage door 1756 is in the open or closed state. Alternatively or additionally, the system 1700 may measure the distance between the vehicle 1752 and objects in front and behind the vehicle. The system 1700 may determine whether the distances measured by the sensors 1702 sufficiently correspond to the sensor data captured when the garage door 1756 was known to be open or closed to determine the state of the garage door 1756. If the system 1700 determines the garage door 1756 is in an open state, the system 1700 allows 2106 the vehicle 1752 to be started.

If the system 1700 determines the garage door 1756 is in a closed state, the system 1700 may determine 2110 whether the system 1700 includes or is configured to control a transmitter programmed to change the state of the garage door 1756 or whether the system 1700 is able to communicate with another device to effect a state of the garage door 1756. If the system 1700 is unable to effect a state change of the movable barrier operator, the system 1700 may notify the user to prompt 2122 the user to open the garage door 1756 and retry remotely starting the vehicle 1752. Upon determining that the system 1700 is able to change the state of the garage door 1756, the system 1700 may determine 2112 whether the system 1700 is authorized to automatically open the garage door 1756. The system 1700 may be given permission or authorization to open the garage door 1756 from a user, for example, via a setting of the vehicle 1752 or a smartphone application. If the system 1700 determines 2112 that the system 1700 is authorized to change the state of the garage door 1756, the system 1700 communicates 2114 a state change request to the movable barrier operator 1760 via the transmitter 1712 to effect a state change of the garage door 1756. The system 1700 may then determine 2108 the state of the garage door 1756 via the cameras 1754 and/or sensors 1702 to determine whether the garage door 1756 is now in an open state. If the garage door 1756 is open, the system 1700 may allow 2106 the vehicle 1752 to be started. If the garage door 1756 is not open, the system 1700 may again attempt to change the state of the garage door 1756 by entering block 2110 and the subsequent steps as previously described. After a fixed or variable number of failed attempts, the system 1700 may notify the user and/or not allow 2116 the vehicle 1752 to remotely start.

If the system 1700 determines 2112 that it is not authorized to open the garage door 1756, the system 1700 may request 2118 the user's permission. The system 1700 may prompt the user to allow the garage door 1756 to be opened so that the vehicle 1752 may be remotely started. The system 1700 may send the request to the user via a text message, email, or via a smartphone application associated with the vehicle 1752. Upon receiving 2120 authorization from the user, the system 1700 may communicate 2114 the state change request to the movable barrier operator 1760 and determine 2108 whether the garage door 1756 has moved to an open state. If the system 1700 is not authorized by the user to open the garage door 1756, the system 1700 does not allow 2116 the vehicle 1752 to be started.

Figure 22:
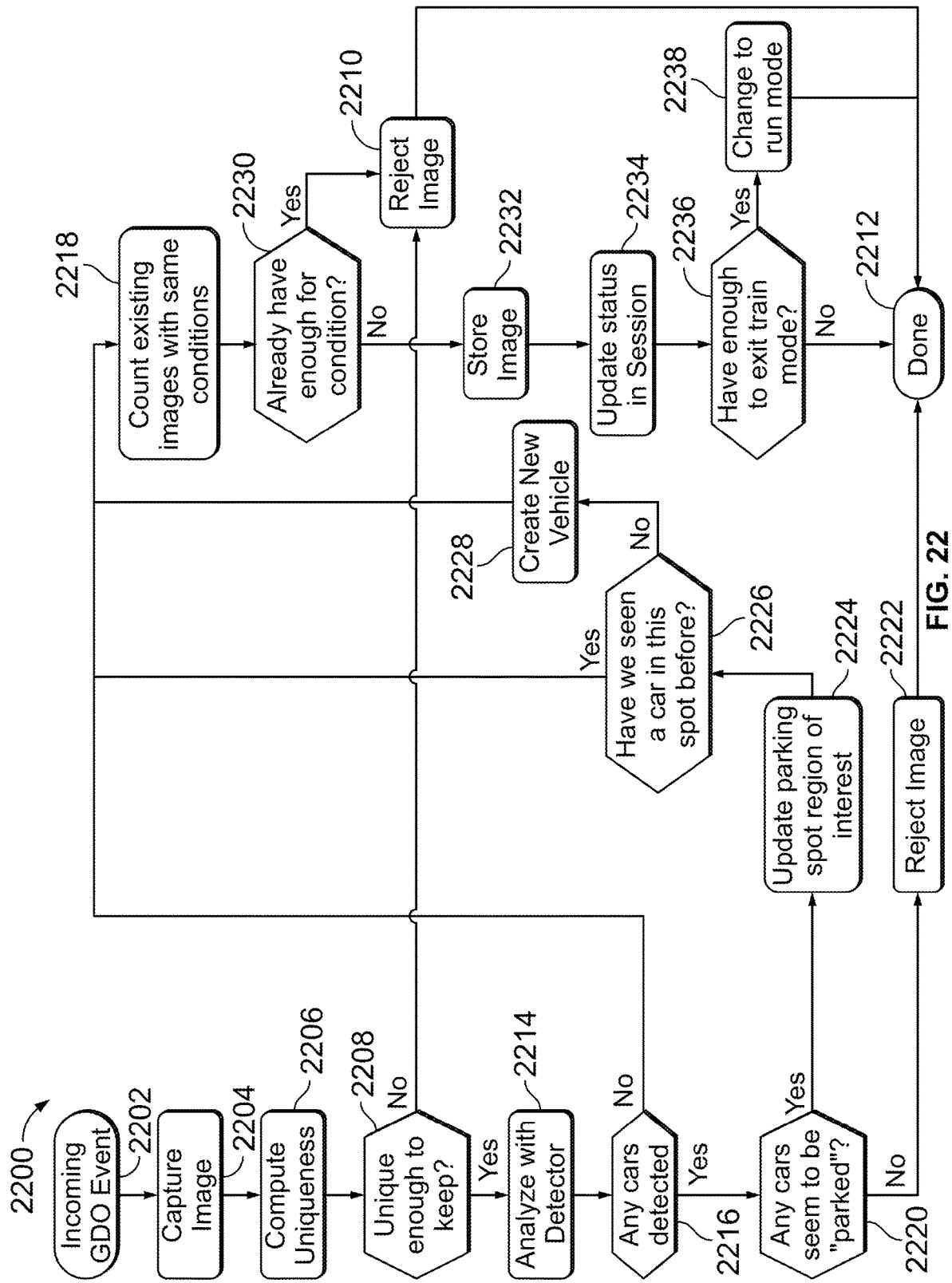
FIG. 22 illustrates an example flow diagram of a method of training the object monitoring system of FIG. 1.

With respect to FIGS. 22-24, additional example methods of operation of the system 100 are shown in train mode 50 and run mode 60. With reference to FIG. 22, in the train mode 50, the system 100 may perform the method 2200 to train the system 100 using a detector, such as a machine learning algorithm, trained to identify vehicles within an image based on all or a portion of a vehicle within an image. For instance, the detector may be specifically trained to identify vehicles based on the presence of only an end portion of the vehicle within the image.

The method 2200 begins when the system 100 is in train mode 50 and detects 2202 an incoming movable barrier operator 105 event. The movable barrier operator 105 event may include that the garage door 104 is being moved to an open state or a closed state or that the movable barrier operator 105 has completed a state change operation to the open or closed state. The movable barrier operator 105 event may be detected based on images captured by the camera 110 as described in further detail above. The movable barrier operator 105 event may be detected upon the receipt of a signal from the movable barrier operator 105 indicating the state of the garage door 104 is being changed or has been changed. For example, the server computer 120 may receive a signal from the movable barrier operator 105 indicating the state of the garage door 104 and notify the server computer 120 when the state of the garage door 104 is being or has been changed.

Upon detecting a movable barrier operator 105 event, the system 100 causes the camera 110 to capture 2204 an image. The system 100 may cause the camera 110 to capture an image promptly upon detecting the movable barrier operator 105 event to cause the camera 110 to capture an image before a vehicle 115 has a chance to enter or exit the garage 102. For example, if the system 100 determines that the movable barrier operator 105 is opening the garage door 104, the system 100 may immediately (or within a short period of time, e.g., within one second) cause the camera 110 to capture an image.

The system 100 then computes 2206 the uniqueness of the captured image relative to any other images the system 100 has already captured. This may include a comparison of the captured image to other images captured during train mode 50 to determine if the captured image is unique enough such that adding the captured image to the training data would provide new data to the training dataset and not redundant or cumulative data. The comparison may be a pixel-by-pixel comparison or a comparison of extracted features from the image for example. The system 100 may compute whether the newly captured image is sufficiently different from the stored images based on the degree of correspondence of the new image to the stored images. If training 50 has just begun and there are no stored images for comparison, the system 100 may skip operation 2206. If the captured image is not unique enough to keep (e.g., it is too similar to an already stored image), the system 100 rejects 2210 the image and does not add the image to the training image dataset. The system 100 may then exit 2212 the method until another movable barrier operator 105 event is detected at operation 2202.

If the image is determined to be unique enough to keep, the system 100 analyzes 2214 the image with the trained detector. The detector may use machine learning algorithms to identify features within the image. For example, the detector may use a neural network trained to identify 2216 the presence of one or more vehicles within the image. The neural network may have been trained using historical data including images of, for example, hundreds or thousands of garages with different vehicles in the garage, outside of the garages, etc. The detector may identify each vehicle within the image and an associated location of each vehicle within the image. For instance, the detector may place a bounding box around each vehicle within the image with the location of the bounding box being indicative of the location of the identified vehicle within the image. If the detector does not detect any vehicles within the image, the system 100 continues to operation 2218 described in detail below.

If the detector does detect a vehicle within the image, the system 100 determines 2220 if any of the detected vehicles are parked or stationary within the image. For instance, the system 100 may determine if the detected vehicle is in a position within the image where a vehicle is typically positioned when it is parked within the garage 102. For example, the system 100 may determine if the vehicle is within the bottom half of the image which, as described with regard to 716 of FIG. 7A, may be indicative that the vehicle is within the garage 102 and parked. The system 100 may also determine a region of interest within the image (or the garage 102 within the image) where a vehicle is typically positioned when it is parked within the garage 102. The system 100 may determine the region of interest over time and keep a running average of this location over time as additional images are captured by the camera 110. The system 100 may then compute the intersection over union of the location of the identified vehicle in the image with the region of interest. If the location of the identified vehicle sufficiently corresponds to the region of interest, the system 100 may determine that the vehicle is parked within the garage 102.

If no identified vehicles within the image are determined to be parked, the system 100 may reject 2222 the image and then exit the method 2212 until another movable barrier operator 105 event is detected at operation 2202.

If an identified vehicle is determined to be parked, for example, using the methods described above, the system 100 may update 2224 the region of interest for a parking spot within the garage based on the location of the vehicle in the captured image. By updating the region of interest with the location of each vehicle that is determined to be parked, the region of interest of a parking spot is continually updated with additional parking spot location data to improve the detection of parked vehicles for subsequently captured images. The system 100 may determine if a vehicle has been detected in this parking spot region of interest before. If a vehicle has been detected in this parking spot 2226, the system 100 continues to operation 2218. If no vehicle has previously been detected in the parking spot, the system 100 creates a new vehicle identifier 2228 for use with subsequent images where a vehicle is detected in that parking spot and continues to operation 2218.

Upon detecting 2216 no vehicles or detecting 2220 a parked vehicle in the captured image, the system 100 counts 2218 the number of existing or already stored images the system 100 has stored for the same condition identified in the captured image. If the system 100 determines 2230 that enough images (e.g., three to five images) have already been collected for the condition identified in the captured image, the system rejects 2210 the image and does not store the captured image with the identified condition or otherwise add the image to the training image dataset. The system 100 may then exit 2212 the method until another movable barrier operator 105 event is detected at operation 2202.

If the system 100 determines 2230 that enough images have not yet been captured or the number of training images stored for the condition identified in the captured images is less than a threshold amount (e.g., three to five images), the system 100 may store 2232 the captured image in memory and associate or tag the image as being associated with the identified condition of the captured image. The system 100 may update 2234 the status in the memory of system 100.

The system 100 determines 2236 if enough images have been captured for each condition to exit the train mode 50 and enter the run mode 60. The system 100 may determine whether each identified condition for the garage 102 has at least a threshold number of images (e.g., three to five images). If the system determines 2236 that enough images have not yet been captured, the system ends 2212 the method and remains in train mode 50 waiting for another movable barrier operator 105 event to be detected at operation 2202. If the system 100 determines 2236 that enough images have been captured for each condition, the system 100 may enter 2238 run mode 60. For example, the system 100 may switch to perform method 2300 in response to a movable barrier operator 105 event.

Figure 23A:
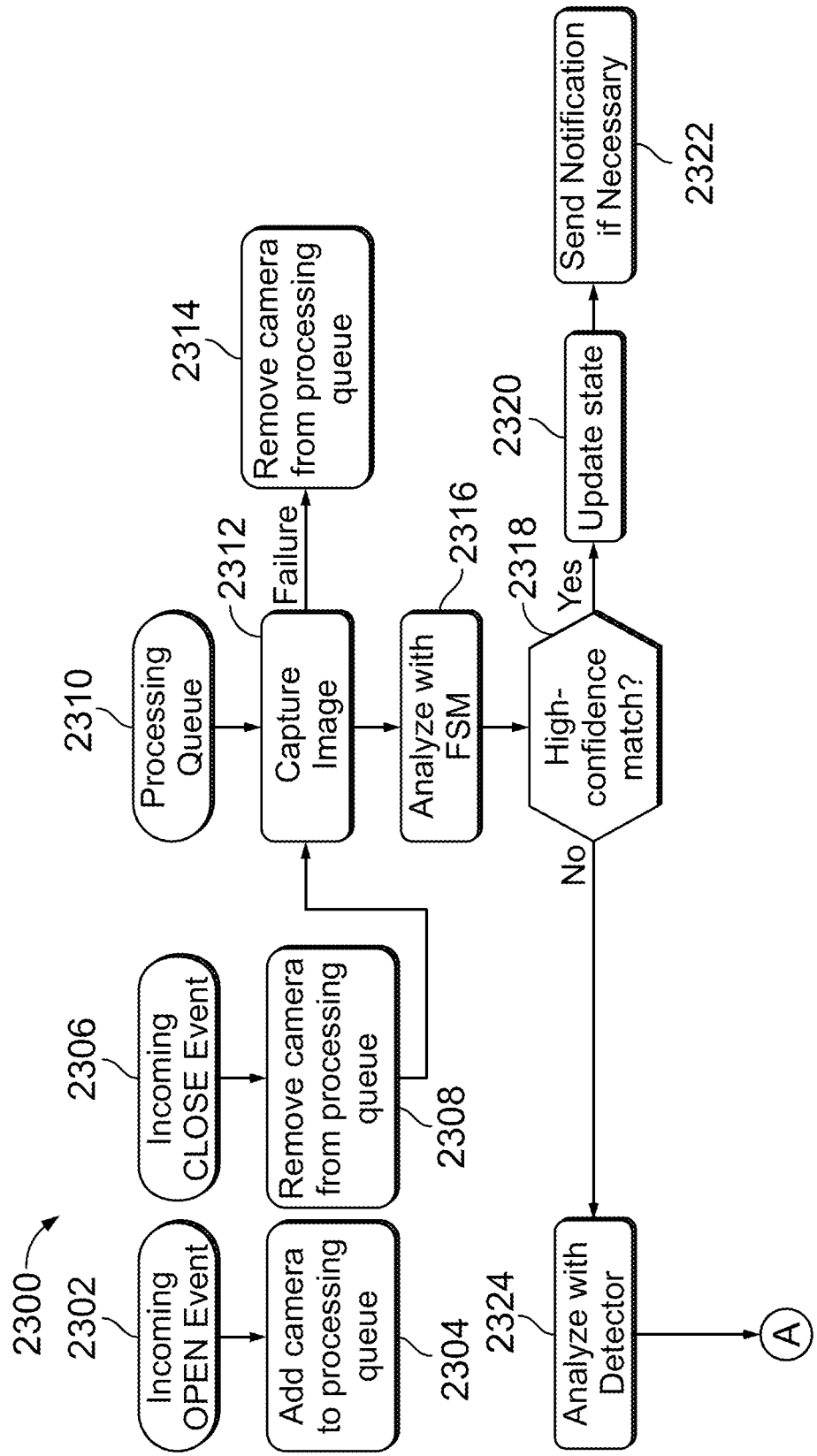
FIGS. 23A-B illustrate an example flow diagram of a method of condition identification utilized in the "Use Mode" of the object monitoring system of FIG. 1.
Figure 23B:
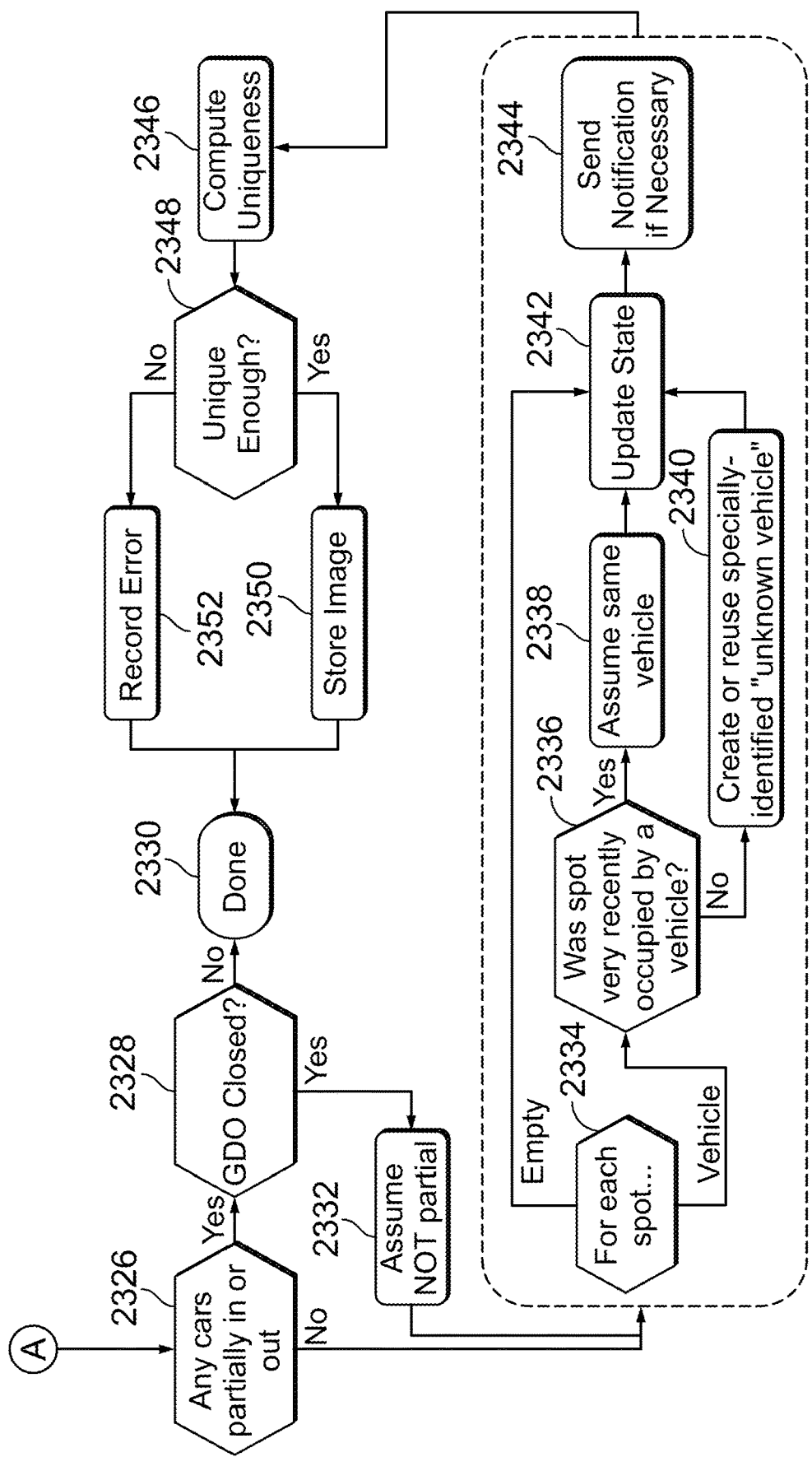

With respect to FIGS. 23A-23B, an example method 2300 performed by the system 100 in run mode 60 is shown. The system 100 waits for an incoming movable barrier operator 105 state change event. If the state change event is an open event 2302, e.g., the garage door 104 is moved to the open state, the system 100 adds 2304 the camera 110 to the processing queue 2310. When the camera 110 is added 2304 to the processing queue 2310, the system 100 captures an image 2312 and is configured to loop through the flow operations 2312-2352 until the camera 110 is removed from the processing queue 2310. The system 100 may be configured to loop through operations 2312-2352 after a period of time, for example, every 10 seconds. The camera 110 may be removed 2314 from the processing queue when the camera fails to capture an image or when the system 100 detects a close state change event 2306, e.g., the garage door 104 is moved to the closed state. Upon detecting a close state change event 2306 the system 100 removes 2308 the camera from the processing queue and captures an image 2312.

Upon capturing an image at operation 2312, the system 100 analyzes 2316 the captured image to determine the condition of the captured image, for example, using Fast Scene Matching as described above in regard to FIG. 12. The system 100 may analyze 2316 the captured image by comparing the captured image to the images captured and stored in train mode 50. For example, the system 100 may be configured to extract a feature descriptor from the captured image and compare the feature descriptor with feature maps stored in the training dataset for each condition identified in during the train mode 50.

Upon analyzing 2316 the captured image, the system 100 determines 2318 whether the captured image corresponds, with a high degree of confidence, to one of the known conditions of the training dataset. If the image corresponds to a known condition with a high degree of confidence (e.g., above a threshold confidence level such as 80%), the system 100 updates 2320 the current state or condition of the garage 102 with the condition having the high confidence in correspondence. The system 100 may send 2322 a notification or message to a user of the current condition of the garage 102. In some forms, the system 100 may be configured to only send the current condition upon a determination that the condition of the garage 102 has changed. In some forms, the system 100 stores the current condition of the garage 102 in memory and the system 100 provides the current condition to the user from memory when requested by the user (e.g., when viewed in a smartphone application associated with the movable barrier operator 105).

If the captured image does not correspond to any of the known conditions with a high degree of confidence, the system 100 analyzes 2324 the captured image with the detector as described above with regard to FIG. 22. The system 100 uses the detector to determine 2326 whether any vehicles are partially in or out of the garage 102 (e.g., similar to operation 2220 of method 2200 of FIG. 22). If the system 100 determines a vehicle is partially in or out of the garage 102, the system 100 determines 2328 whether the garage door 104 is in a closed state. The system 100 may determine the state of the garage door 104 using the methods described above, such as detecting the state of the garage door 104 by analyzing the captured image using image processing or by receiving the state of the garage door 104 from the movable barrier operator 105 or a door position sensor 150. If the garage door 104 is determined to be in an open state, the system 100 determines that the vehicle is in motion and the condition of the garage 102 is still changing. The system 100 may end 2330 the method 2300. As mentioned above, where the garage door 104 is in an open state, the method 2300 will repeat after a period of time. After a period of time, the detected vehicle may be fully parked or may no longer be within the image (e.g., the vehicle left the garage 102).

Where the garage door 104 is determined 2328 to be in a closed state, the system 100 may be configured to determine 2332 that the vehicle is not partially in or out of the garage 102. In other words, the system 100 is programmed to determine that the vehicle cannot be partially within the garage 102 when the garage door 104 is closed and must instead be fully within the garage 102.

Upon determining 2326, 2332 that no vehicles are partially in or out of the garage 102, the system 100 determines 2334 the condition of each parking spot within the garage 102. If the system 100 determines a parking spot is empty (e.g., no vehicle within the parking spot), the system 100 updates 2342 the current condition of the parking spot.

If the system 100 determines a parking spot includes a vehicle, the system 100 determines 2336 whether the spot was recently determined to be occupied by a vehicle (e.g., within 24 hours). If the system 100 determines 2336 parking spot was recently occupied by a vehicle, the system 100 may be configured to determine or infer 2338 that the vehicle detected in the captured image is the same vehicle as was recently detected in that same parking spot. The system 100 may then update 2342 the condition of the parking spot. If the system 100 determines the parking spot was not recently occupied by a vehicle, the system 100 may create or reuse 2340 a specifically-identified "unknown vehicle" identifier for the newly detected vehicle and update 2342 the state or condition of the parking spot. The unknown vehicle identifier may indicate that a new, unknown vehicle is in the parking spot, for example, when the vehicle has not previously been identified in that parking spot. The vehicle may be identified as "unknown" when, for example, a user purchases, leases, or borrows a new vehicle or when a guest's car is parked in the parking spot. In some forms, the system 100 may compare the unknown vehicle with known vehicles to determine the vehicle is different than the known vehicles. Where the same "unknown" vehicle is subsequently identified in captured images (e.g., by comparison of the new vehicle in one image with a previously captured image), the system 100 may reuse 2340 the "unknown vehicle" identifier that was previously created 2340 for that vehicle. The system 100 may determine the vehicle is a new vehicle of the user and prompt the user to provide a name or identifier for that new vehicle. The system 100 may use the images associated with the new vehicle to generate feature maps for conditions of the garage 102 where the new vehicle is present. The system 100 may update 2342 the condition or state of the parking spot (e.g. from vacant to occupied) and send 2344 a notification or message similar to that described in operations 2320 and 2322 above.

The system 100 may compute 2346 the uniqueness of the captured image similar to that described above with respect to operation 2206 of method 2200 and determine 2348 whether the captured image is sufficiently distinct from the images stored for the identified condition in the training images dataset. If the captured image is determined to be sufficiently unique, the system 100 may store 2350 the image and add the image to the training image dataset for the identified condition or otherwise associate or tag the image as corresponding to the identified condition. The system 100 may then exit 2330 the method 2300. If the captured image is determined to not be unique, the system 100 may record 2352 an error as the image should have had a high-confidence correspondence match at operation 2318 with one of the images of the training dataset. The system 100 may then exit 2330 the method 2300.

Figure 24A:
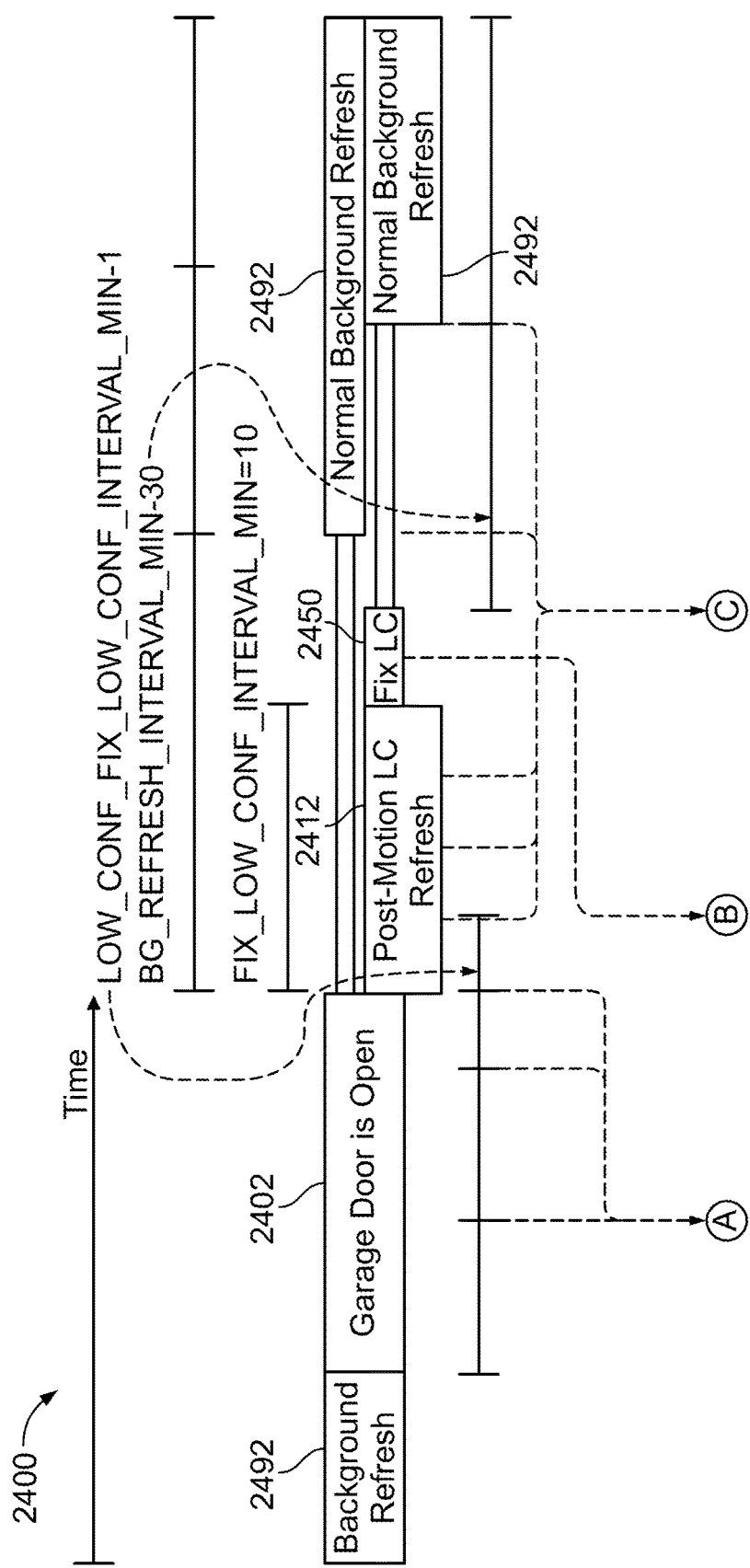
FIGS. 24A-C illustrate an example flow diagram of a method of condition identification and continued training utilized in the "Use Mode" of the object monitoring system of FIG. 1.
Figure 24B:
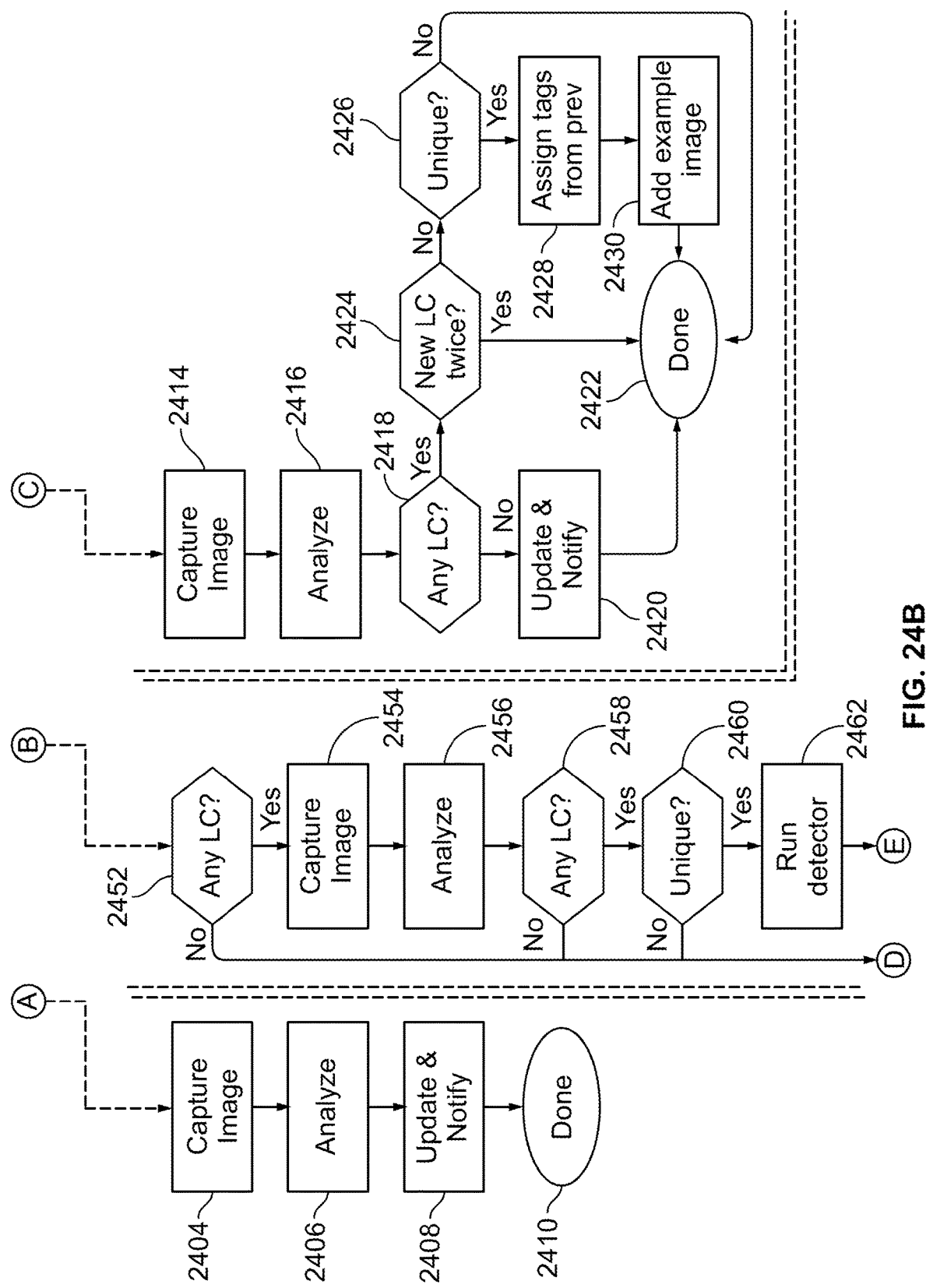
Figure 24C:
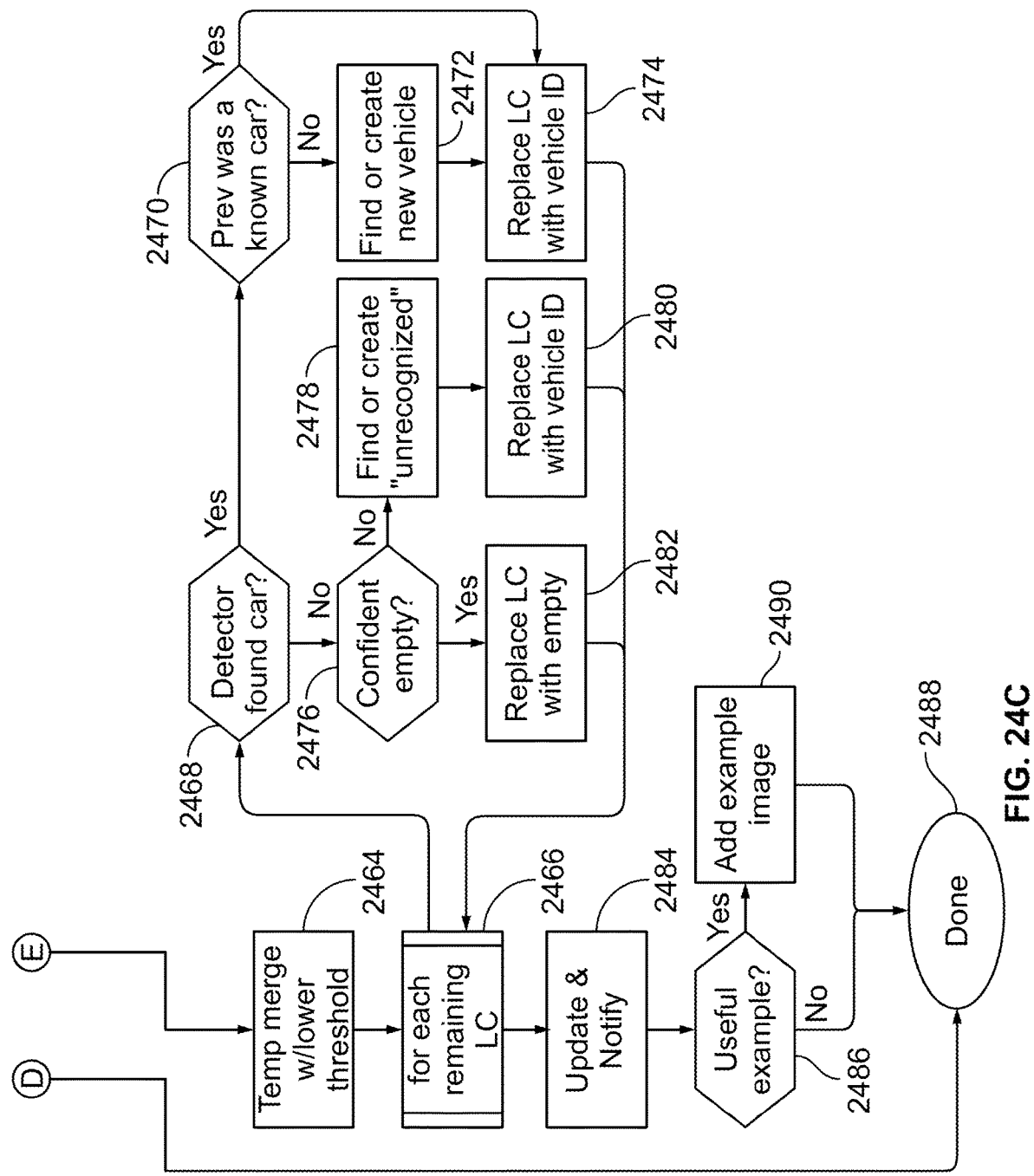

With respect to FIG. 24A-24C, an example method 2400 of the system 100 in the run mode 60 is provided for monitoring the condition of the garage 102 for changes over time and continually improving the collection of images stored for each condition in train mode 50. The system 100 may determine the condition of the garage 102 as described above in the run mode 60, for example, in response to a state change of the garage door 104. The system 100 may periodically (e.g., every 10 seconds) capture additional images to determine whether the condition of the garage 102 has changed since the previous image was captured. The system 100 may detect motion in the garage 102 by, for example, comparing the change in pixels of a captured image with a previously captured image. If no motion has been detected since the previous image was captured, the system 100 may infer or be programmed to determine the condition of the garage 102 has not changed. Where no motion has been detected, but subsequently captured images have a low-confidence correspondence to the conditions identified in train mode 50, the system 100 may infer or be programmed to determine the subsequently captured images represent the previously determined condition and associate one or more of the subsequently captured images with that condition. For example, the lighting within the garage 102 image may have changed resulting in a low-confidence correspondence to the feature maps and/or images associated with each condition. By adding a low-confidence image to the set of images for the previously determined condition of the garage 102, the system 100 continually improves the set of images associated with each condition over time.

Where motion within the garage 102 is detected, the system 100 is not able to infer that the condition of the garage 102 within the low-confidence images is the same as the previously identified condition. The system 100 continues to periodically capture additional images over a period of time and determines if a high-confidence correspondence to an identified condition is found. If a high-confidence correspondence to a condition is found, the system 100 may disregard the low-confidence images and determine that the condition having a high-confidence match is now present. If no high-confidence correspondence is found over a period of time, the system 100 may use the detector, described with regard to FIG. 22 above, to determine the current condition of the garage 102 to resolve the low-confidence correspondence issue and determine the condition of the garage 102.

With reference now to FIGS. 24A-24C, the method 2400 is provided in further detail. The method 2400 may begin when the system 100 determines 2402 that the garage door 102 is in an open state. The system 100 may capture 2404 an image via camera 110 and analyze 2406 the captured image to determine the condition of the garage 102 as described in detail above, for example, using the fast-scene matcher as described in operation 2316 of method 2300. The system 2402 may capture an image and/or may extract a frame or image from a video recorded by the camera 110. The system 100 may update 2408 the current condition of the garage 102 determined in operation 2406 and notify users similar to that described in operations 2320 and 2322 of method 2300. The system 100 may then end 2410 the method until a subsequent image is captured. The system 100 may be configured to capture 2404 an image periodically or at regular intervals, e.g. every 10 seconds, and performs steps 2404-2410 until the garage door 104 moves to a closed state.

Upon determining the garage door 104 has moved to a closed state, the system 100 may enter a post-motion LC (low confidence) refresh mode 2412 where the system 100 continues to periodically capture and analyze images. The system 100 may operate in the refresh mode 2412 for a period of time, for example, 10 minutes. During the refresh mode 2412, the system 100 may capture 2414 and analyze 2416 images (e.g., every two minutes) similar to steps 2404 and 2406 described above to determine whether the captured images correspond to a known condition with a confidence above a threshold value. In one example, the system 100 may capture the first image in the refresh mode 2412 a minute after the system 100 determines the garage door 104 has moved to a closed state. The system 100 determines 2418 whether the captured image only has a low-confidence correspondence with the known conditions. If the captured image has a high correspondence with a known condition, the system 100 updates and notifies 2420 of the identified condition with which the image has a high correspondence similar to that described with regard to step 2408. The system then ends 2422 processing the image. The system 100 may infer or be programmed to determine that the condition of the garage 102 will not change from this identified condition until the garage door 104 is moved to an open state. Thus, the system 100 may infer or be programmed to determine that subsequently captured images returning a low-confidence correspondence to the known conditions are associated with the previously identified condition.

Where the system determines 2418 that the captured image has only a low confidence correspondence with the known conditions, the system 100 proceeds to determine 2424 whether this is the second time the system 100 has captured an image having a low confidence correspondence with the known conditions since the garage door 104 has closed. If this is the second image having a low confidence correspondence, the system 100 ends 2422 the process of analyzing the image. The system 100 may infer or be programmed to determine that the condition of the garage 102 has not changed since the prior image having low-confidence correspondence was captured. The system 100 may further infer that this second image having a low-confidence correspondence is not unique from the first or previously captured image having low-confidence correspondence to the known conditions and determine to not add the second image to the collection of images for the previously identified condition. The system 100 may resolve the low confidence correspondence issue in the fix low confidence (LC) mode 2450 described in further detail below.

If the system 100 determines at decision block 2424 that this is the first time a low confidence correspondence has been found since the garage door 104 closed, the system 100 proceeds to determine at decision block 2426 whether the captured image is unique. The system 100 may determine whether the captured image is unique by comparing the captured image to one or more (e.g. a subset) of the images stored in memory and associated with the known conditions and determining the degree to which the captured image differs from each of the stored images. If the captured image is substantially similar to an image stored in memory (e.g., above a threshold similarity) the system 100 may determine the captured image is not unique and to not add the captured image the collection of stored images associated with the known conditions. When the system determines that the captured image is not unique, the system 100 ends 2422 processing the image, having a similar image already stored and associated with one of the known conditions.

Where the system 100 determines 2426 that the captured image is unique, the system 100 associates the captured image with the condition previously determined to be present, for example, with a high-confidence correspondence after the garage door 104 moved to the closed state. The system 100 associates 2428 the captured image with the condition that was previously determined to be present, assuming or inferring that the condition of the garage 102 has not changed since the garage door 104 remained closed. The system 100 may infer or be programmed to determine that the captured image represents the previously identified condition, and add 2430 the captured image to the set of images associated with the previously identified condition. By adding the captured image to the set of images associated with the previously identified condition, the system 100 may return a high confidence correspondence with similar images captured in the future. For example, the lighting within the garage 102 may have changed resulting in a low confidence correspondence with the known conditions. By adding the image captured under the different lighting to be used when comparing an image to the known conditions, an image later captured under the same or similar lighting may return a high correspondence to the known condition with high confidence. In this way, the collection of images associated with each condition in train mode 50 may continue to be increased and improved in the use mode 60, resulting in the system 100 being able to more accurately identify the condition of the garage 102 with time.

After the refresh mode 2412 has timed out or ended (e.g., after 10 minutes), the system 100 may enter the fix low confidence (LC) mode 2450. The system 100 determines 2452 if any of the images captured during the low confidence refresh mode 2412 returned a low-confidence correspondence with the known conditions, e.g., whether there were low-confidence correspondence determinations at operation 2418. If there were no low-confidence correspondence determinations in the refresh mode 2412, the system 100 may end 2488 the fix low confidence mode 2450 because there are no low-confidence issues to resolve.

Where the system 100 determines at decision block 2452 that there were low-confidence matches during the refresh mode 2412, the system 100 causes the camera 110 to capture 2454 and analyze 2456 a new image similar to operations similar to steps 2404 and 2406 described above to determine whether the captured images correspond to a known condition with a confidence above a threshold value. The system 100 determines 2458 a confidence level e.g. whether the captured image has a high confidence correspondence with the known conditions or whether the captured image has a low-confidence correspondence with the known conditions. If the system determines the captured image has a high confidence correspondence to a known condition, the system 100 ends the process 2488.

Where the system 100 determines 2458 the captured image has a low confidence correspondence to the known conditions, the system 100 determines 2460 if the captured image is unique relative to the images already stored and associated with the known conditions similar to operation 2426 described above. If the captured image is determined to not be unique, the system 100 may end the process 2488 as the captured image may not differ enough from the already stored images to be useful in adding to the collection of images associated with the known conditions. If the captured image is determined to be unique, the system 100 may run 2462 the detector, similar to operation 2324 described above with regard to method 2300, to use the machine learning algorithm to identify the presence and location of vehicles within the captured image. The system 100 may infer or be programmed to determine that the condition of the garage 102 has not changed and temporarily lower the confidence threshold when identifying the condition of an image. The system 100 may temporarily lower the threshold confidence level and associate or merge 2464 the captured image with the condition with which the captured image has the highest correspondence if the confidence in the correspondence exceeds the lowered threshold confidence value. The system 100 may store and associate this image with the identified condition to further train the system 100 by adding the image to the set of images associated with the identified condition.

At operation 2466, the system 100 analyzes the data extracted from the captured image by the detector. The system 100 determines 2468 whether the detector found a vehicle within the image at operation 2462 when the detector was run. If a vehicle was found in the image, the system 100 determines 2470 whether previously captured images identified a vehicle in the parking spot in which the detector found a vehicle. If the system 100 determines that no vehicles were previously in that parking spot based on previously captured images, then the system finds or creates 2472 a new vehicle identifier tag for that vehicle. The system 100 then may remove the low-confidence correspondence designation and associate 2474 the captured image with a condition where the vehicle having the new vehicle identifier tag is parked in the identified parking spot. Where the system determines 2470 that a vehicle was previously in that parking spot based on the previously captured images (e.g., a vehicle identifier has already been created), then the system 100 may remove the low-confidence correspondence designation and associate 2474 the captured image with condition where the previously identified vehicle is parked in the identified parking spot. The system 100 may infer that the vehicle currently parked in the parking spot of the garage 102 is the same vehicle as was previously parked in the parking spot of the garage 102.

Where the system 100 determines 2468 a vehicle is not in the captured image, the system 100 may determine 2476 the confidence level in the determination that no vehicles are in the captured image. Where the system 100 determines that the confidence that parking spot(s) is empty or vacant is low, then the system 100 may create 2478 an unrecognized vehicle identifier tag. The system 100 may then remove the low-confidence correspondence designation from the captured image and associate 2480 the captured image with a condition where an unrecognized vehicle is parked in the identified parking spot.

Where the system 100 determines 2476 that the parking spot(s) is empty with high confidence, then the system 100 may remove the low-confidence correspondence designation from the captured image and associate 2482 the captured image with the condition where the parking spot(s) is empty.

Upon resolving the low-confidence correspondence designation for the captured image, the system 100 may then update and notify 2484 of the current condition of the garage 102 similar to that described with regard to step 2408. The system 100 may then determine 2486 whether the captured image is a useful example to add to the collection of images associated with the identified condition. The system 100 may determine whether an image is useful based on the degree to which the image differs from the already stored images for the associated known condition. If the system 100 determines the image should not be added to the collection of stored images for the identified condition, the system 100 ends 2488 the process. If the system 100 determines 2486 that the image is useful and should be added to the collection of stored images for the identified condition, then the system 100 adds 2490 the captured image to the collection of images stored for the identified condition. Where the system 100 adds the image to the collection of images for a known condition (e.g., in operations 2430 and 2490), the system 100 may regenerate the feature map(s) for the identified condition to incorporate the image data of newly added captured image. The system 100 may then end 2488 the process.

After the fix low-confidence mode 2450 has ended, the system 100 may enter additional refresh modes 2492 at regular intervals (e.g., every 30 minutes) in which the system 100 periodically captures and analyzes images, for example, similar to operations 2424-2430 of in the refresh mode 2412. The system 100 captures and analyzes images to ensure that the condition of the garage 102 has not changed, to update the current condition of the garage 102 with recent image data, and to continue to collect new, unique images to add to the collection of images stored for the identified conditions of the garage 102. By using the prediction that the condition of the garage 102 does not change while the garage door 102 remains closed, the system 100 is able to add to the set of images collected and identified in train mode 50 from which feature maps are generated to continuously improve the ability of the system 100 to identify the condition of the garage 102 using the lower resource intensive method (e.g., fast scene matcher) rather than the higher resource intensive methods (e.g., use of the detector).

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An object monitoring system for a secured area, the object monitoring system comprising:
    an image sensor operable to capture an image of the secured area, the secured area corresponding to an interior of a garage, wherein the image sensor is part of a movable barrier operator configured to raise and lower a movable barrier associated with the garage;
    a memory configured to store a machine learning algorithm trained to identify a vehicle in the secured area, the machine learning algorithm including feature maps of training images captured by the image sensor; and
    a processor operably coupled to the image sensor and the memory, the processor having a run mode in which the processor calculates a feature descriptor of the image and utilizes the machine learning algorithm and the image of the secured area to determine whether a vehicle is present in the secured area by determining a correlation between the feature descriptor of the image and the feature maps of the training images, wherein the processor determines a confidence of the image corresponding to one of a plurality of conditions, wherein the processor has a retrain mode wherein the processor retrains the machine learning algorithm, wherein the processor exits the run mode and changes to the retrain mode upon the confidence being below a prescribed threshold, and wherein the processor exits the retrain mode and changes to the run mode after completing retraining.

2. An object monitoring system for a secured area, the object monitoring system comprising:
    an image sensor operable to capture an image of the secured area, wherein the image sensor is part of a movable barrier operator configured to raise and lower a movable barrier associated with the secured area;
    a memory configured to store a machine learning algorithm trained to identify a vehicle in the secured area, the machine learning algorithm including feature maps of training images captured by the image sensor; and
    a processor operably coupled to the image sensor and the memory, the processor configured to calculate a feature descriptor of the image and to utilize the machine learning algorithm and the image of the secured area to determine whether a vehicle is present in the secured area by determining a correlation between the feature descriptor of the image and the feature maps of the training images, wherein the processor determines a confidence of the image corresponding to one of a plurality of conditions, wherein the processor has a retrain mode wherein the processor retrains the machine learning algorithm, wherein the processor exits the run mode and changes to the retrain mode upon the confidence being below a prescribed threshold, wherein the processor exits the retrain mode and changes to the run mode after completing retraining, wherein the retrain mode is more resource intensive than the run mode, and wherein the processor is configured to cause the image sensor to capture the image of the secured area upon a state change of a movable barrier of the secured area.

3. The object monitoring system of claim 1, wherein the retrain mode is more resource intensive than the run mode.

4. The object monitoring system of claim 1 wherein the feature maps include features extracted from training images captured by the image sensor; and
    wherein calculating the feature descriptor includes extracting features of the image, wherein utilizing the machine learning algorithm and the image of the secured area includes comparing the extracted features of the image to the extracted features of the training images.

5. The object monitoring system of claim 1 wherein the feature maps of the training images are calculated using at least one of:
    a histogram of oriented gradients; and
    a scale-invariant feature transform.

6. The object monitoring system of claim 1 wherein the machine learning algorithm is trained to identify a plurality of conditions, wherein at least one of the conditions corresponds to a presence of the vehicle;
    wherein the feature maps of the training images include a plurality of feature maps for individual ones of the conditions, the feature maps determined using training images captured by the image sensor; and
    wherein the processor is configured to determine the presence of the vehicle by comparing the feature descriptor to the plurality of feature maps of at least one of the conditions.

7. The object monitoring system of claim 1 wherein the machine learning algorithm is trained to identify a plurality of conditions, wherein at least one of the conditions corresponds to a presence of the vehicle; and
    wherein the feature maps are calculated by averaging feature descriptors of training images that represent the same condition.

8. The object monitoring system of claim 1 wherein the image sensor has a field of view for capturing images;
    wherein the machine learning algorithm includes a mask corresponding to a portion of the field of view of the image sensor; and
    wherein the processor is configured to analyze the portion of the field of view of the image to determine whether the vehicle is present.

9. The object monitoring system of claim 1 wherein the machine learning algorithm includes masks produced from training images captured by the image sensor; and
    wherein the processor is configured to utilize the machine learning algorithm and the image of the secured area including comparing a mask calculated for the image with the masks produced from the training images.

10. The object monitoring system of claim 1 wherein the machine learning algorithm includes a first machine learning algorithm trained using training images of the secured area captured by the image sensor and a second machine learning algorithm that utilizes data from the first machine learning algorithm; and
    wherein the processor is configured to utilize the second machine learning algorithm and the image to determine whether the vehicle is present in the secured area.

11. The object monitoring system of claim 1 wherein the processor is configured to request a user input regarding the image; and wherein, in the retrain mode, the processor is configured to cause the machine learning algorithm to learn a condition of the image in response to the user input indicating the image represents new condition.

12. The object monitoring system of claim 1 wherein the processor is configured to utilize the machine learning algorithm and the image of the secured area to determine a state of a movable barrier of the secured area.

13. The object monitoring system of claim 1 wherein the machine learning algorithm is trained using training images of the secured area captured by the image sensor; and
wherein the machine learning algorithm is trained to identify a plurality of conditions of the secured area, the plurality of conditions including a condition associated with a presence of the vehicle; and
wherein the processor is configured to determine the presence of the vehicle by associating the image of the secured area with one of the conditions of the secured area.

14. The object monitoring system of claim 1 wherein the image sensor is operable to capture the image of the secured area including a plurality of parking spaces of the secured area; and
wherein the processor is configured to determine whether the vehicle is present in the secured area including identifying one of the parking spaces of the secured area in which the vehicle is present.

15. The object monitoring system of claim 1 wherein at least a portion of the machine learning algorithm is performed by a neural network.

16. The object monitoring system of claim 1, wherein the processor is configured to communicate the determination of whether the vehicle is present in the secured area to a user device.

17. A method of monitoring a secured area using an object monitoring system having a non-transitory computer readable memory storing a machine learning algorithm trained to identify a vehicle in the secured area, the machine learning algorithm including feature maps of training images captured by an image sensor of the object monitoring system, the method comprising:
capturing, via the image sensor contained by a movable barrier operator configured to raise and lower a movable barrier associated with the secured area, an image of the secured area;
calculating a feature descriptor of the image;
determining, via a processor of the object monitoring system, whether a vehicle is present in the secured area using the machine learning algorithm and the image of the secured area at least by determining a correlation between the feature descriptor of the image and the feature maps of the training images;
determining a confidence of the image corresponding to one of a plurality of conditions;
communicating the determination of whether the vehicle is present in the secured area to a smart home system when the confidence is above a prescribed threshold, the smart home system configured to control an action in response to receiving the communicated determination;
upon the confidence being below the prescribed threshold, exiting a run mode and changing to a retrain mode wherein the processor retrains the machine learning algorithm; and
after completing retraining, exiting the retrain mode and changing to the run mode.

18. The method of claim 17 wherein capturing the image of the secured area includes capturing the image upon a state change of a movable barrier of the secured area.

19. The method of claim 17 further comprising:
receiving information regarding a movable barrier operator system associated with the secured area; and
wherein determining whether the vehicle is present includes using the machine learning algorithm, the image, and a state change of a movable barrier caused by the movable barrier operator system.

20. The method of claim 17 wherein the feature maps include features extracted from training images captured by the image sensor; and
wherein calculating the feature descriptor of the image includes extracting features of the image, wherein determining whether the vehicle is present includes comparing the extracted features of the image to extracted features of the training images.

21. The method of claim 17 wherein the feature maps of the training images are calculated using at least one of:
a histogram of oriented gradients; and
a scale-invariant feature transform.

22. The method of claim 17 wherein the machine learning algorithm is trained to identify a plurality of conditions, wherein at least one of the conditions corresponds to a presence of the vehicle;
wherein the feature maps of the training images include a plurality of feature maps for individual ones of the conditions, the feature maps determined using training images captured by the image sensor; and
wherein determining the presence of the vehicle includes comparing the feature descriptor to the plurality of feature maps of at least one of the conditions.

23. The method of claim 17 wherein the machine learning algorithm is trained to identify a plurality of conditions, wherein at least one of the conditions corresponds to a presence of the vehicle; and
wherein the feature maps are calculated by averaging feature descriptors of training images that represent the same condition.

24. The method of claim 17 wherein the image sensor has a field of view for capturing images;
wherein the machine learning algorithm includes a mask corresponding to a portion of the field of view of the image sensor; and
wherein determining whether the vehicle is present includes analyzing the portion of the field of view of the image to determine the presence of the vehicle.

25. The method of claim 17 wherein the machine learning algorithm includes masks produced from training images captured by the image sensor; and
wherein determining whether the vehicle is present includes comparing a mask calculated for the image with the masks produced from the training images.

26. The method of claim 17 wherein the machine learning algorithm includes a first machine learning algorithm trained using training images of the secured area captured by the image sensor and a second machine learning algorithm that utilizes data from the first machine learning algorithm; and
wherein determining whether the vehicle is present includes using the second machine learning algorithm and the image.

27. The method of claim 17 wherein determining whether the vehicle is present includes associating the image with one of the plurality of conditions of the machine learning algorithm.

28. The method of claim 17 further comprising requesting a user input regarding the image; and wherein retraining the machine learning algorithm includes learning a condition of the image in response to the user input indicating the image represents a new condition.

29. The method of claim 17 further comprising determining a state of a movable barrier of the secured area using the machine learning algorithm and the image of the secured area.

30. The method of claim 17 wherein the machine learning algorithm is trained using training images of the secured area captured by the image sensor; and wherein the machine learning algorithm is trained to identify a plurality of conditions of the secured area, the plurality of conditions including a condition associated with the presence of the vehicle; and wherein determining whether the vehicle is present includes associating the image of the secured area with one of the conditions of the secured area.

31. The method of claim 17 wherein capturing the image of the secured area includes capturing the image of the secured area including a plurality of parking spaces of the secured area; and wherein determining whether the vehicle is present includes determining in which one of the parking spaces of the secured area the vehicle is present.

32. The method of claim 17 wherein at least a portion of the machine learning algorithm is performed by a neural network.

33. The method of claim 17 further comprising communicating the determination of whether the vehicle is present in the secured area to a user device.

* * * * *